US011531151B2

(12) United States Patent
Mitani et al.

(10) Patent No.: US 11,531,151 B2
(45) Date of Patent: Dec. 20, 2022

(54) IMAGING APPARATUS AND IMAGE GENERATING METHOD THAT DETECTS AN ORIENTATION OF AN IMAGING SECTION AND GENERATES AN IMAGE CORRESPONDING TO A POLARIZATION DIRECTION CORRESPONDING TO THE ORIENTATION THE IMAGING SECTION

(71) Applicant: Sony Group Corporation, Tokyo (JP)

(72) Inventors: Hitoshi Mitani, Kanagawa (JP); Masafumi Wakazono, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 393 days.

(21) Appl. No.: 16/628,603

(22) PCT Filed: Jun. 4, 2018

(86) PCT No.: PCT/JP2018/021421
§ 371 (c)(1),
(2) Date: Jan. 3, 2020

(87) PCT Pub. No.: WO2019/012857
PCT Pub. Date: Jan. 17, 2019

(65) Prior Publication Data
US 2020/0183066 A1 Jun. 11, 2020

(30) Foreign Application Priority Data

Jul. 12, 2017 (JP) .............................. JP2017-136395

(51) Int. Cl.
*H04N 5/225* (2006.01)
*G02B 5/30* (2006.01)
(Continued)

(52) U.S. Cl.
CPC ............ *G02B 5/3025* (2013.01); *G03B 11/00* (2013.01); *H04N 5/232* (2013.01); *H04N 5/2254* (2013.01)

(58) Field of Classification Search
None
See application file for complete search history.

(56) References Cited

U.S. PATENT DOCUMENTS

2013/0215238 A1* 8/2013 Yamazaki ......... H01L 27/14621
348/49
2015/0029389 A1* 1/2015 Masanori .......... G02F 1/133528
348/373
2019/0273856 A1* 9/2019 Hirasawa ............... H04N 5/225

FOREIGN PATENT DOCUMENTS

CN          106154388 A      11/2016
JP          2014035536 A      2/2014
(Continued)

OTHER PUBLICATIONS

Extended European Search Report dated Apr. 29, 2020 for corresponding European Application No. 18831251.6.

*Primary Examiner* — Gary C Vieaux
(74) *Attorney, Agent, or Firm* — Michael Best & Friedrich LLP

(57) ABSTRACT

A polarization filter effect is prevented from being changed due to a change in orientation of an imaging apparatus. An imaging apparatus according to the present technique includes an imaging section including a first pixel capable of receiving light in a first polarization direction and a second pixel capable of receiving light in a second polarization direction different from the first polarization direction, a detection section detecting an orientation of the imaging section, and an image generating section generating, on the basis of signals for the first and second pixels, an image corresponding to a polarization direction corresponding to a (Continued)

detection result from the detection section. Thus, as an image corresponding to a particular polarization direction, that is, an image corresponding to application of a polarization filter effect, an image can be generated that corresponds to a polarization direction corresponding to a change in the orientation of the imaging section.

20 Claims, 27 Drawing Sheets

(51) Int. Cl.
*G03B 11/00* (2021.01)
*H04N 5/232* (2006.01)

(56) References Cited

FOREIGN PATENT DOCUMENTS

| | | |
|---|---|---|
| JP | 2015026937 A | 2/2015 |
| JP | 2017063247 A | 3/2017 |
| WO | 2008-099589 A1 | 5/2010 |

* cited by examiner

FIG.1
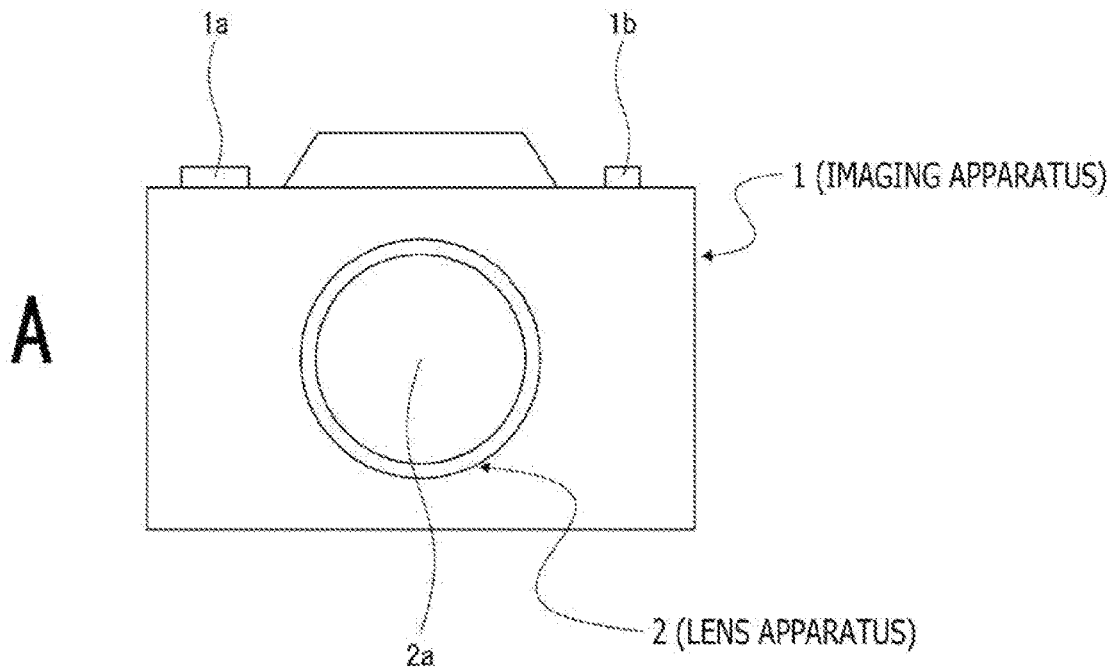
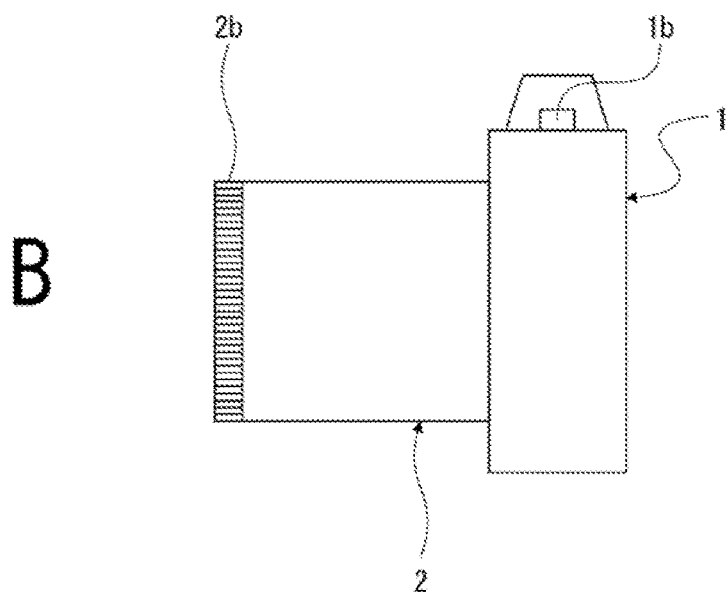

FIG.4
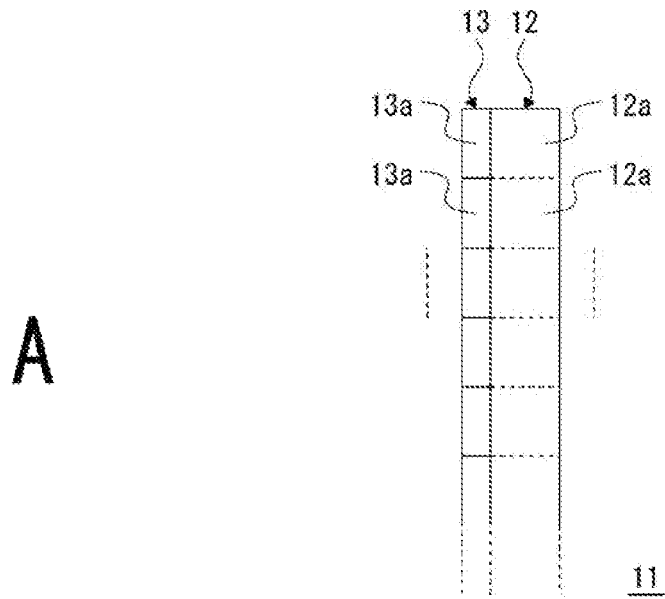
A
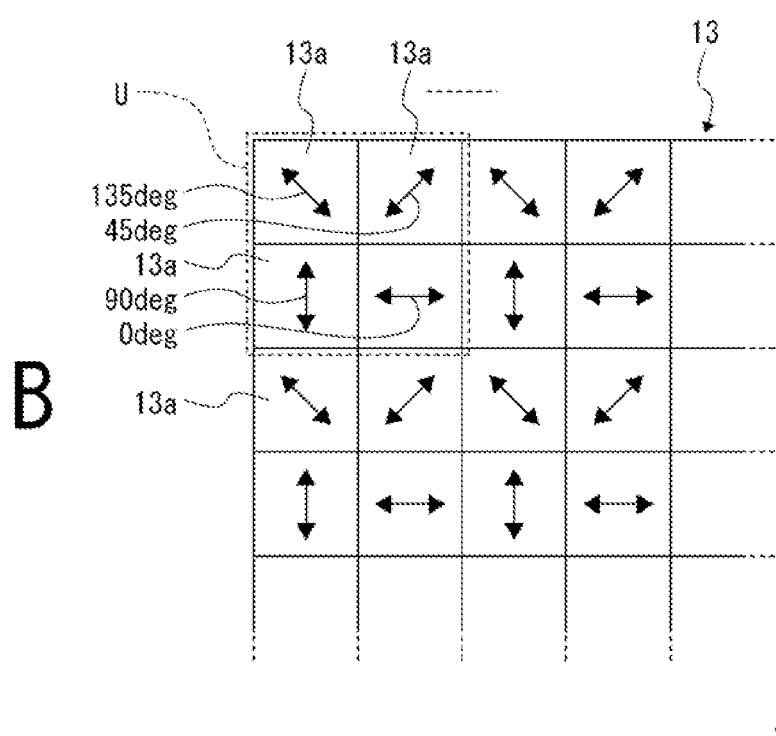
B

FIG.6
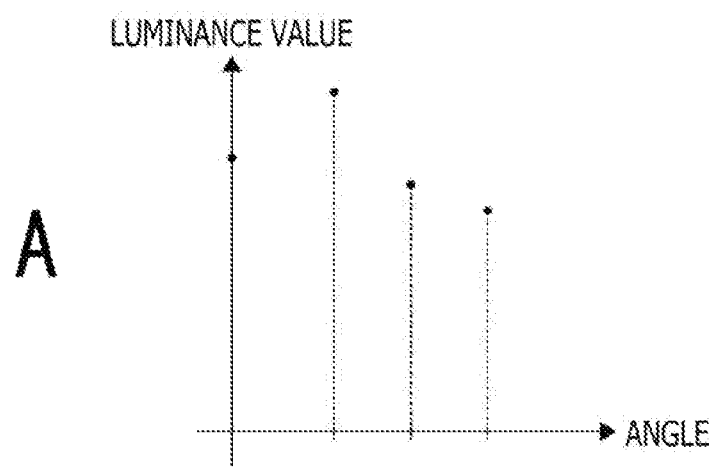
A
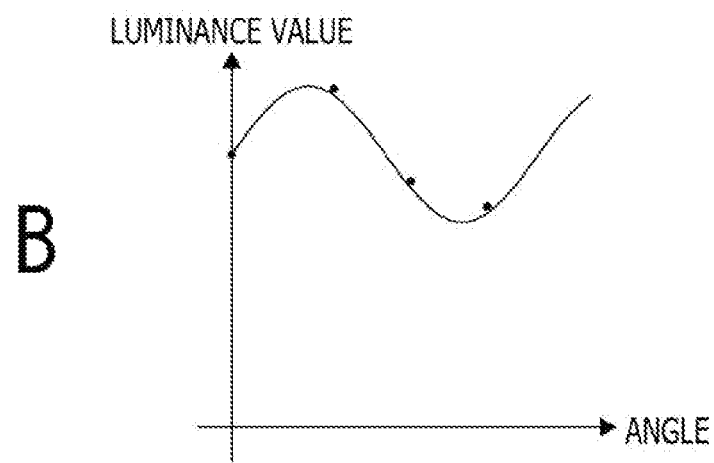
B

FIG.8
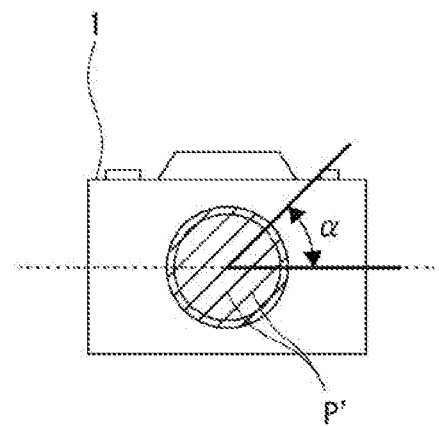
A
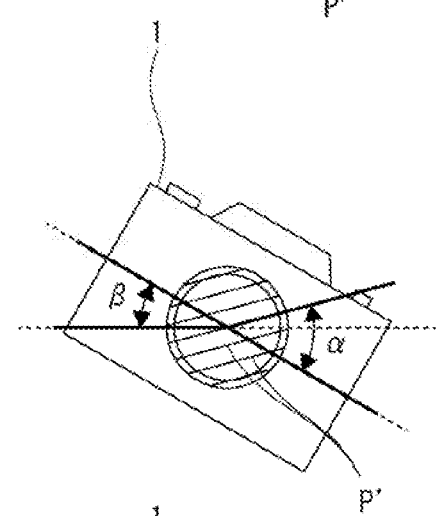
B
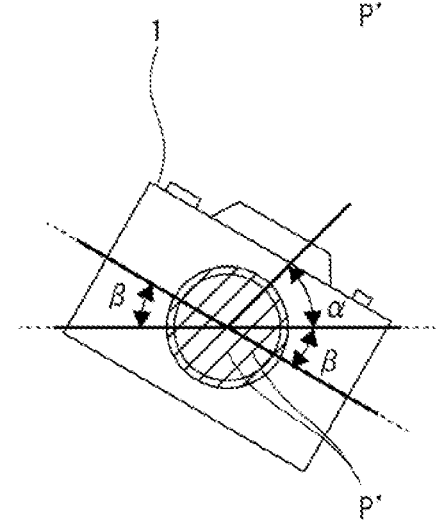
C

FIG.9
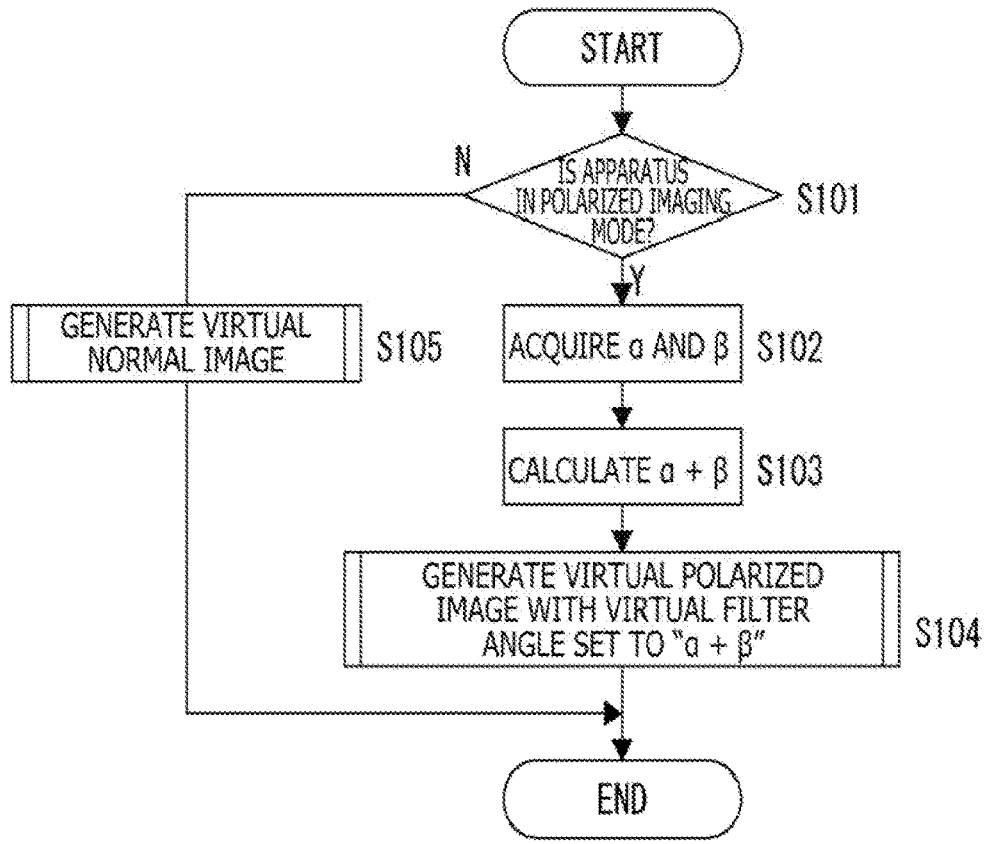
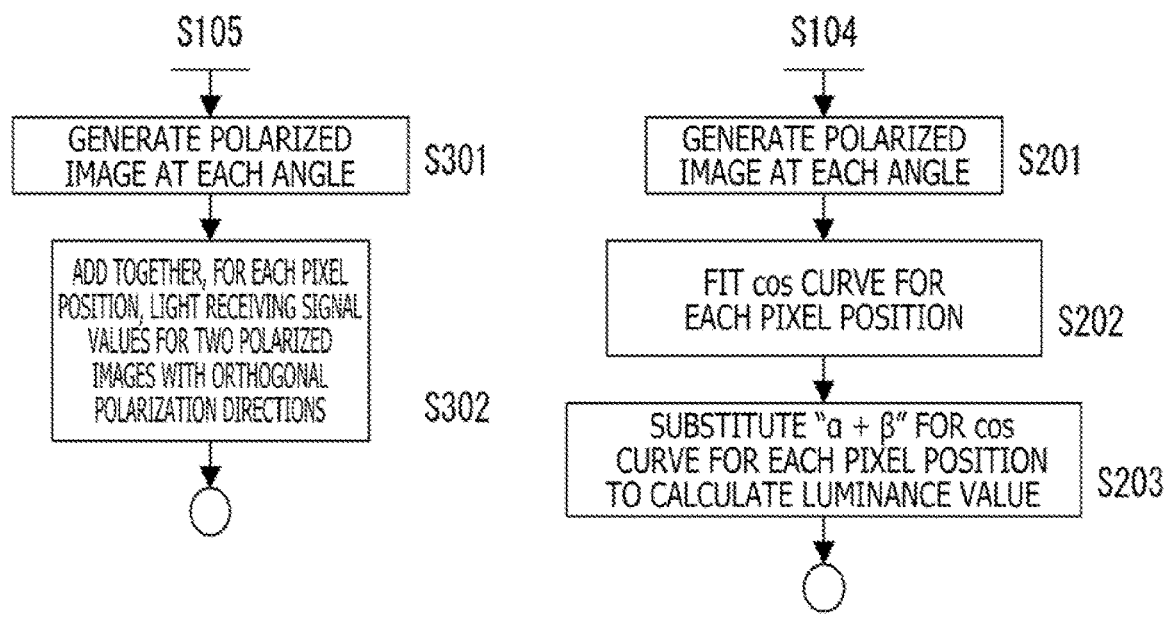

FIG. 10
A
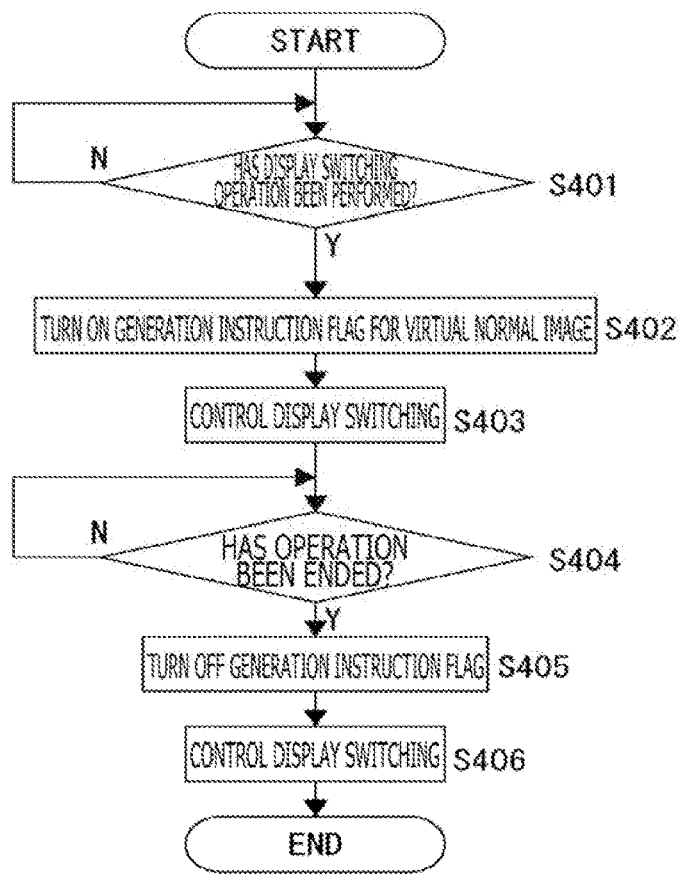
B
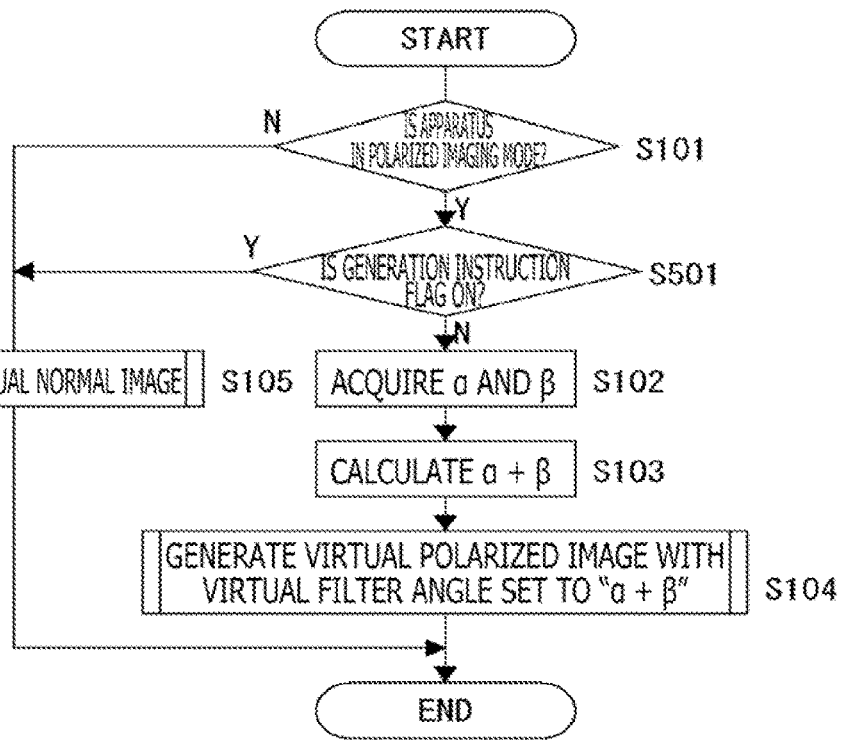

FIG. 12
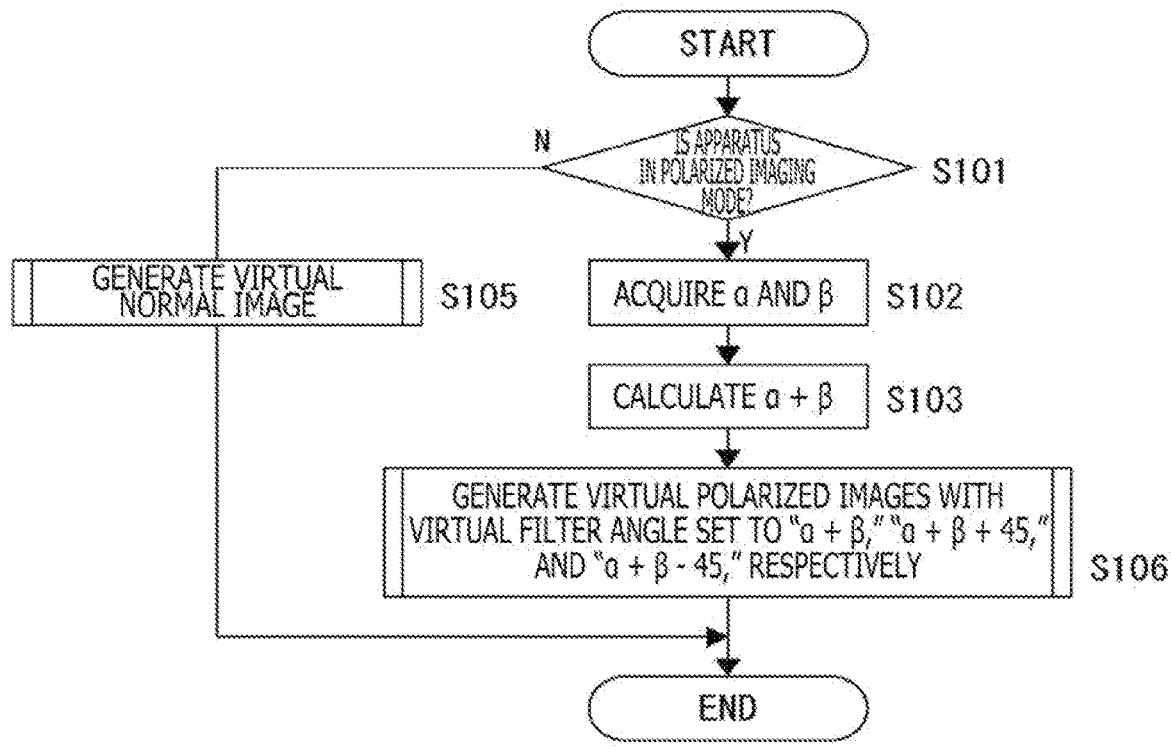
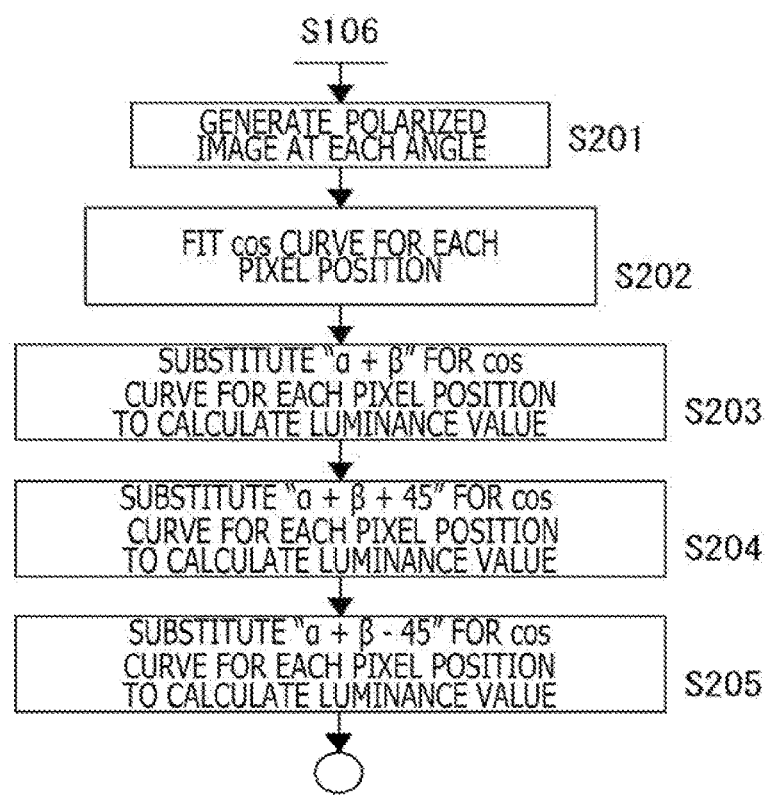

FIG.13
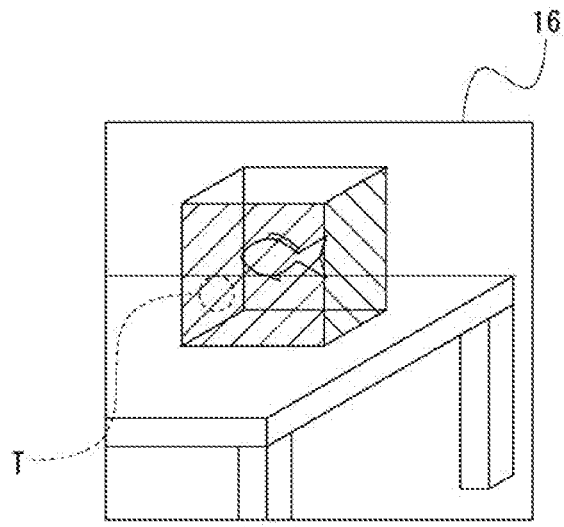
A
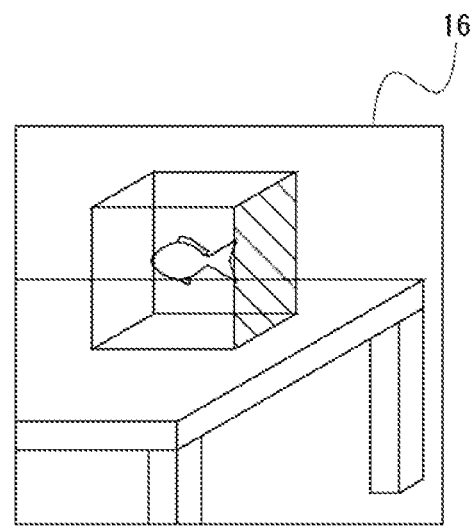
B

FIG. 18
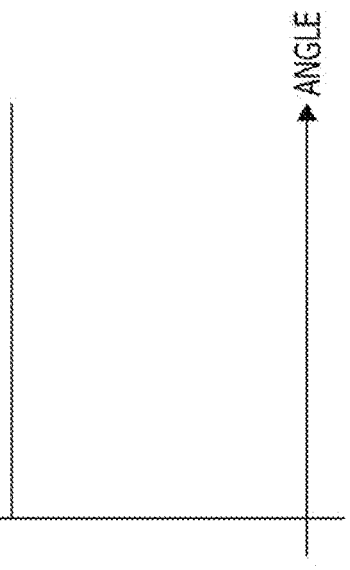
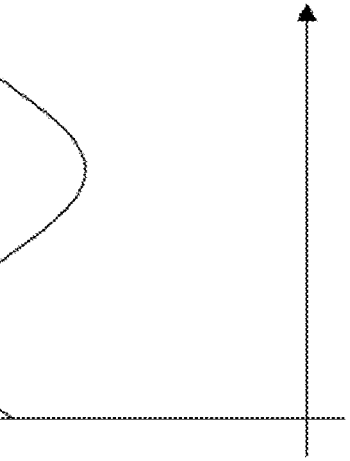
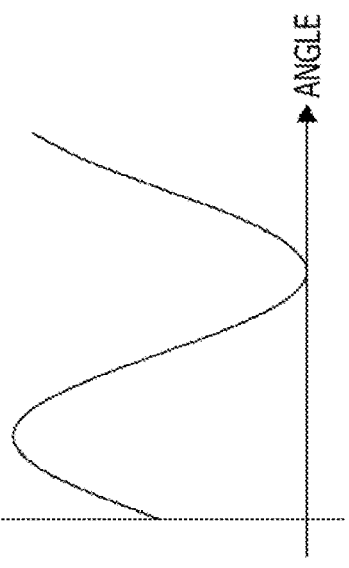

FIG. 22
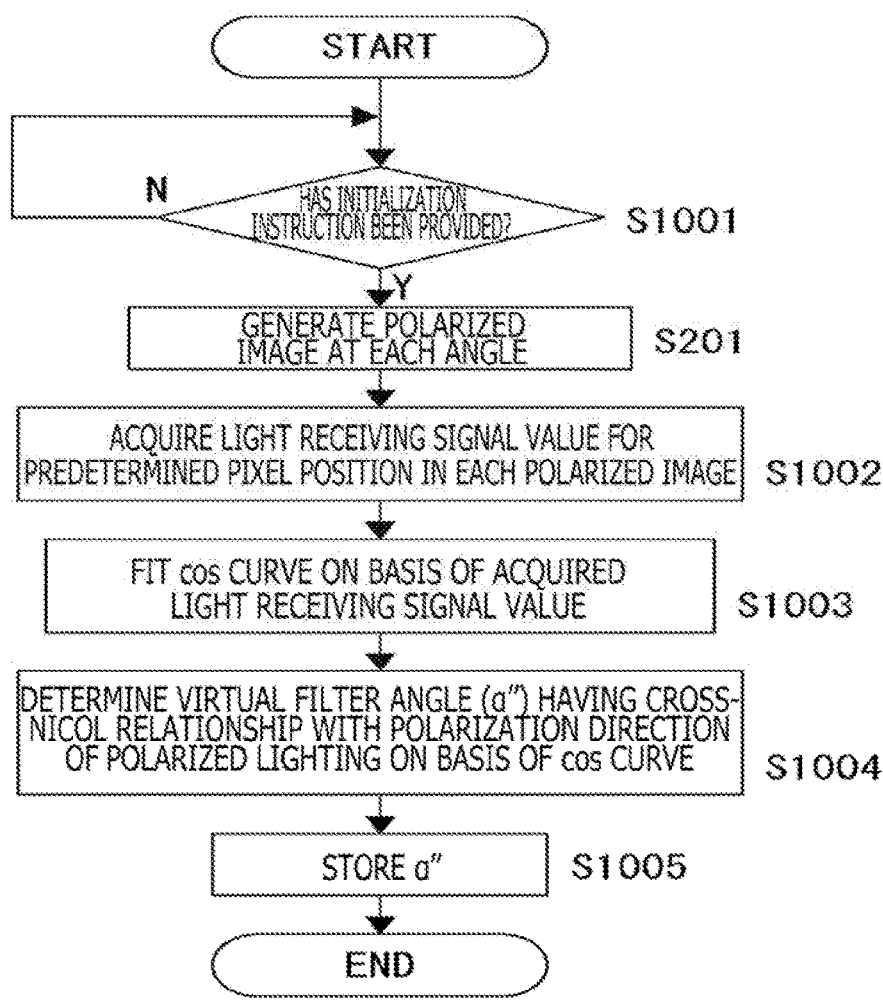
A
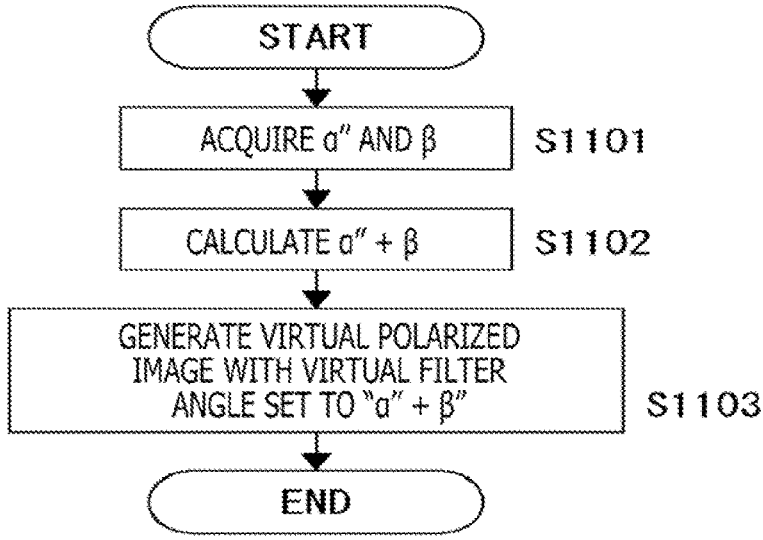
B

FIG.23
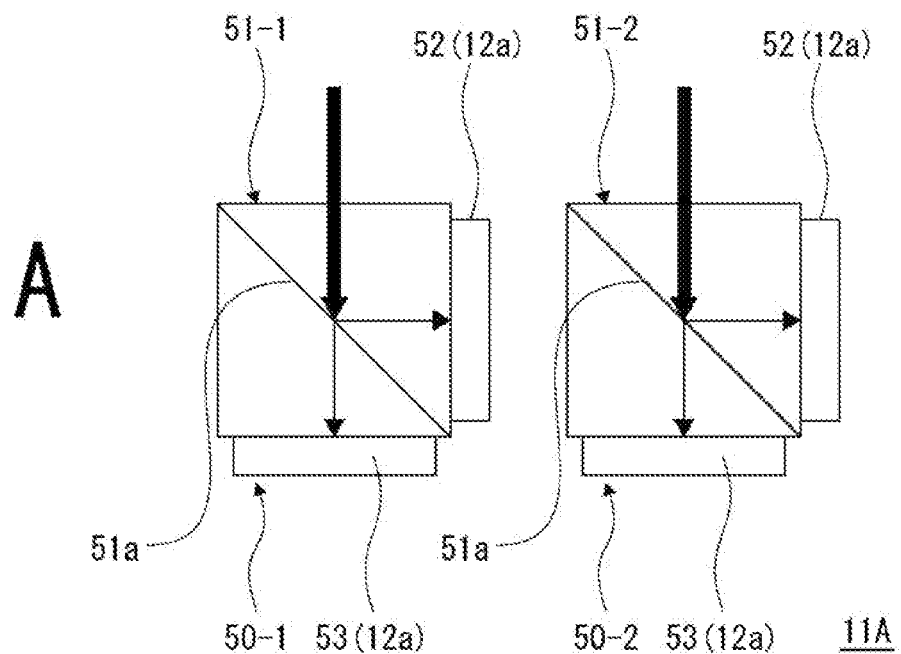
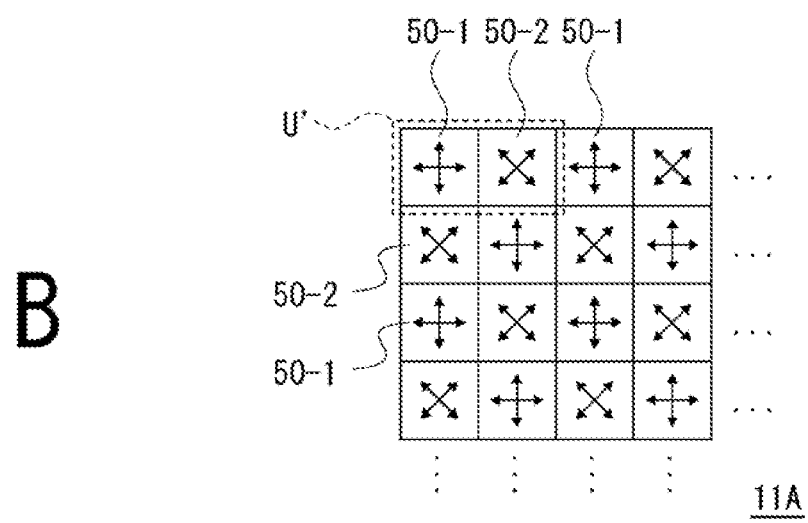

IMAGING APPARATUS AND IMAGE GENERATING METHOD THAT DETECTS AN ORIENTATION OF AN IMAGING SECTION AND GENERATES AN IMAGE CORRESPONDING TO A POLARIZATION DIRECTION CORRESPONDING TO THE ORIENTATION THE IMAGING SECTION

TECHNICAL FIELD

The present technique relates to an imaging apparatus and an image generating method and in particular to a technique suitably applied to a case where signal processing is used to generate a polarized image obtained by selectively receiving linearly polarized light in an optional polarization direction.

BACKGROUND ART

For example, a rotatable polarization filter attached to a lens of an imaging apparatus can be used to inhibit surface reflection from a water surface or glass and to adjust the blueness of the sky. A user can adjust the degree of a filter effect by adjusting a rotation angle of the polarization filter.

Note that an example of the related art is described in PTL 1 listed below.

CITATION LIST

Patent Literature

[PTL 1]
PCT Patent Publication No. WO2008/099589

SUMMARY

Technical Problem

In a case where imaging is performed using a polarization filer as described above, and, for example, the imaging apparatus is rotated from a transverse orientation to a vertical orientation, the polarization filter rotates integrally with the imaging apparatus to change the polarization filter effect produced on a polarized image.

In this case, the rotation angle of the polarization filter needs to be readjusted in order to produce a polarization filter effect similar to that obtained before the change in orientation.

In view of these circumstances, an object of the present technique is to prevent a change in polarization filter effect resulting from a change in the orientation of the imaging apparatus.

Solution to Problem

An imaging apparatus according to the present technique includes an imaging section including a first pixel capable of receiving light in a first polarization direction and a second pixel capable of receiving light in a second polarization direction different from the first polarization direction, a detection section detecting an orientation of the imaging section, and an image generating section generating, on the basis of signals for the first and second pixels, an image corresponding to a polarization direction corresponding to a detection result from the detection section.

This enables generation of, as an image corresponding to a particular polarization direction, that is, an image corresponding to exertion of a polarization filter effect, an image corresponding to a polarization direction corresponding to a change in the orientation of the imaging section.

In the above-described imaging apparatus according to the present technique, the image generating section desirably sets a virtual filter angle corresponding to a rotation angle of a rotatable polarization filter in a case where a captured image is assumed to be obtained by receiving light via the polarization filter, and generates the image on the basis of the virtual filter angle corrected on the basis of the detection result from the detection section.

Accordingly, an image can be obtained that is based on the virtual filter angle and that is corrected to cancel the change in orientation of the imaging section.

In the above-described imaging apparatus according to the present technique, desirably, the imaging section includes a plurality of pixel units arranged in the imaging section and each including a plurality of pixels each including a predetermined number of light receiving elements and a polarization section causing the respective pixels to receive linearly polarized light in different polarization directions, and the image generating section generates, on the basis of light receiving signals for the plurality of pixels included in the pixel unit and function information representing a relationship between the virtual filter angle and light receiving signal values, an image corresponding to a polarization direction corresponding to the virtual filter angle corrected on the basis of the detection result from the detection section.

Accordingly, the polarization filter effect remains unchanged in spite of a change in the orientation of the imaging section.

In the above-described imaging apparatus according to the present technique, desirably, operational input of the virtual filter angle is enabled.

Accordingly, the user can operationally adjust the polarization filter effect.

In the above-described imaging apparatus according to the present technique, the operational input is desirably performed using a rotary operator.

This enables the user to be provided with an operation feeling similar to an operation feeling obtained in a case where the rotatable polarization filter is rotationally operated.

In the above-described imaging apparatus according to the present technique, the image generating section is desirably capable of generating, on the basis of the light receiving signals for the plurality of pixels included in the pixel unit, a virtual polarized image corresponding to an image obtained using the virtual filter angle as an optional angle and a virtual normal image that is an image for which separation of polarized light performed by the polarization section is canceled, and separately generates the virtual polarized image and the virtual normal image depending on an operation.

Accordingly, the user can operationally instruct turning ON/OFF of the polarization filter effect.

The above-described imaging apparatus according to the present technique desirably includes a display control section causing a display section to display a virtual polarized image corresponding to an image obtained by setting the virtual filter angle as an optional angle.

Accordingly, the user can be prompted to check the polarization filter effect. Additionally, in a case where the virtual filter angle can be operationally specified, the user can be prompted to check a change in polarization filter effect in response to operation.

In the above-described imaging apparatus according to the present technique, desirably, the imaging section includes a plurality of pixel units arranged in the imaging section and each including a plurality of pixels each including a predetermined number of light receiving elements and a polarization section causing the respective pixels to receive linearly polarized light in different polarization directions, the image generating section is capable of generating, on the basis of light receiving signals for the plurality of pixels included in the pixel unit, a virtual polarized image corresponding to an image obtained by setting the virtual filter angle as an optional angle and a virtual normal image that is an image for which separation of polarized light performed by the polarization section is canceled, and the display control section switches, on the basis of a predetermined operation performed while any one of the virtual polarized image or the virtual normal image is being displayed on the display section, a display state of the display section from a state where any one of the virtual polarized image or the virtual normal image is displayed to a state where the other of the virtual polarized image or the virtual normal image is displayed.

This allows the user to easily recognize whether or not the polarization filter effect is present.

In the above-described imaging apparatus according to the present technique, the display control section desirably maintains the display state where the other of the virtual polarized image or the virtual normal image is displayed while the predetermined operation is continuing, and switches, in response to end of the predetermined operation, to the display state where any one of the virtual polarized image or the virtual normal image is displayed.

Accordingly, to recover the display state where any one of the virtual polarized image or the virtual normal image is displayed after causing the other of the virtual polarized image or the virtual normal image to be displayed, the user is only required to end the predetermined operation.

In the above-described imaging apparatus according to the present technique, desirably, operational input of the virtual filter angle is enabled, the image generating section generates at least one of an increased-angle image that is the virtual polarized image obtained by setting the virtual filter angle larger than an angle provided by the operational input or a reduced-angle image that is the virtual polarized image obtained by setting the virtual filter angle smaller than the angle provided by the operational input, and the display control section causes the display section to display at least one of the increased-angle image or the reduced-angle image.

Accordingly, the user can be prompted to check how the polarization filter effect is changed in each of a case where the virtual filter angle is increased from a current indicated angle and a case where the virtual filter angle is reduced from the current indicated angle.

In the above-described imaging apparatus according to the present technique, desirably, the operational input of the virtual filter angle is performed using a rotary operator, and the display control section causes, in a case of causing the increased-angle image to be displayed, information related to a rotating direction of the rotary operator and used to increase the virtual filter angle to be displayed at a display position corresponding to the increased-angle image, and causes, in a case of causing the reduced-angle image to be displayed, information related to the rotating direction of the rotary operator and used to reduce the virtual filter angle to be displayed at a display position corresponding to the reduced-angle image.

This allows the user to intuitively understand which direction the rotary operator needs to be rotated in to produce the desired polarization filter effect.

Desirably, the above-described imaging apparatus according to the present technique includes an acceptance section accepting operational designation of a subject, the image generating section is capable of generating, on the basis of the light receiving signals for the plurality of pixels included in the pixel unit and the function information, the virtual polarized image corresponding to an image obtained by setting the virtual filter angle as an optional angle, and the image generating section acquires the function information based on a light receiving signal value for a pixel position receiving light from the designated subject, calculates the virtual filter angle at which the light receiving signal value for the pixel position satisfies a predetermined condition, as a target angle on the basis of the function information, corrects the target angle on the basis of the detection result from the detection section to obtain a corrected angle, and generates the virtual polarized image with the virtual filter angle set to the corrected angle.

Accordingly, by performing an operation of designating the subject, the user can obtain the virtual polarized image adjusted to make a light reflection aspect of the desired subject satisfy a predetermined condition.

In the above-described imaging apparatus according to the present technique, the image generating section desirably calculates, as the target angle, the virtual filter angle at which the light receiving signal for the pixel position is approximately minimized.

Accordingly, by performing an operation of designating the subject, the user can obtain the virtual polarized image adjusted to remove reflection from the desired subject.

The above-described imaging apparatus according to the present technique includes a display control section causing a display section to display a captured image captured by the imaging section, and the acceptance section accepts designation of the subject performed by a touch operation of touching a display screen of the display section.

Accordingly, an operation of designating the subject is facilitated.

Desirably, the above-described imaging apparatus according to the present technique includes a display control section controlling a display section, the image generating section calculates, for each of predetermined pixel positions in the imaging section, a value representing a degree of change in the light receiving signal value in response to a change in the virtual filter angle on the basis of the function information, as a filter effect expected value, and the display control section causes the display section to display an expected value image in which expected value information representing a magnitude of the filter effect expected value is represented for each of the predetermined pixel positions.

Accordingly, the user can preliminarily recognize which position in the image a high filter effect is expected to be produced at.

In the above-described imaging apparatus according to the present technique, the display control section desirably displays the expected value image superimposed on the captured image from the imaging section.

Accordingly, the user can specifically recognize a position where a high filter effect can be expected to be produced, on the basis of a positional relationship with the subject.

In the above-described imaging apparatus according to the present technique, the display control section desirably displays a monochromatic image as the captured image and displays, as the expected value image, an image in a specific color instead of a monochromatic image.

Accordingly, the superimposed display of the captured image and the expected value image suppresses degradation of visibility of the images.

In the above-described imaging apparatus according to the present technique, the image generating section desirably calculates a degree of polarization as the filter effect expected value.

Accordingly, reliability of expected value information can be improved.

In the above-described imaging apparatus according to the present technique, desirably, the imaging section includes a plurality of pixel pairs each including a polarization splitter, a first type of pixel including a predetermined number of light receiving elements each including a light receiving surface substantially orthogonal to an optical axis of reflected light reflected from a separation surface of the polarization splitter, the light receiving surface receiving the reflected light, and a second type of pixel including a predetermined number of light receiving elements each including a light receiving surface substantially orthogonal to an optical axis of transmitted light transmitted through the separation surface, the light receiving surface receiving the transmitted light, and an in-plane angle of a polarization axis of the separation surface of the polarization splitter varies between the pixel pairs in an adjacent relationship In the imaging section described above, one pixel pair (one pixel position) is capable of selectively receiving two types of linearly polarized light with polarization directions in an orthogonal relationship, and two pixel pairs in an adjacent relationship are capable of receiving four types of linearly polarized light with different polarization directions.

Additionally, an image generating method according to the present technique includes an imaging section including a first pixel capable of receiving light in a first polarization direction and a second pixel capable of receiving light in a second polarization direction different from the first polarization direction, and the image generating method includes a step of detecting an orientation of the imaging section, and a step of generating, on the basis of signals for the first and second pixels, an image corresponding to a polarization direction corresponding to a detection result of the detecting step.

Such an image generating method functions similarly to the imaging apparatus according to the above-described present technique.

Advantageous Effect of Invention

According to the present technique, a change in the polarization filter effect in response to a change in the orientation of the imaging apparatus can be prevented.

Note that the effects described herein are not necessarily limited and that any effects described in the present disclosure may be produced.

BRIEF DESCRIPTION OF DRAWINGS

FIG. 1 is a diagram illustrating an example of appearance of an imaging apparatus and a lens apparatus as an embodiment.

FIG. 4 is a descriptive diagram of a structure of an imaging section provided in the imaging apparatus as the embodiment.

FIG. 6 is a descriptive diagram of fitting of a function according to the embodiment.

FIG. 8 is a descriptive diagram of a rotation cancelling method of the embodiment.

FIG. 9 is a flowchart illustrating a processing procedure for implementing the rotation cancelling method as the embodiment.

FIG. 10 is a flowchart illustrating an example of processing for prompting a user to check a polarization filter effect.

FIG. 12 is a flowchart illustrating processing for implementing display of a specified-angle image, an increased-angle image, a reduced angle image, and rotating direction information.

FIG. 13 is a descriptive diagram of a touch mode according to the embodiment.

FIG. 18 is a descriptive diagram of a degree of polarization.

FIG. 22 is a flowchart illustrating processing for generating a virtual polarized image according to the modified example.

FIG. 23 is a descriptive diagram of a structure of an imaging section as a modified example.

DESCRIPTION OF EMBODIMENTS

Figure 2:
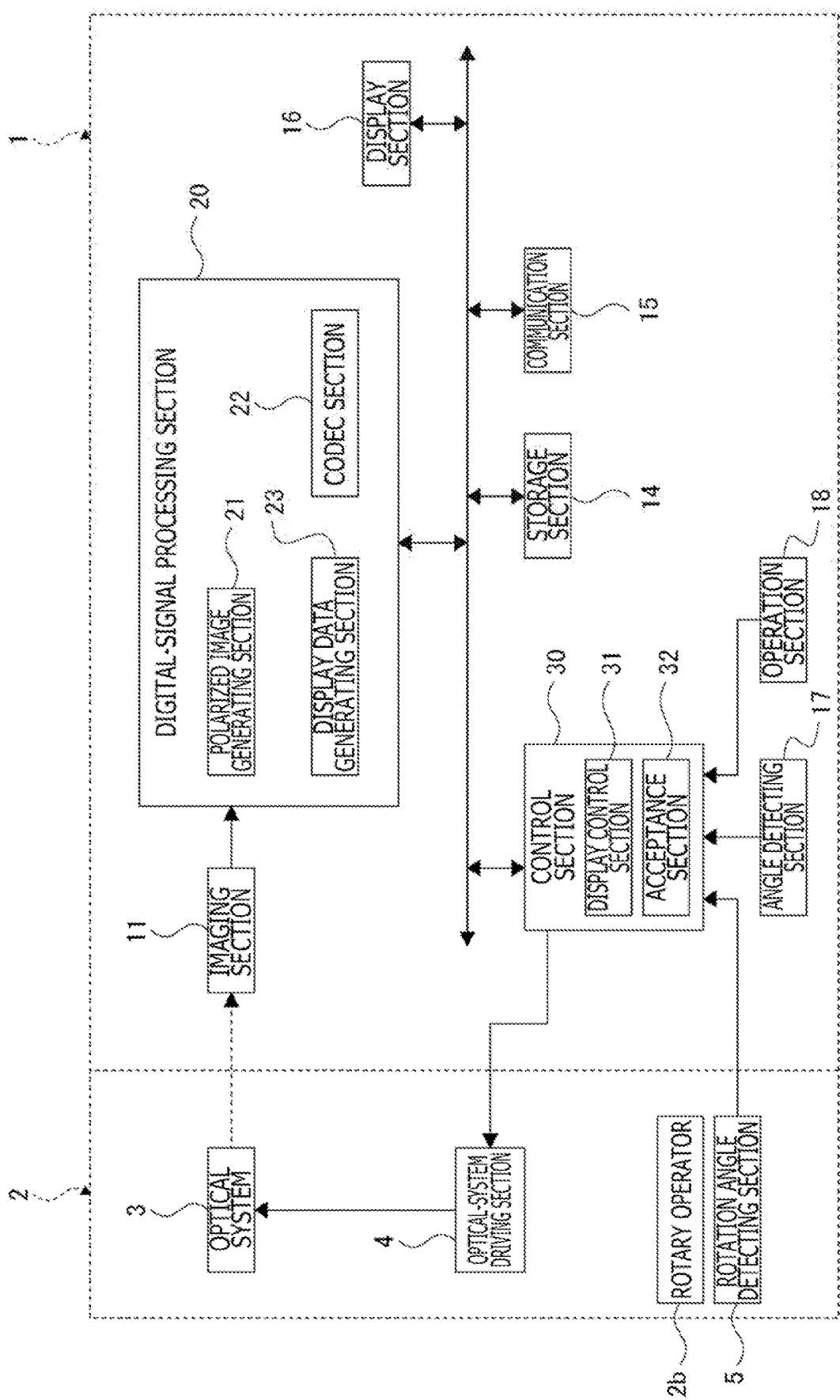
FIG. 2 is a block diagram illustrating an internal configuration of the imaging apparatus as the embodiment.

With reference to the attached drawings, embodiments according to the present disclosure will be described below in the following order.

<1. Imaging Apparatus of Embodiment>
[1-1. Outline of Configuration of Imaging Apparatus]
[1-2. Polarization Filter Effect]
[1-3. Rotation Cancelling Method]
[1-4. Processing Procedure]
[1-5. Check of Polarization Filter Effect]
[1-6. Improvement of Monitor Display]
[1-7. Touch Mode]
[1-8. Expected Value Display Mode]
<2. Modified Examples>
[2-1. First Modified Example]
[2-2. Second Modified Example]
<3. Applied Example>
<4. Conclusion of Embodiment>
<5. Other Modified Examples>
<6. Present Technique>

1. Imaging Apparatus of Embodiment 1-1. Outline of Configuration of Imaging Apparatus FIG. 1 illustrates an example of appearance of an imaging apparatus 1 and a lens apparatus 2 as an embodiment according to the present technique.

The imaging apparatus 1 of the present embodiment is an lens-replaceable imaging apparatus. FIG. 1 illustrates an example of appearance of the imaging apparatus 1 in which the lens apparatus 2 is mounted. FIG. 1A and FIG. 1B are schematic appearance diagrams of the imaging apparatus 1 as viewed from the front side and the right side, respectively.

Here, a forward, a rearward, an upward, a downward, a leftward, and a rightward directions of the imaging apparatus are hereinafter defined as follows.

The forward direction aligns with an imaging direction of the imaging apparatus (direction toward a subject). The rearward direction is opposite to the forward direction.

The upward, downward, leftward, and rightward directions are defined on the basis of a vertical direction and a horizontal direction (horizontal line direction) in a captured image obtained by the imaging apparatus. Specifically, the upward, downward, leftward, and rightward directions are defined when the imaging apparatus is oriented such that the top-and-bottom direction and horizontal direction of the subject in the captured image align with the vertical direction and horizontal direction of the captured image.

In the present example, the leftward and rightward directions are defined on the basis of a viewpoint of a user. That is, the leftward and rightward directions align with the leftward and rightward directions of the imaging apparatus as viewed from behind.

In FIG. 1A, directions toward a reader and away from the reader with respect to the sheet of the drawing align with the forward and rearward directions of the imaging apparatus 1. The upward and downward directions of the sheet of the drawing align with the upward and downward directions of the imaging apparatus 1. The leftward and rightward directions of the sheet of the drawing align with the rightward and leftward directions of the imaging apparatus 1.

The imaging apparatus 1 in the present example is configured as, for example, a lens-interchangeable mirrorless single-lens type digital camera apparatus internally including an imaging element 12 (not illustrated in FIG. 1), for example, a CCD (Charge Coupled Device) sensor or a CMOS (Complementary Metal-Oxide Semiconductor) sensor.

The imaging apparatus 1 is provided with a shutter button 1a, a button operator 1b and the like other than the shutter button 1a, and operators with which a user provides various inputs.

In the lens apparatus 2, a cover lens 2a is disposed at a front end portion of the lens apparatus 2 to guide light from a subject to an imaging surface of the imaging element 12 in the imaging apparatus 1 via the cover lens 2a.

Additionally, the lens apparatus 2 in the present example is provided with a rotary operator 2b rotationally operated and serving as, for example, an operation ring. In the present example, the rotary operator 2b has an outer diameter approximately equal to the outer diameter of a lens barrel of the lens apparatus 2, and is positioned near the front end portion of the lens apparatus 2.

FIG. 2 is a block diagram illustrating an internal configuration of the imaging apparatus 1 and depicts an internal configuration of the lens apparatus 2 along with the internal configuration of the imaging apparatus 1.

First, in addition to the above-described rotary operator 2b, the lens apparatus 2 includes an optical system 3, an optical-system driving section 4, and a rotation angle detecting section 5.

The optical system 3 includes various lenses such as the above-described cover lens 2a, a zoom lens not illustrated, and a focus lens, and a diaphragm mechanism. The optical system 3 focuses light from a subject onto the imaging surface of the imaging element 12.

The optical-system driving section 4 drives the focus lens in the optical system 3 to perform a focus operation on the basis of control of a control section 30, described below, in the imaging apparatus 1. Additionally, the optical-system driving section 4 drives the diaphragm mechanism in the optical system 3 to perform exposure adjustment on the basis of control of the control section 30. Furthermore, the optical-system driving section 4 drives the zoom lens in the optical system 3 to perform zoom operations on the basis of control of the control section 30.

The rotation angle detecting section 5 detects a rotation angle of the rotary operator 2b. The rotation angle detecting section 5 is connected to the control section 30 in the imaging apparatus 1, and the control section 30 can acquire rotation angle information related to the rotary operator 2b.

The imaging apparatus 1 includes an imaging section 11, a storage section 14, a communication section 15, a display section 16, an angle detecting section 17, an operation section 18, a digital-signal processing section 20, and the control section 30.

The imaging section 11 includes the imaging element 12, executes, for example, CDS (Corrected Double Sampling) processing and AGC (Automatic Gain Control) processing on an electric signal obtained by photoelectric conversion in the imaging element 12, and further executes A/D (Analog/Digital) conversion processing on the electric signal. The imaging section 11 then outputs an imaging signal as digital data to the succeeding digital-signal processing section 20.

Note that a structure of the imaging section 11 in the present embodiment will be described below.

Here, "captured image" as used herein is assumed to widely mean images obtained on the basis of imaging. That is, the term "captured image" is assumed to include not only images obtained by the imaging section 11 (a set of light receiving signal values for respective pixels) but also images generated from the image via necessary signal processing (for example, a first to a fourth polarized images, a virtual polarized image, and a virtual normal image described below).

Additionally, "imaging" as used herein is assumed to mean operations performed until light receiving signals are obtained in the imaging element 12.

The digital-signal processing section 20 is configured as an image processor using, for example, a DSP (Digital Signal Processor). The digital-signal processing section 20 executes various types of signal processing on digital signals (captured image data) from the imaging section 11.

The digital-signal processing section 20 in the present embodiment includes at least a polarized image generating section 21, a codec section 22, and a display data generating section 23.

The polarized image generating section 21 generates a virtual normal image and a virtual polarized image described below, on the basis of digital signals from the imaging section 11. Note that processing executed by the polarized image generating section 21 will be further described below.

The codec section 22 executes, for example, coding processing for recording and communication, on image data generated by the polarized image generating section 21.

Under the control of the control section 30, the display data generating section 23 generates display data to be output to the display section 16, the display data serving as, for example, a through image. The display data serving as a through image is basically data for each frame corresponding to captured image data with a resolution of the image converted.

Additionally, on the basis of instructions of the control section 30, the display data generating section 23 executes processing of causing the display section 16 to display various guide images, character images, operation images, and the like such that, for example, the image is superimposed on an image such as a through image.

Note that, in FIG. 2, the display data generating section 23 is illustrated as a functional configuration executed by the digital-signal processing section 20 but that this is illustrative and the processing may be executed by the control section 30.

The control section 30 includes a microcomputer (arithmetic processing apparatus) including a CPU (Central Processing Unit), a ROM (Read Only Memory), a RAM (Random Access Memory), and a flash memory.

The CPU executes programs stored in the ROM, the flash memory, and the like to integrally control the entire imaging apparatus 1.

The RAM is used as a work area during processing of various data in the CPU to temporarily store data, programs, and the like.

The ROM and the flash memory (nonvolatile memory) are used to store an OS (Operating System) used for the CPU to control each section, contents files such as image files, application programs for various operations, firmware, and the like.

The control section 30 as described above controls operations of the necessary sections such as instructions for various types of signal processing in the digital-signal processing section 20, an imaging operation and a recording operation corresponding to an operation by the user, a reproduction operation for recorded image files, camera operations such as zooming, focusing, and exposure adjustment, and user interface operations.

Additionally, the control section 30 functions as a display control section 31. The display control section 31 provides control to cause the display section 16 to display various images such as through images generated by the display data generating section 23.

Furthermore, the control section 30 functions as an acceptance section 32. The acceptance section 32 accepts designation of the subject provided by a predetermined operation such as an operation of a touch panel formed in the display section 16 as described below.

Note that the display control section 31 and the acceptance section 32 will be further described below.

The display section 16 provides various types of display to the user (photographer or the like), and includes a display device, for example, an LCD (Liquid Crystal Display) or an organic EL (Electro-Luminescence) display that is formed on a housing of the imaging apparatus 1. Note that the display section 16 may be formed as what is called a view finder using an LCD, an organic EL display, or the like.

The display section 16 includes the above-described display device and a display driver causing the display device to provide display. The display driver causes various types of display to be provided on the display device on the basis of instructions from the control section 30. For example, the display driver causes still images or moving images captured and recorded in a recording medium to be reproduced and displayed and causes through images based on display data from the display data generating section 23 to be displayed on a screen of the display device. Additionally, the display section 16 provides, on the screen, display of various operation menus, icons, messages, guide displays, and the like, that is, display of a GUI (Graphical User Interface). Additionally, the display driver can cause a necessary image to be superimposed on a through image for display.

The angle detecting section 17 includes predetermined sensors such as a gyro sensor (angle speed sensor) and an acceleration sensor that are used to detect the orientation of the apparatus, that is, the imaging apparatus 1. The angle detecting section 17 detects at least a rotation angle of the apparatus in a plane substantially orthogonal to the imaging direction (hereinafter, referred to as "apparatus rotation angle").

The angle detecting section 17 in the present example performs detection on the assumption that a state where the imaging apparatus 1 is upright, that is, a state where an up-down direction of the imaging apparatus 1 is substantially aligns with a top-and-bottom direction of the imaging apparatus 1 corresponds to the apparatus rotation angle=0 deg.

Information related to the apparatus rotation angle detected by the angle detecting section 17 is transmitted to the control section 30. The control section 30 can perform various types of control using the information related to the apparatus rotation angle. In particular, in the present example, the information related to the apparatus rotation angle is acquired by the digital-signal processing section 20 (polarized image generating section 21) and used for processing as an embodiment described below.

Note that the apparatus rotation angle can be detected, for example, by image processing executed by the digital-signal processing section 20. The detection can be performed by, for example, signal processing of extracting a plurality of feature points from a captured image of each frame from the imaging section 11 and detecting rotation of the feature points.

Additionally, in the present example, it is assumed that the orientation of the imaging section 11 is changed integrally with the orientation of the imaging apparatus 1, and the apparatus rotation angle of the imaging apparatus 1 is detected. However, for implementation of a rotation cancelling method described below, it is sufficient that, as the rotation angle (rotation angle in a plane substantially orthogonal to the imaging direction), the rotation angle of the imaging section 11 (imaging element 12) is detected.

The operation section 18 includes an input function to input an operation by the user, and transmits, to the control section 30, a signal corresponding to the input operation.

The operation section 18 is implemented as, for example, various operators provided on the housing of the imaging apparatus 1 and the touch panel formed on the display section 16. The operators on the housing include various operators such as a cross key and a slide key, in addition to the above-described shutter button 1a and button operator 1b.

The storage section 14 includes, for example, a nonvolatile memory, and functions as a storage area for storing image files (content files) such as still image data and moving image data, attribute information related to the image files, and thumbnail images.

The image files are stored in formats, for example, JPEG (Joint Photographic Experts Group), TIFF (Tagged Image File Format), and GIF (Graphics Interchange Format) Various actual forms of the storage section 14 are possible. For example, the storage section 14 may be a flash memory built into the imaging apparatus 1 or may be in a form including a memory card (for example, a portable flash memory) that can be installed in and removed from the imaging apparatus 1 and a card recording and reproducing section accessing the memory card for recording and reproduction. Alternatively, the storage section 14 built into the imaging apparatus 1 may be implemented as an HDD (Hard Disk Drive) or the like.

The communication section 15 performs data communication or network communication with external equipment.

The communication section 15 communicates with, for example, an external display apparatus, recording apparatus, or reproducing apparatus to transmit and receive captured image data (still image files or moving image files) to and from such an apparatus.

Alternatively, the communication section 15 serves as a network communication section to perform communication via various networks, for example, the Internet, a home network, and a LAN (Local Area Network) to transmit and receive various data to and from a server, a terminal, or the like on the network.

1-2. Polarization Filter Effect

Figure 3:
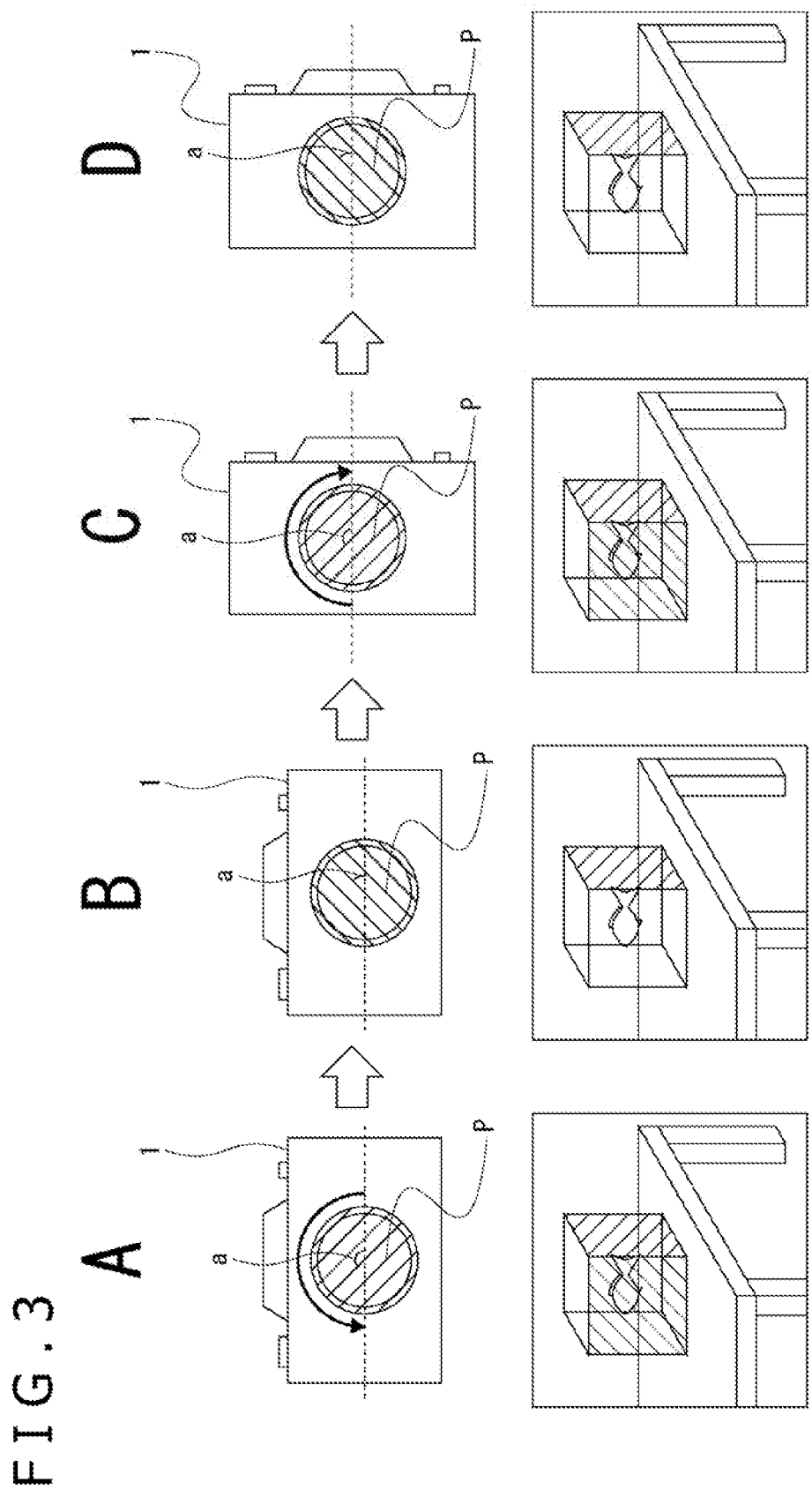
FIG. 3 is a descriptive diagram of a polarization filter effect produced in a case where imaging is performed by a common imaging apparatus via a rotatable polarization filter.

FIG. 3 is a diagram of a polarization filter effect produced in a case where imaging is performed by a common imaging apparatus via a rotatable polarization filter.

FIG. 3 schematically represents a polarization axis P of the polarization filter. Additionally, a transverse dashed line in FIG. 3 schematically represents a horizontal line.

For example, a state where an angle α between the polarization axis P and the horizontal line is equal to an angle illustrated in FIG. 3A is considered to be a reference. In a case where the polarization filter in the state in FIG. 3A is rotated in the direction of an arrow in FIG. 3A, the polarization axis P is also rotated as illustrated in FIG. 3B to change an angle a. In the present example, when the polarization axis P is at the angle a in FIG. 3B, reflection from certain subjects in the captured image is reduced compared to the reflection in FIG. 3A.

In FIG. 3A and FIG. 3B, the imaging apparatus is in a transverse orientation. It is assumed that the state in FIG. 3B is changed to a state in FIG. 3C where the imaging apparatus is in a vertical orientation. In a case where such a change in orientation occurs, the angle a between the polarization axis P and the horizontal axis changes, and thus the polarization filter effect in the captured image is changed. Here, a case is illustrated where the change in orientation in FIG. 3C makes the angle a similar to that in FIG. 3A. The captured image in FIG. 3C substantially matches the captured image in FIG. 3A (the polarization filter effect is substantially equal).

Given that the polarization filter effect produced in FIG. 3B is desired by the user, in a case where the user changes the orientation illustrated in FIG. 3B to the orientation illustrated in FIG. 3C, the user is forced to rotate the polarization filter again to make the angle a equal to the angle a in FIG. 3B (see FIG. 3D) That is, even though the user has adjusted the rotation angle of the polarization filter so as to produce the polarization filter effect desired by the user, the user is forced to perform an adjustment operation again.

Such a situation is not desirable because an unwanted operational burden is imposed on the user.

Thus, in the present embodiment, a change in polarization filter effect is prevented that is caused by rotation of the imaging apparatus.

FIG. 4 is a diagram illustrating a structure of the imaging section 11 provided in the imaging apparatus 1. FIG. 4A is a schematic vertical cross-sectional view, and FIG. 4B is a schematic front view.

In the imaging section 11, an optical member 13 is disposed on an imaging surface of the imaging element 12. In the imaging element 12, a plurality of light receiving elements 12a is arranged two-dimensionally (in the vertical direction and the transverse direction). In the optical member 13, polarization filters 13a are formed on the respective light receiving elements 12a and are each positioned on a light receiving surface of the corresponding light receiving element 12a.

In FIG. 4B, directions of polarization axes of the respective polarization filters 13a are schematically illustrated by double-headed arrows. As seen from the double-headed arrows, four types of polarization filters 13a are used that have different polarization axes with a difference in angle of 45 deg.

It is hereinafter assumed that the transverse direction of the sheet of the drawing, that is, the transverse direction (horizontal line direction) of the imaging element 12, aligns with the horizontal direction (horizontal line). The angle of the polarization axis expressed by a transverse double-headed arrow is represented as "0 deg." The angle of the polarization axis expressed by a vertical double-headed arrow is represented as "90 deg." The angle of the polarization axis expressed by a right upward (left downward) double-headed arrow is represented as "45 deg." The angle of the polarization axis expressed by a left upward (right downward) double-headed arrow is represented as "135 deg."

In the imaging element 12, each of the light receiving elements 12a (in other words, in the present example, each of pixels) selectively receives linearly polarized light at an angle equal to the angle of the polarization axis of the corresponding polarization filter 13a disposed on the light receiving surface.

In the present example, 2×2=4 light receiving elements 12a constitute one pixel unit U, and in the pixel unit U, the polarization filters 13a on the respective light receiving elements 12a have different polarization axes with a difference in angle of 45 deg.

In the imaging section 11, a plurality of such pixel units U is arranged in the vertical direction and the transverse direction.

By using the imaging section 11 capable of selectively receiving linearly polarized light with different polarization directions as described above, information related to polarization can be obtained.

Specifically, by using a plurality of light receiving signal values for individually received linearly polarized light with different polarization directions, a function can be determined that represents a relationship between the angle of the polarization axis of the polarization filter and the light receiving signal value (luminance value) obtained by the light receiving element 12a. This means that, in a case where the captured image is assumed to be obtained by receiving light via the rotatable polarization filter, the function is determined that represents the relationship between the rotation angle of the polarization filter and the light receiving signal value (luminance value).

Here, the rotation angle of the polarization filter obtained in a case where the captured image is assumed to be obtained by receiving light via the rotatable polarization filter is hereinafter referred to as the "virtual filter angle." Additionally, the above-described function is hereinafter referred to as the "function F."

The function F is specifically a cos curve. The use of a cos curve allows determination of a light receiving signal value obtained in a case where the virtual filter angle is set to an optional value. That is, an image with an optional polarization filter effect applied to the image can be obtained.

Additionally, in a case where the imaging section 11 as described above is used, by adding light receiving signal values for two types of linearly polarized light with different polarization directions with a difference in angle of 90 deg, a captured image can be obtained for which separation of polarized light performed by the optical member 13 is cancelled, that is, an image can be obtained that corresponds to a normal captured image with a zeroed polarization filter effect.

The image corresponding to a normal captured image with a zeroed polarization filter effect is hereinafter referred to as the "virtual normal image."

Figure 7:
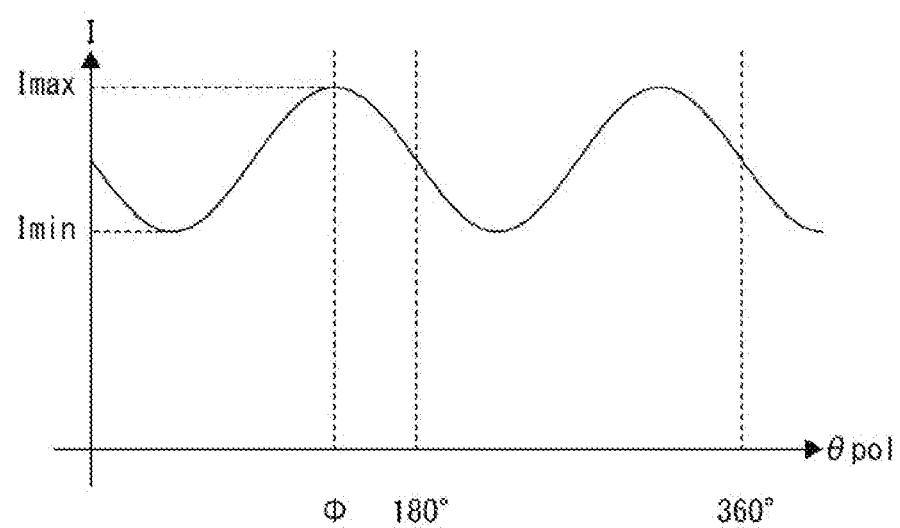
FIG. 7 is a descriptive diagram of an example of a function according to the embodiment.

Generation of a virtual normal image and fitting of the function F performed by the polarized image generating section 21 illustrated in FIG. 2 will be described with reference to FIGS. 5 to 7.

Figure 5:
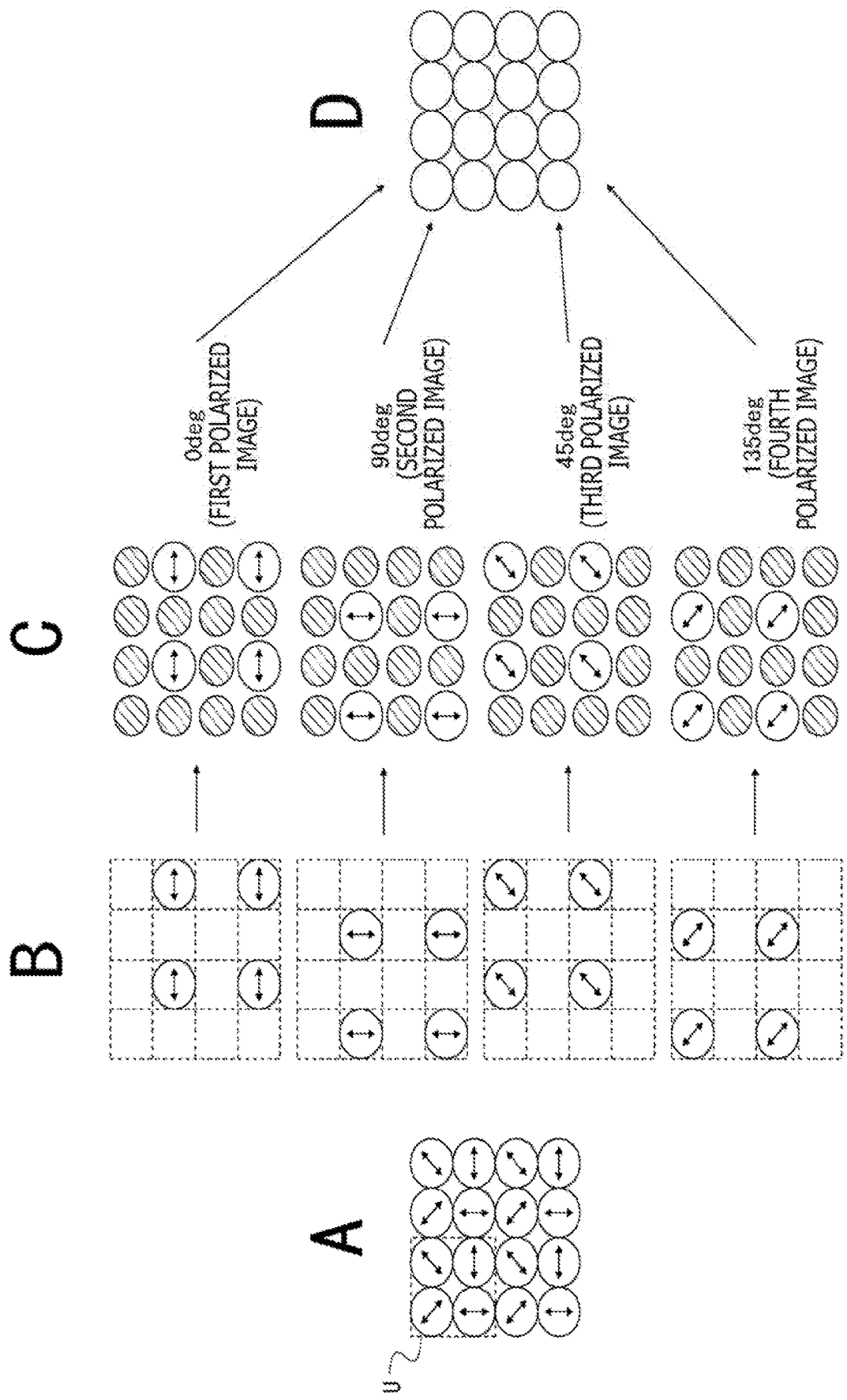
FIG. 5 is a descriptive diagram of a method for generating a virtual normal image according to the embodiment.

FIG. 5 is a descriptive diagram of a method for generating a virtual normal image.

In FIG. 5A, a pixel array in the imaging section 11 is schematically represented along with the angle of the polarization axis of each polarization filter 13a.

First, as described below, cos curve fitting in the present example is based on the assumption that light receiving signal values for four types of linearly polarized light at 0 deg, 90 deg, 45 deg, and 135 deg are obtained for the respective pixel positions.

On the other hand, in the imaging section 11, the pixels included in the polarization filter 13a and having polarization axes at 0 deg, 90 deg, 45 deg, and 135 deg are intermittently arranged in the vertical and transverse directions as illustrated in FIG. 5B, and this prevents acquisition, for the pixel positions, of the light receiving signal values for the four types of linearly polarized light unless any action is taken.

Thus, for the linearly polarized light at 0 deg, 90 deg, 45 deg, and 135 deg, light receiving signal values for pixel positions where the light receiving signal values are missing are interpolated using the light receiving signal values for the pixels receiving the corresponding linearly polarized light as illustrated in FIG. 5C. This leads to generation of an image corresponding to selective reception, for each pixel position, of linearly polarized light at 0 deg (hereinafter, referred to as the "first polarized image") an image corresponding to selective reception, for each pixel position, of linearly polarized light at 90 deg (hereinafter, referred to as the "second polarized image"), an image corresponding to selective reception, for each pixel position, of linearly polarized light at 45 deg (hereinafter, referred to as the "third polarized image"), and an image corresponding to selective reception, for each pixel position, of linearly polarized light at 135 deg (hereinafter, referred to as the "fourth polarized image").

As described above, the virtual normal image is obtained by adding light receiving signal values for two types of linearly polarized light with different polarization directions with a difference in angle of 90 deg.

Specifically, the virtual normal image is obtained by adding, to the light receiving signal value for each pixel position in the first polarized image, the light receiving signal value for the same pixel position in the second polarized image, or adding, to the light receiving signal value for each pixel position in the third polarized image, the light receiving signal value for the same pixel position in the fourth polarized image.

FIG. 5D schematically represents that a virtual normal image is thus generated from the first polarized image and the second polarized image, or the third polarized image and the fourth polarized image.

FIG. 6 is a descriptive diagram of fitting of the function F (cos curve). FIG. 6A illustrates an example of light receiving signal values (luminance values) for four types of linearly polarized light obtained for certain pixel positions in the imaging section 11. FIG. 6B illustrates a relationship between the four light receiving signal values (luminance values) and the cos curve.

FIG. 6A and FIG. 6B indicate that the light receiving signal values for the four types of linearly polarized light are obtained for the respective pixel positions, enabling cos curve fitting.

The cos curve as the function F is expressed by [Equation 1]:

[Math. 1]

$$l = \frac{l_{max} + l_{min}}{2} + \frac{l_{max} - l_{min}}{2}\cos(2\theta_{pol} - 2\phi) \quad \text{[Equation 1]}$$

where "l" is a light receiving signal value, "lmax" and "lmin" are a maximum value and a minimum value of the light receiving signal value, "θpol" is a virtual filter angle, and "φ" is an offset of "θpol."

[Equation 1] can be converted into [Equation 2] below.

[Math. 2]

$$y = A\cos((\pi/2)*n - 2\varphi) + c$$

$$n = 0,1,2,3 \quad \text{[Equation 2]}$$

In [Equation 2], "A" is an amplitude, "φ" is a phase shift from an origin, and "c" is an offset of "y."

Cos curve fitting is performed using four light receiving signal values resulting from reception of linearly polarized light at 0 deg, 90 deg, 45 deg, and 135 deg, by the least-squares method based on "Equation 3" below. That is, "y" minimizing "J" is determined.

[Math. 3]

$$J = \Sigma\{(\ln - y)^2\} \quad \text{[Equation 3]}$$

In [Equation 3], "ln" is a measured value, that is, each of the light receiving signal values for linearly polarized light at 0 deg, 90 deg, 45 deg, and 135 deg obtained for target pixel positions.

A cos curve is obtained by fitting, to the measured value, "y" minimizing "J" determined by "Equation 3" described above.

Once a cos curve is fitted, substituting the value of an optional virtual filter angle for the cos curve leads to, for the target pixel position, a light receiving signal value (luminance value for the pixel position) resulting from reception of light by the light receiving element 12a via the polarization filter at an optional rotation angle. Note that, in [Equation 2], a term corresponding to the "virtual filter angle" is "$(\pi/2)*n$".

By performing, for each pixel position, cos curve fitting as described above and the calculation of the luminance value using the cos curve and the optional virtual filter angle, an image can be obtained that corresponds to an image obtained by performing imaging by the imaging element 12 via the polarization filter at the optional rotation angle.

As described above, an image generated on the basis of the cos curve fitted as described above and the optional virtual filter angle is referred to as the "virtual polarized image."

The polarized image generating section 21 uses the method as described above to generate a virtual polarized image and a virtual normal image on the basis of the light receiving element for each light receiving element 12a.

Note that, in the above description, the example has been taken where the first polarized image, the second polarized image, the third polarized image, and the fourth polarized image are generated to prevent a decrease in the resolution of the virtual polarized image but that, with the pixel units U considered to include the same pixel positions, cos curve fitting based on the four types of light receiving signal values can be performed for each pixel unit U.

Additionally, for the cos curve fitting, the use, for each pixel position, of the light receiving signal values for the four types of linearly polarized light is not essential, and the fitting can be achieved using light receiving signal values for at least three types of linearly polarized light. In the present example, the light receiving signal values for the four types of linearly polarized light are used for each pixel position, and the fitting is performed using the least-squares method as described above. Thus, accurate fitting is achieved with noise resistance improved.

In the imaging apparatus 1 of the present embodiment, a polarized imaging mode and a normal imaging mode can be switched on the basis of an operation by the user. In the polarized imaging mode, a virtual polarized image is generated on the basis of a signal obtained by the imaging section 11, and in the normal imaging mode, virtual normal image is generated on the basis of a signal obtained by the imaging section 11. Specifically, the control section 30 switches a mode between the polarized imaging mode and the normal imaging mode on the basis of a predetermined operation, for example, an operation of the button operator 1b illustrated in FIG. 1.

During the polarized imaging mode, the display control section 31 in the control section 30 controls the display data generating section 23 to cause the display section 16 to display, as a through image, a virtual polarized image generated by the polarized image generating section 21.

Additionally, during the normal imaging mode, the display control section 31 in the control section 30 controls the display data generating section 23 to cause the display section 16 to display, as a through image, a virtual normal image generated by the polarized image generating section 21.

Additionally, in the present embodiment, the rotary operator 2b provided on the lens apparatus 2 functions as an indication input operator for a virtual filter angle used to generate a virtual polarized image.

Specifically, during the polarized imaging mode, the control section 30 sequentially acquires information related to the rotation angle of the rotary operator 2b detected by the rotation angle detecting section 5, and stores acquired information related to the rotation angle in a predetermined storage apparatus such as a RAM or the storage section 14.

Then, during the polarized imaging mode, the polarized image generating section 21 acquires the rotation angle information related to the rotary operator 2b stored in the predetermined storage device as described above, and uses the acquired rotation angle information to generate a virtual polarized image.

Here, the rotation angle of the rotary operator 2b detected by the rotation angle detecting section 5 is hereinafter referred to as the "rotation angle $\alpha$."

1-3. Rotation Cancelling Method

FIG. 8 is a descriptive diagram of a rotation cancelling method of the embodiment.

FIG. 8A illustrates a state where, when the imaging apparatus 1 is upright, an operation of the rotary operator 2b indicates "$\alpha$" as a virtual filter angle. Here, for the sake of description, the rotation angle $\alpha$ is an angle based on a horizontal line (indicated by a dashed line in the figure) set when the imaging apparatus 1 is upright.

Additionally, in the figure, a virtual polarization axis of the polarization filter implemented by signal processing using the above-described cos curve is represented as a virtual polarization axis P'.

In the state in FIG. 8A, an angle between the virtual polarization axis P' and the horizontal line is "$\alpha$." However, in a case where the imaging apparatus 1 is tilted through 1 deg as illustrated in FIG. 8B, the angle between the virtual polarization axis P' and the horizontal line is changed from "$\alpha$." (changed to "$\alpha-\beta$").

To maintain the polarization filter effect in the state in FIG. 8A in spite of rotation of the imaging apparatus 1 through $\beta$ deg as illustrated in FIG. 8B, the angle between the virtual polarization axis P' and the horizontal line is only required to be changed back to "$\alpha$." That is, "$\beta$," which is the rotation angle of the imaging apparatus 1 (rotation angle in a plane substantially orthogonal to the imaging direction of the apparatus), is only required to be added to the rotation angle "$\alpha$" indicated by the rotary operator 2b to obtain "$\alpha+\beta$" as a virtual filter angle used for generation of a virtual polarized image based on the cos curve.

The polarized image generating section 21 of the present embodiment acquires, as the above-described "$\beta$," the apparatus rotation angle acquired from the angle detecting section 17 by the control section 30, and during the above-described calculation of the luminance value for each pixel position based on the cos curve, "$\alpha+\beta$," obtained by adding "$\beta$" and the rotation angle $\alpha$ together, is used as the value of the virtual filter angle to be substituted for the cos curve.

Thus, the polarization filter effect remains unchanged in spite of rotation of the imaging apparatus 1, allowing prevention of a change in polarization filter effect caused by rotation of the imaging apparatus 1.

Now, the rotation cancelling method as the embodiment described above can be described as follows. That is, an image corresponding to the polarization direction corresponding to the virtual filter angle corrected on the basis of a detection result from the angle detecting section 17 is generated on the basis of light receiving signals for a plurality of pixels included in the pixel unit U and function information representing a relationship between the virtual filter angle and the light receiving signal value. In this case, the "polarization direction corresponding to the virtual filter angle" means the polarization direction of linearly polarized light received when the rotation angle of the rotatable polarization filter is set equal to the virtual filter angle. Additionally, the "image corresponding to the polarization direction" means a polarized image including a component of a single polarization direction. In other words, "image corresponding to the polarization direction" means an image obtained by selectively receiving linearly polarized light with a single polarization direction. Note that the "image obtained by selectively receiving linearly polarized light with a single polarization direction" includes an image generated by processing a signal obtained by the imaging section 11, such as a virtual polarized image generated by signal processing using the function F.

1-4. Processing Procedure

FIG. 9 is a flowchart illustrating a processing procedure for implementing the rotation cancelling method as the embodiment described above. Note that, in the present example, processing illustrated in FIG. 9 is executed for each frame.

First, in step S101, the polarized image generating section 21 determines whether or not the apparatus is now in the polarized imaging mode. In a case where the apparatus is in the polarized imaging mode, the polarized image generating section 21 proceeds to step S102 and acquires the rotation angle α and the rotation angle β. That is, the polarized image generating section 21 acquires, as "α," the rotation angle of the rotary operator 2*a* acquired from the rotation angle detecting section 5 by the control section 30, and acquires, as "β," the apparatus rotation angle acquired from the angle detecting section 17 by the control section 30.

Furthermore, the polarized image generating section 21 calculates "α+β" in step S103, and in the subsequent step S104, generates a virtual polarized image with the virtual filter angle set to "α+β".

Specifically, in step S104, the polarized image generating section 21 executes processing in steps S201 to S203 in the figure.

First, in step S201, the polarized image generating section 21 executes polarized image generating processing for each angle. Specifically, the polarized image generating processing includes generating the first polarized image, the second polarized image, the third polarized image, and the fourth polarized image described in FIG. 5C.

In the subsequent step S202, the polarized image generating section 21 executes processing of fitting a cos curve for each pixel position. That is, the polarized image generating section 21 uses four light receiving signal values resulting from generation of the first polarized image, the second polarized image, the third polarized image, and the fourth polarized image, to perform cos curve fitting for each pixel position on the basis of [Equation 3].

Then in step S203, the polarized image generating section 21 substitutes "α+β" for the cos curve for each pixel position to calculate the luminance value.

Thus, a virtual polarized image with virtual filter angle set to "α+β" is obtained.

On the other hand, in a case where the polarized image generating section 21 determines that the apparatus is not in the polarized imaging mode, that is, in a case where the apparatus is in a normal imaging mode, the polarized image generating section 21 generates a virtual normal image in step S105.

Specifically, in step S105, the polarized image generating section 21 executes processing in steps S301 and S302 in the figure. That is, first in step S301, the polarized image generating section 21 executes the polarized image generating processing for each angle as in step S201 described above. Then, in the subsequent step S302, the polarized image generating section 21 adds together, for each pixel position, light receiving signal values for two polarized images with orthogonal polarization directions. Specifically, the polarized image generating section 21 adds, to the light receiving signal value for each pixel position in the first polarized image, the light receiving signal value for the same pixel position in the second polarized image. Alternatively, the polarized image generating section 21 adds, to the light receiving signal value for each pixel position in the third polarized image, the light receiving signal value for the same pixel position in the fourth polarized image.

Accordingly, a virtual normal image is obtained.

The polarized image generating section 21 ends the processing illustrated in FIG. 9 by executing the processing in step S104 or S105.

In this case, in the imaging apparatus 1 in the present example, the virtual polarized image is recorded in response to the predetermined operation such as the operation of the shutter button 1*a* in the polarized imaging mode, and the virtual normal image is recorded in response to the predetermined operation in the normal imaging mode.

Specifically, in response to detection of the predetermined operation during the polarized imaging mode, the control section 30 causes the storage section 14 to store still image data or moving image data based on the virtual polarized image generated by the polarized image generating section 21. Additionally, in response to detection of the predetermined operation during the normal imaging mode, the control section 30 causes the storage section 14 to store still image data or moving image data based on the virtual normal image generated by the polarized image generating section 21.

Note that, in a case where a still image is recorded as the virtual polarized image, the processing for generating a virtual polarized image, such as cos curve fitting, need not be performed on each frame and that the processing can be executed exclusively on frames obtained at timings when the predetermined operation such as the operation of the shutter button 1*a* is performed.

Additionally, in the above description, for the sake of description, the case has been illustrated in which the "pixel" in the present technique includes one light receiving element 12*a*. However, the imaging apparatus 1 can generate a color image as a captured image (virtual polarized image or virtual normal image) captured by the imaging apparatus 1. In that case, at least one R (red) light receiving element 12*a*, one G (green) light receiving element 12*a*, and one B (blue) light receiving element 12*a* are provided in the "pixel" (for example, in an RGGB type, four light receiving elements 12*a* are provided). That is, the polarization filter 13*a* is provided in each "pixel" including a predetermined number of light receiving elements 12a, to cause the respective "pixels" to selectively receive linearly polarized light with different polarization directions.

For a color image, the R, G, and B light receiving elements are present at each pixel position, and thus, an R image, a G image, and a B image are generated for each of the first to fourth polarized images. The cos curve fitting for each pixel position in the first to fourth polarized images and generation of a virtual polarized image based on the cos curve are performed for each of R, G, and B. Thus, virtual polarized images can be obtained in which each pixel position has light receiving signal values (luminance values) for the R, G, and B images, respectively. Additionally, a virtual normal image is generated for each of R, G, and B on the basis of the first to fourth polarized images for each of R, G, and B.

In this case, in the example in the above description, the virtual filter angle is operationally set. However, the virtual filter angle may be set without relying on the operation. That is, it is sufficient that the rotation cancelling processing as the embodiment is executed so as to cancel a change in the virtual polarized image caused by a change in the rotation angle of the imaging section 11, on the basis of a difference between the virtual filter angle set by a certain method not limited to the operation, the virtual filter angle being used as a certain reference, and the rotation angle (apparatus rotation angle) of the imaging section 11. In other words, it is sufficient that images are generated on the basis of the difference between the virtual filter angle used as a reference and the rotation angle of the imaging section 11.

Additionally, in the example in the above description, for rotation cancellation, generation of a virtual polarized image based on the function F is essential. However, generation of a virtual polarized image based on the function F for rotation cancellation is not essential.

For example, in a case where α+β is equal to any one of 0 deg, 90 deg, 45 deg, and 135 deg, an image with rotation cancelled can be obtained that is generated by directly using the light receiving signal for the light receiving element 12a included in the light receiving elements 12a in the imaging section 11 and selectively receiving linearly polarized light at an angle equal to α+β.

Alternatively, in a case where α+β is close to any one of 0 deg, 90 deg, 45 deg, and 135 deg (for example, the difference is equal to or smaller than a predetermined value), an image with rotation cancelled can be obtained that is generated by directly using the light receiving signal for the light receiving element 12a included in the light receiving elements 12a in the imaging section 11 and selectively receiving linearly polarized light at the close angle.

As described above, to enable rotation cancellation, an image is only required to be generated that corresponds to a polarization direction corresponding to a detection result for the orientation of the imaging section 11.

Note that, in a case where α+β is equal or close to none of 0 deg, 90 deg, 45 deg, and 135 deg, an image with rotation cancelled is only required to be obtained by generating a virtual polarized image based on the function F. Specifically, on the basis of the function F, a virtual polarized image is generated with the virtual filter angle=α+β.

1-5. Check of Polarization Filter Effect

The imaging apparatus 1 of the present embodiment functions, when a virtual polarized image is being displayed on the display section 16 as a through image during the polarized imaging mode, to switch the display image from the virtual polarized image to a virtual normal image in response to the predetermined operation. That is, switching from the virtual polarized image to the virtual normal image allows the user to easily check the polarization filter effect.

The display switching in this case is performed by a depression operation for a predetermined button operator, for example, the button operator 1b illustrated in FIG. 1. Specifically, the display image is switched from the virtual polarized image to the virtual normal image in response to the start of the depression operation, and the virtual normal image remains displayed while the depression operation is being continued. Then, in response to the end of the depression operation, the display image is switched from the virtual normal image to the virtual polarized image.

Such switching of the virtual polarized image/virtual normal image is achieved on the basis of control of the display control section 31 in the control section 30.

Specific processing will be described with reference to a flowchart in FIG. 10.

FIG. 10A illustrates processing executed by the control section 30 (display control section 31). FIG. 10B illustrates processing executed by the polarized image generating section 21. Note that the processing in FIG. 10B is executed on each frame similarly to the processing in FIG. 9.

In this case, in the description below, components similar to already described components are denoted by the same reference signs or step numbers, and descriptions of the components are omitted.

In FIG. 10A, the control section 30 checks, in step S401, for a predetermined operation (in the present example, the depression operation for the predetermined button) used as a display switching operation, and in a case where the display switching operation is performed, turns on, in step S402, a generation instruction flag for a virtual normal image. The generation instruction flag is, for example, a flag stored in a predetermined apparatus in the storage section 14 and that can be referenced by the polarized image generating section 21.

In step S403 subsequent to step S402, the control section 30 provides display switching control to switch the display image on the display section 16 from the virtual polarized image to the virtual normal image. As described below, the polarized image generating section 21 generates a virtual normal image in response to turning ON of the generation instruction flag in step S402 described below. Thus, the control section 30 controls the display data generating section 23 and the display section 16 to cause the display section 16 to display the thus generated virtual normal image.

In step S404 subsequent to step S403, the control section 30 waits for the predetermined operation determined in step S401 described above to end (in the present example, waits for the depression operation for the predetermined button to end), and in a case where the predetermined operation is ended, turns OFF the generation instruction flag in step 405, and performs the display switching control in step S406. That is, the polarized image generating section 21 generates a virtual polarized image in response to turning OFF of the generation instruction flag in step S402, and thus, the control section 30 controls the display data generating section 23 and the display section 16 to cause the display section 16 to display the thus generated virtual polarized image.

Subsequently, in FIG. 10B, in accordance with the determination, in step S101, that the apparatus is in the polarized imaging mode, the polarized image generating section 21 determines in step S501 whether or not the generation instruction flag is ON. In a case where the generation instruction flag is ON, the polarized image generating section 21 advances the processing to step S105. Thus, a virtual normal image is generated.

On the other hand, in a case where the generation instruction flag is not ON, the polarized image generating section 21 advances the processing to step S102. In other words, a virtual normal image is generated in a case where no display switching operation is performed.

Note that, in response to the predetermined operation performed while a virtual normal image is being displayed under the normal imaging mode, the display image can be switched from the virtual normal image to a virtual polarized image. Additionally, also in this case, the virtual polarized image can remain displayed while the predetermined operation is continuing.

As described above, on the basis of the predetermined operation, the display state of the display section 16 is switched from the state where any one of the virtual polarized image or the virtual normal image is displayed to the state where the other of the virtual polarized image or the virtual normal image is displayed. This allows the user to easily recognize whether or not the polarization filter effect is present.

Additionally, in the above description, the display state is maintained in which the other of the virtual polarized image or the virtual normal image is displayed while the predetermined operation is continuing, and the display state is switched to the state where any one of the virtual polarized image or the virtual normal image is displayed in response to the end of the predetermined operation.

Thus, to recover the display state where any one of the virtual polarized image or the virtual normal image is displayed after causing the other of the virtual polarized image or the virtual normal image to be displayed, the user is only required to end the predetermined operation.

Accordingly, an operational burden related to display switching can be reduced.

1-6. Improvement of Monitor Display

Figure 11:
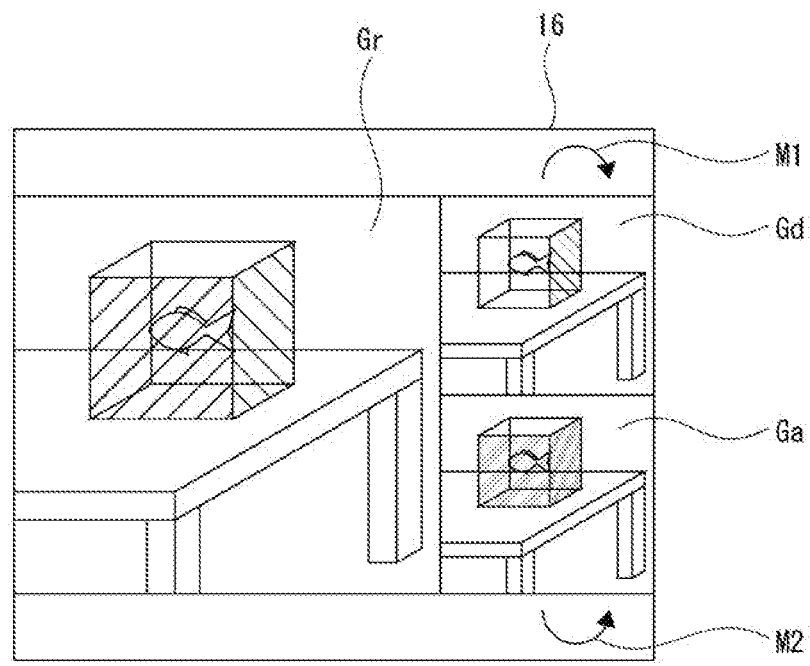
FIG. 11 is a diagram illustrating an example of display of a specified-angle image, an increased-angle image, a reduced angle image, and rotating direction information.

In monitor-displaying a virtual polarized image on the display section 16 as a through image, along with a virtual polarized image based on the virtual filter angle ($\alpha$) and being currently displayed (hereinafter, referred to as the "specified-angle image Gr"), the display section 16 can display a virtual polarized image having a virtual filter angle larger than the currently indicated virtual filter angle (hereinafter, referred to as an "increased-angle image Ga") and a virtual polarized image having a virtual filter angle smaller than the currently indicated virtual filter angle (hereinafter, referred to as an "increased-angle image Gd"), as illustrated in FIG. 11.

In the present example, as the increased-angle image Ga, a virtual polarized image is displayed using a virtual filter angle ($\alpha+45$) equal to the currently indicated virtual filter angle plus 45 deg, and as the reduced-angle image Gd, a virtual polarized image is displayed using a virtual filter angle ($\alpha-45$) equal to the currently indicated virtual filter angle minus 45 deg.

Additionally, in the present example, rotating direction information (denoted as "M1" in the figure) for the rotary operator 2b used to increase the virtual filter angle is displayed at a display position corresponding to the increased-angle image Ga, and rotating direction information (denoted as "M2" in the figure) for the rotary operator 2b used to reducing the virtual filter angle is displayed at a display position corresponding to the reduced-angle image Gd.

Processing executed by the polarized image generating section 21 to display the increased-angle image Ga, reduced-angle image Gd, and rotating direction information will be described with reference to a flowchart in FIG. 12.

A difference from the processing described above with reference to FIG. 9 is that processing in step 106 is executed in place of the processing in step S104. That is, the processing involves generating virtual polarized images with the virtual filter angle set to "$\alpha+\beta$," "$\alpha+\beta+45$," and "$\alpha+\beta-45$," respectively.

As the processing in step S106, in addition to the processing in steps S201 to S203 described above, processing of calculating a luminance value with "$\alpha+\beta+45$" and "$\alpha+\beta-45$" substituted for the cos curve for each pixel position is executed in steps S204 and S205, as illustrated in the figure. Thus, the polarized image generating section 21 generates virtual polarized images as the specified-angle image Gr, increased-angle image Ga, and reduced-angle image Gd.

Although not illustrated, the display control section 31 in this case controls the display data generating section 23 and the display section 16 to display the specified-angle image Gr, increased-angle image Ga, and reduced-angle image Gd generated as described above and pieces of the rotating direction information corresponding to the increased-angle image Ga and the reduced-angle image Gd, respectively. At this time, the display control section 31 causes the display data generating section 23 to generate display data used to display, at the display position corresponding to the increased-angle image Ga and at the display position corresponding to the reduced-angle image Gd, the corresponding rotating direction information.

By displaying the increased-angle image Ga and the reduced-angle image Gd along with the specified-angle image Gr as described above, the user can be prompted to check how the virtual filter angle changes with respect to the current indicated angle, and can thus be assisted to easily adjust the polarization filter effect.

Additionally, since at the display position corresponding to the increased-angle image Ga and at the display position corresponding to the reduced-angle image Gd, the corresponding rotating direction information is displayed, the user can be made to intuitively understand which direction the rotary operator 2b needs to be rotated in to produce the desired polarization filter effect.

Accordingly, the user can be assisted to more easily adjust the polarization filter effect.

Note that, to make the user understand which direction the rotary operator 2b needs to be rotated in to produce the desired polarization filter effect, for example, the increased-angle image Ga and the reduced-angle image Gd can be displayed on an angle increase rotating direction side and on an angle reduction rotating direction side, respectively, of the rotary operator 2b in the display section 16.

This eliminates a need to display the rotating direction information, allowing a display space in the display section 16 to be effectively utilized.

Additionally, in the example in the above description, the increased-angle image Ga and the reduced-angle image Gd are simultaneously displayed. However, at least one of the increased-angle image Ga or the reduced-angle image Gd can be displayed. In a case where any one of the increased-angle image Ga or the reduced-angle image Gd is displayed, information corresponding to any one of the increased-angle image Ga or the reduced-angle image Gd is only required to be displayed as the rotating direction information.

Additionally, display of the increased-angle image Ga and the reduced-angle image Gd may be started depending on satisfaction of a predetermined condition. For example, the apparatus may be configured to be capable of detecting that the user touches an indication operator for the virtual filter angle such as the rotary operator 2b such that display of the increased-angle image Ga and the reduced-angle image Gd is started in response to detection of the user touching the indication operator.

1-7. Touch Mode

The imaging apparatus 1 of the present embodiment is provided with a touch mode enabling generation of a virtual polarized image adjusted to make a light reflection aspect of a subject designated by a touch operation satisfy a predetermined condition.

Specifically, the touch mode in the present example enables generation of a virtual polarized image adjusted to remove reflection from the subject designated by the touch operation (for example, reflection from a transparent material such as glass is removed).

For example, it is assumed that, when the display section 16 is displaying a virtual polarized image as a through image as illustrated in FIG. 13A, a needed subject ("T" in the figure) is touched by a touch panel operation.

During a touch mode, the acceptance section 32 illustrated in FIG. 2 accepts such designation of the subject based on the touch operation. Then, the acceptance section 32 obtains coordinate information related to coordinates of the designated subject in the virtual polarized image and indicates the coordinate information to the polarized image generating section 21.

In accordance with the indicated coordinate information, the polarized image generating section 21 generates a virtual polarized image adjusted to remove reflection from the designated subject.

The display control section 30 provides control to cause the display section 16 to display the thus generated virtual polarized image.

In FIG. 13B illustrates the display state of the virtual polarized image in which reflection from the designated subject has been removed (in the illustrated example, the virtual polarized image in which reflection from the transparent material has been removed).

Here, the virtual filter angle to be set to remove reflection from the designated subject can be determined on the basis of a cos curve fitted for a pixel position where the designated subject is projected. Specifically, the virtual filter angle at which the light receiving signal value in the cos curve is approximately minimized (see "imin" in FIG. 7) corresponds to the virtual filter angle to be set to remove reflection from the designated subject (hereinafter, referred to as the "virtual filter angle $\alpha'$").

Accordingly, in accordance with coordinate information indicated by the acceptance section 32 in response to a touch operation as described above, the polarized image generating section 21 performs cos curve fitting for the pixel position indicated by the coordinate information, and determines the virtual filter angle at which the light receiving signal value in the fitted curve is approximately minimized to be the virtual filter angle $\alpha'$.

The virtual filter angle $\alpha'$ is used as a target angle to generate a virtual polarized image.

With reference to flowcharts in FIGS. 14 to 16, processing for implementing operations during the touch mode as described above will be described.

Figure 14:
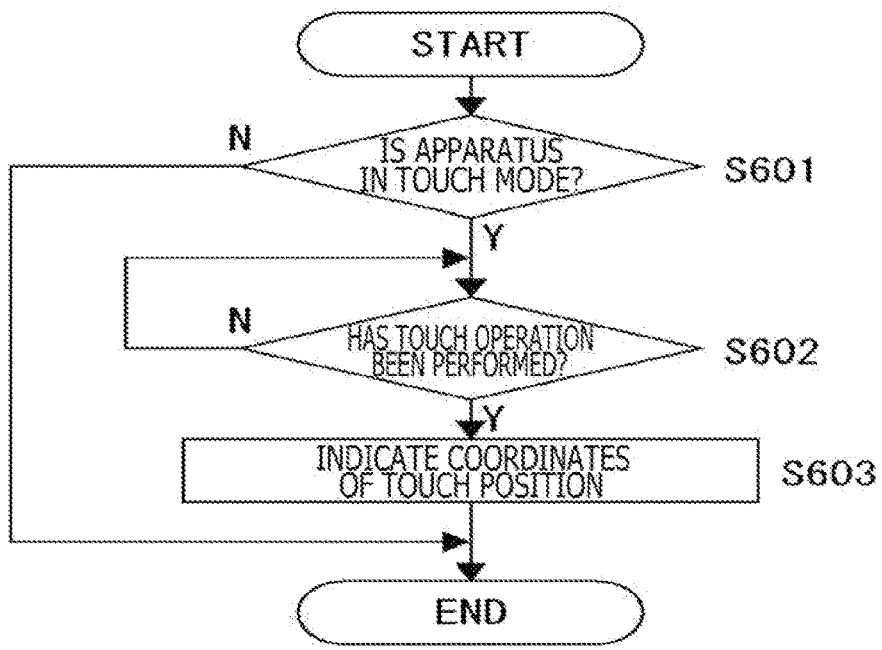
FIG. 14 is a flowchart of processing corresponding to an acceptance section according to the embodiment.

FIG. 14 is a flowchart of processing corresponding to the above-described acceptance section 32.

In FIG. 14, the control section 30 determines, in step S601, whether or not the apparatus is in the touch mode, and the control section 30 ends the processing illustrated in the figure in a case where the apparatus is not in the touch mode, and waits for a touch operation in step S602 in a case where the apparatus is in the touch mode.

In a case where the touch operation is performed, the control section 30 indicates, in step S603, the coordinates of the touch position to the polarized image generating section 21 and ends the processing illustrated in the figure.

Figure 15:
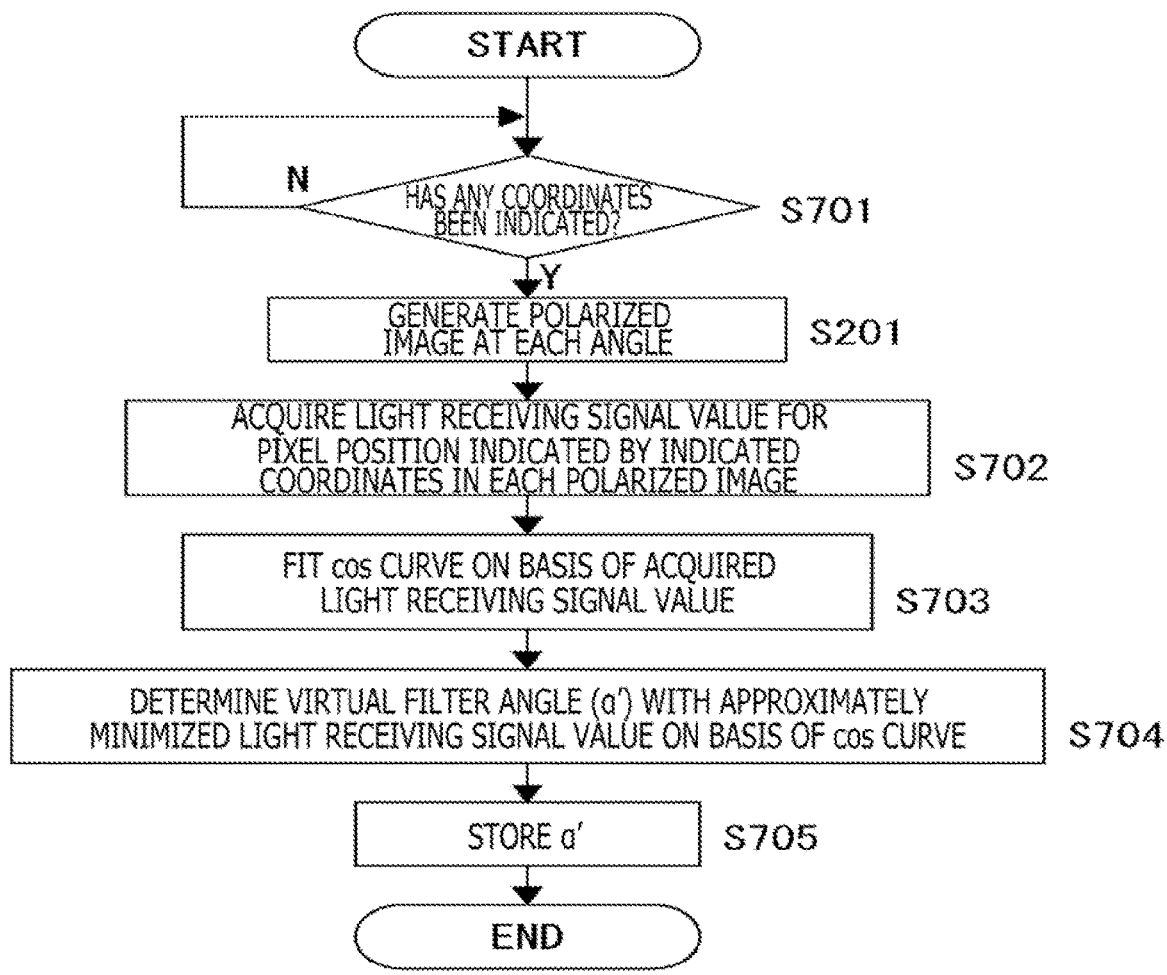
FIG. 15 is a flowchart of processing related to calculation of a virtual filter angle as a target angle according to the embodiment.

FIG. 15 is a flowchart of processing related to calculation of the virtual filter angle $\alpha'$ (target angle) performed by the polarized image generating section 21.

In FIG. 15, the polarized image generating section 21 waits, in step S701, for indication of coordinates, and in a case where the coordinates are indicated, executes, in step S201, processing of generating a polarized image for each angle and then advances the processing to step S702.

In step S702, the polarized image generating section 21 acquires a light receiving signal value for a pixel position indicated by the specified coordinates in each polarized image (first to fourth polarized images generated in step S201).

Then, in the subsequent step S703, the polarized image generating section 21 performs cos curve fitting on the basis of the acquired light receiving signal values. Furthermore, in the subsequent step S704, the polarized image generating section 21 determines the virtual filter angle at which the light receiving signal value is approximately minimized on the basis of the cos curve, that is, the virtual filter angle $\alpha'$.

In step S705, the polarized image generating section 21 stores the virtual filter angle $\alpha'$ determined in step S704, and ends the processing illustrated in the figure.

Figure 16:
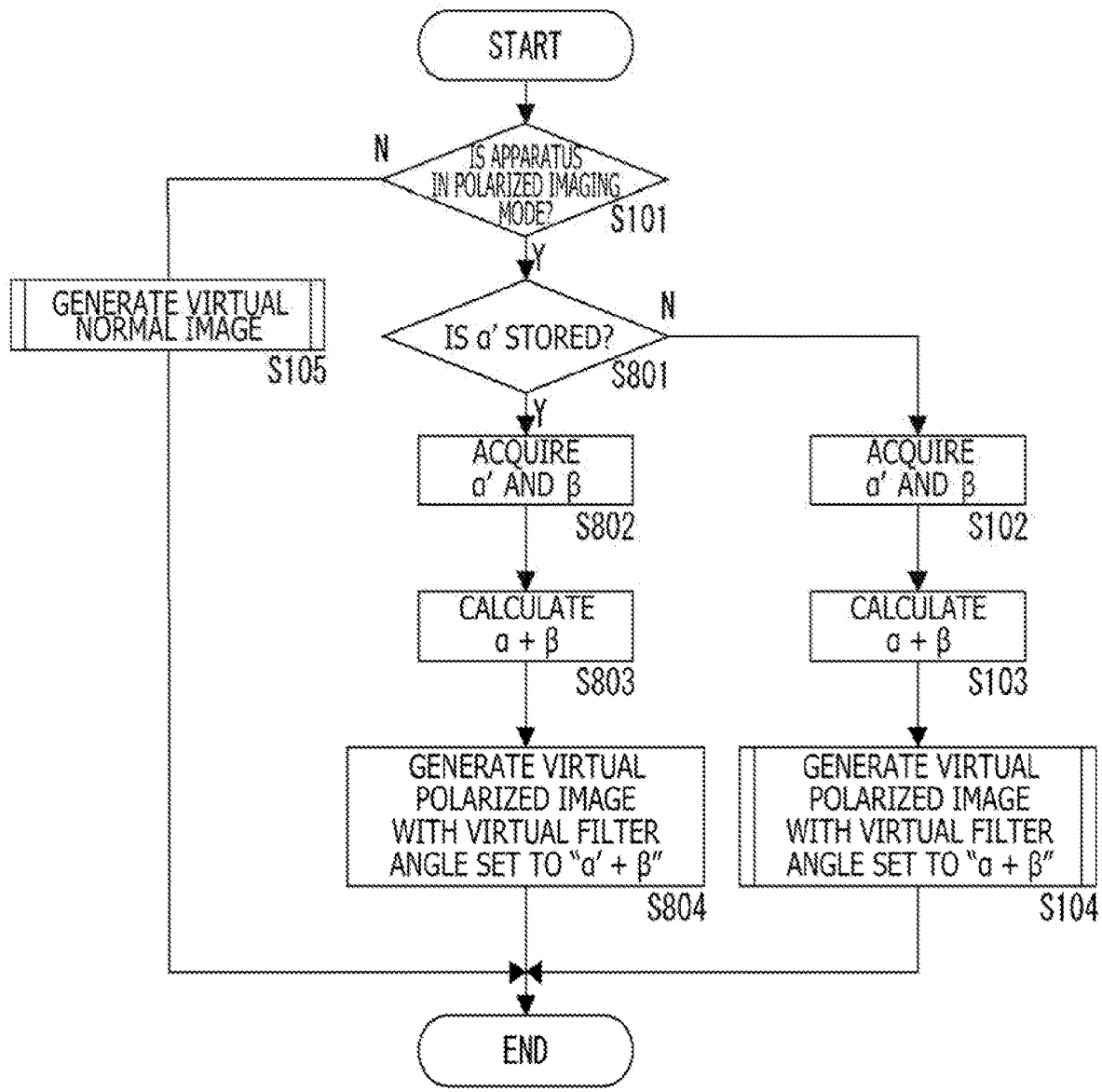
FIG. 16 is a flowchart illustrating an example of processing related to generation of a virtual polarized image based on the target angle.

FIG. 16 is a flowchart of processing related to generation of a virtual polarized image using the virtual filter angle $\alpha'$.

Processing in FIG. 16 differs from the processing in FIG. 9 in that steps S801 to S804 are added.

In accordance with the determination, in step S101, that the apparatus is in the polarized imaging mode, the polarized image generating section 21 advances the processing to step S801 to determine whether or not the virtual filter angle $\alpha'$ is stored. That is, the polarized image generating section 21 determines whether or not the virtual filter angle has already been determined at which reflection from the subject designated by a touch operation is removed.

In step S801, in a case where the virtual filter angle $\alpha'$ is not stored, the polarized image generating section 21 advances the processing to step S102. That is, in a case where the apparatus is in the polarized imaging mode and not in the touch mode or where the apparatus is in the touch mode but no touch operation has been performed yet, a virtual polarized image is generated using "$\alpha$" and "$\beta$" (in other words, in accordance with the rotation angle $\alpha$ of the rotary operator 2b).

On the other hand, in a case where the virtual filter angle $\alpha'$ is stored, the polarized image generating section 21 proceeds to step S802 to acquire the virtual filter angle $\alpha'$ and the rotation angle $\beta$. In the subsequent step S803, the polarized image generating section 21 calculates "$\alpha+3$," that is, calculates a corrected angle resulting from correction of "$\alpha'$" with "$\beta$," and proceeds to step S804.

In step S804, the polarized image generating section 21 generates a virtual polarized image with the virtual filter angle set to "α'+β" and ends the processing illustrated in the figure. The generation processing in step S804 is the same as the generation processing in step S104 except that the virtual filter angle used to generate a virtual polarized image (in other words, substituted for the cos curve) is changed from "α+β" to "α'+β," and thus duplicate descriptions of the processing are avoided.

Note that, in the example in the above description, the virtual filter angle at which the light receiving signal value in the cos curve is approximately minimized is determined to be the virtual filter angle α' (target angle) to generate a virtual polarized image with reflection from the designated subject removed but that, for example, by determining the virtual filter angle at which the light receiving signal value in the cos curve is approximately maximized to be the target angle, a virtual polarized image with reflection from the designated subject most emphasized can be generated. Alternatively, the target angle can be determined to be the virtual filter angle at which the light receiving signal value in the cos curve is an intermediate value between a maximum value and a minimum value.

As described above, the target angle may be determined to be the virtual filter angle at which the light receiving signal value in the cos curve fitted for the pixel position corresponding to the designated subject satisfies the predetermined condition.

Additionally, in the example in the above description, the operation of designating a subject is performed by a touch operation. However, the operation of designating a subject is not limited to the touch operation, and for example, the designating operation may use a cursor displayed on the display section 16.

As described above, the polarized image generating section 21 in the present example acquires a cos curve based on the light receiving signal value for the pixel position receiving light from the designated subject, and on the basis of the cos curve, calculates the virtual filter angle at which the light receiving signal value for the pixel position satisfies the predetermined condition to be the target angle (α'). The polarized image generating section 21 corrects the target angle with the apparatus rotation angle (β) to obtain the corrected angle (α'+β) and generates a virtual polarized image with the virtual filter angle set equal to the corrected angle.

Thus, by performing the operation of designating a subject, the user can obtain a virtual polarized image adjusted to make the light reflection aspect of the desired subject satisfy the predetermined condition.

Accordingly, the operational burden on the user is reduced in producing the predetermined polarization filter effect.

Additionally, the polarized image generating section 21 in the present example calculates the virtual filter angle at which the light receiving signal value for the pixel position is approximately minimized to be the target angle.

Thus, by performing the operation of designating a subject, the user can obtain a virtual polarized image adjusted to remove reflection from the desired subject.

Accordingly, the operational burden on the user is reduced in producing the polarization filter effect for removing reflection from the predetermined subject.

1-8. Expected Value Display Mode

The imaging apparatus 1 is provided with an expected value display mode in which expected value information representing an expected value for the polarization filter effect is displayed on the display section 16.

Specifically, in the expected value display mode, for each pixel position, a value representing the degree of a change in light receiving signal value resulting from a change in virtual filter angle is determined to be a filter effect expected value. The display section 16 displays an expected value image in which excepted value information indicating the magnitude of the filter effect expected value is represented for each pixel position.

In the present example, the expected value display mode is based on the assumption that the expected value display mode can be turned ON during the polarized imaging mode.

Figure 17:
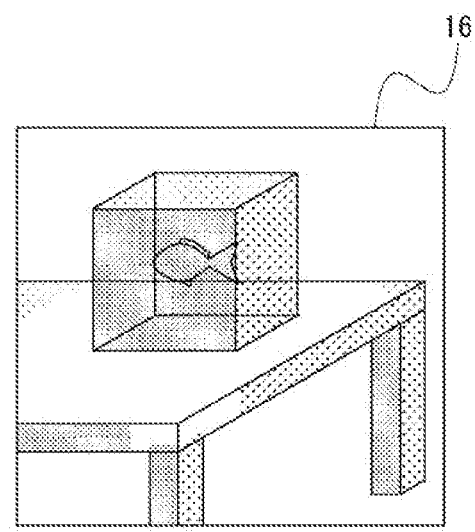
FIG. 17 is a diagram illustrating an example of display of an expected value image in a display section.

FIG. 17 illustrates an example of display of the expected value image in the display section 16.

In the figure, the expected value information in the expected value image is schematically dotted.

In the present example, the expected value image is superimposed on the virtual normal image. Specifically, in the expected value display mode, a monochromatic image (gray scale image) is displayed as the virtual normal image, and an image in a specific color (for example, red or blue) different from the color of the monochromatic image is displayed as the expected value image. In this regard, the expected value information in the expected value image is displayed such that the luminance value increases consistently with a filter effect expected value. That is, the expected value image is generated as an image having a larger luminance value at a pixel position exhibiting a larger filter effect expected value.

Display of such an expected value image enables the user to preliminarily recognize which position in the image a high filter effect can be expected to be produced at.

Here, in the present example, the filter effect expected value is calculated on the basis of a cos curve fitted for each pixel position where expected value information is to be displayed. Specifically, the degree of polarization ρ expressed by [Equation 4] is calculated as a filter effect expected value.

[Math. 4]

$$\rho = \frac{l_{max} - l_{min}}{l_{max} + l_{min}} \quad \text{[Equation 4]}$$

As illustrated in FIG. 18, the degree of polarization ρ is "0" when the amplitude of the cos curve is constant in spite of changes in virtual filter angle, that is, when the virtual filter effect exhibits no change in spite of changes in the virtual filter angle. The value of the degree of polarization ρ increases consistently with a difference between the maximum value lmax and the minimum value imin of the amplitude of the cos curve, and ρ=1 when the difference between the maximum value lmax and the minimum value imin is maximized. That is, the degree of polarization ρ has a maximum value of "1," and the value of the degree of polarization ρ increases consistently with the degree of change in the polarization filter effect with respect to a change in virtual filter angle.

Note that the filter effect expected value is not limited to the degree of polarization ρ and may be any value calculated on the basis of the cos curve and representing the degree of change in light receiving signal value resulting from a change in virtual filter angle.

Processing to be executed by the polarized image generating section 21 to display the expected value image as described above will be described with reference to a flowchart in FIG. 19.

Figure 19:
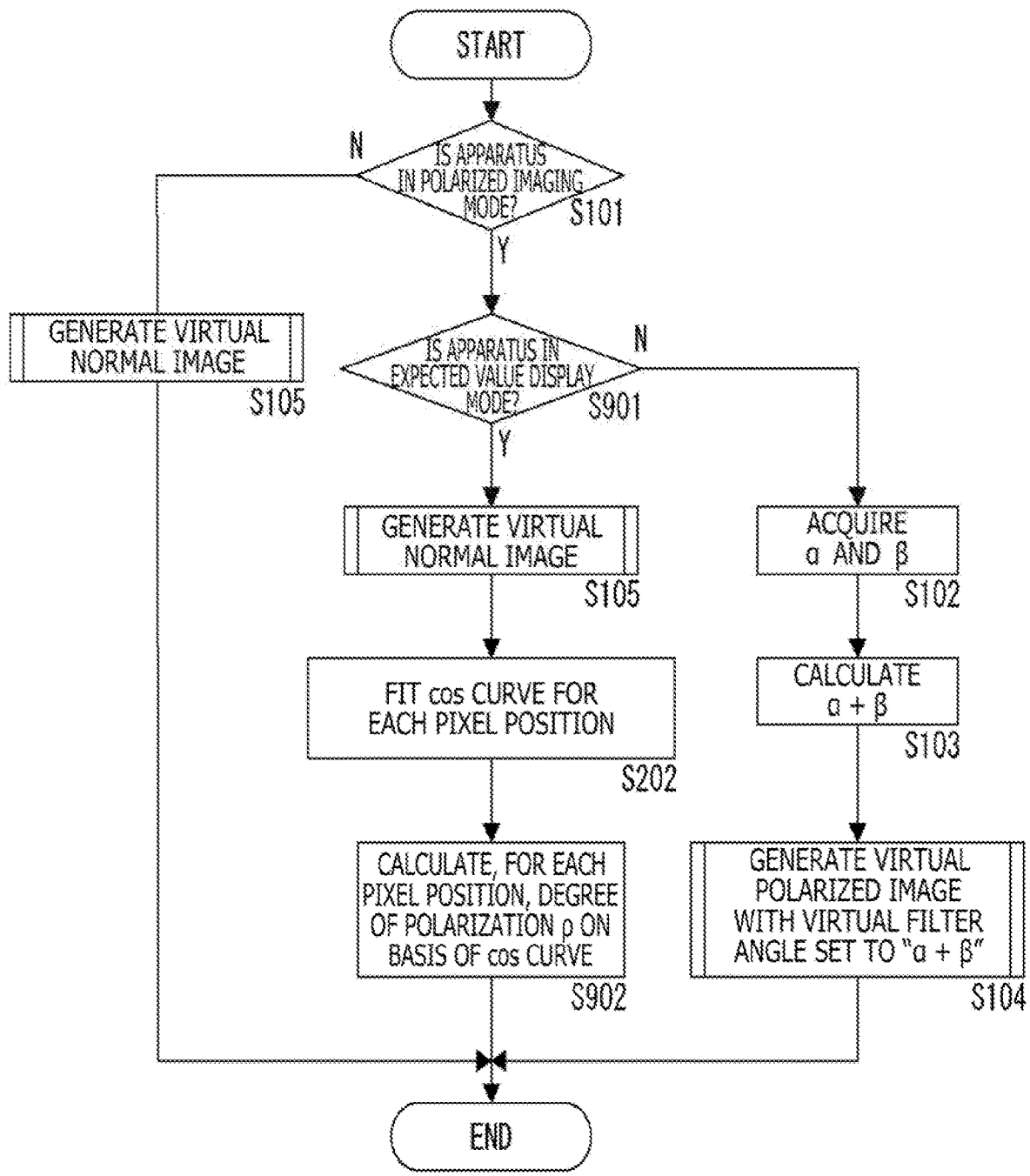
FIG. 19 is a flowchart illustrating an example of processing to be executed by an image generating section to display an expected value image.

In FIG. 19, in accordance with the determination, in step S101, that the apparatus is in the polarized imaging mode, the polarized image generating section 21 in this case, determines, in step S901, whether or not the apparatus is in the expected value display mode. In a case where the apparatus is not in the expected value image display mode, the polarized image generating section 21 advances the processing to step S102. That is, in a case where the apparatus is in the polarized imaging mode and not in the expected value image display mode, a virtual polarized image is generated using "α" and "β." The virtual polarized image is displayed on the display section 16 as a through image on the basis of the control of the display control section 31.

On the other hand, in a case where the apparatus is in the expected value image display mode, the polarized image generating section 21 generates a virtual normal image in step S105, and in the subsequent step S202, performs cos curve fitting for each pixel position. Note that, as described above, in the generation processing in step S105, a polarized image for each angle is generated (see step S301 in FIG. 9) and that, in step S202, cos curve fitting is performed on each pixel position on the basis of the polarized image for each angle.

In step S902 subsequent to step S202, the polarized image generating section 21 calculates, for each pixel position, the degree of polarization ρ on the basis of the cos curve. That is, on the basis of the cos curve determined for each pixel position in step S202, the degree of polarization ρ is calculated for each pixel position in accordance with [Equation 4] described above.

Although not illustrated, the display control section 31 in this case causes the display data generating section 23 to generate an expected value image based on the degree of polarization ρ for each pixel position determined as described above. In other words, the expected value image is generated that has a luminance value for a specific color increasing consistently with the value of the degree of polarization p.

The display control section 31 causes the display data generating section 23 to generate a superimposed image of the expected value image and the virtual normal image generated by the polarized image generating section 21 during the expected value image display mode, and controls the display data generating section 23 and the display section 16 to cause the superimposed image to be displayed on the display section 16.

Note that, in a case where virtual normal image generated by the polarized image generating section 21 is a color image, the display control section 31 causes the display data generating section 23 to convert the virtual normal image into a monochromatic image, and causes the display data generating section 23 to generate a superimposed image of the monochromatic virtual normal image and the expected value image.

Note that, in the above-described example, expected value information is generated for all the pixel positions in the imaging section 11 but that expected value information may be generated exclusively for some predetermined positions.

In that case, cos curve fitting and calculation of the filter effect expected value may be performed at least for the predetermined pixel positions.

Additionally, in the above-described example, the expected value image is superimposed on the virtual normal image. However, the expected value image can be superimposed on the virtual polarized image for display. In other words, the superimposed image of the expected value image may be a captured image generated on the basis of light receiving signals from the imaging section 11.

As described above, the polarized image generating section 21 in the present example calculates, for each of the predetermined pixel positions in the imaging section 11, the filter effect expected value on the basis of the cos curve, and the display control section 31 causes the display section 16 to display the expected value image with the expected value information represented for each of the predetermined pixel positions and indicating the magnitude of the filter effect expected value.

Thus, the user can preliminarily recognize which position in the image a high filter effect can be expected to be produced at.

Accordingly, the user can be assisted to easily produce the desired polarization filter effect.

Additionally, in the present example, the display control section 31 causes the expected value image to be superimposed on the captured image from the imaging section 11.

Thus, the user can specifically recognize, on the basis of a position relationship with the subject, the position where a high filter effect can be expected to be produced.

Accordingly, an assistance effect for allowing the desired polarization filter effect to be easily produced can be further improved.

Additionally, the display control section 31 in the present example uses a monochromatic image as the captured image and causes an image in a specific color different from the color of the monochromatic image to be displayed as the expected value image.

This suppresses degradation of visibility of the captured image and the expected value image due to the superimposed display of the images.

Accordingly, the user can be made to more easily recognize the position where a high filter effect can be expected to be produced.

2. Modified Examples 2-1. First Modified Example

Now, modified examples of the embodiment will be described.

In fields of the related art such as FA (Factory Automation), a workpiece (subject) is imaged using an imaging apparatus for the purpose of inspection or the like. In this regard, in a case where the workpiece is very large and fails to be covered by the angle of view of the imaging apparatus, the imaging apparatus attached to a robot arm may be moved to scan the workpiece.

Additionally, in the related art, to suppress reflected light from the workpiece, the workpiece is irradiated with illumination light including linearly polarized light and imaged using an imaging apparatus equipped with a polarization filter with a polarization axis oriented orthogonally to the illumination light.

Figure 20:
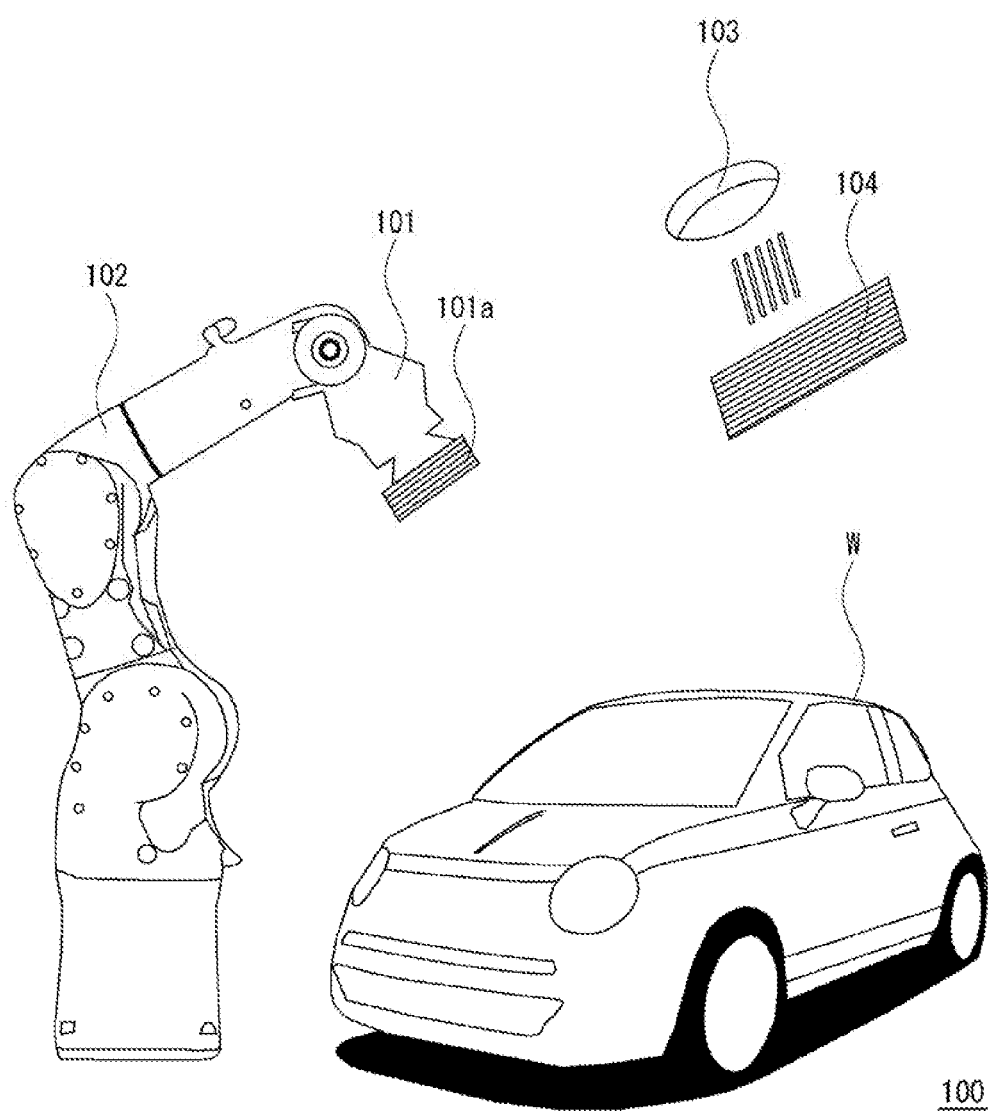
FIG. 20 is a diagram illustrating an outline of an imaging system that can be configured on the basis of the related art.

FIG. 20 illustrates an outline of an imaging system 100 that can be configured on the basis of the related art as described above.

As illustrated, the imaging system 100 includes an imaging apparatus 101 capturing an image via a polarization filter 101a attached to a lens, a robot arm 102 equipped with the imaging apparatus 101, and a light emitting unit 103 and a polarization filter 104 irradiating a workpiece W with illumination light including linearly polarized light.

The workpiece W is relatively large as in the illustrated example, and thus the robot arm 102 is used to displace the imaging apparatus 101 to image the entire workpiece W. In this regard, in a case where the robot arm 102 is used to displace the imaging apparatus 101 so as to scan the entire workpiece W, the polarization filter 101a of the imaging apparatus 101 rotates to prevent the polarization axis of the polarization filter from being kept orthogonal to the polarization direction of the illumination light. That is, a captured image with reflected light suppressed fails to be obtained. Thus, the robot arm 102 rotatably supports the imaging apparatus 101 and rotationally drives the imaging apparatus 101 to offset a change in angle caused by movement of the robot arm 102.

However, rotational driving of the imaging apparatus 101 requires provision of a rotating mechanism and a driving unit such as a motor, leading to an increased number of components. Additionally, in a case where the imaging apparatus 101 is rotated, the operation of the robot arm 102 may need to be restricted to prevent twisting, breaking, and the like of signal cables.

Thus, the rotation cancelling method as the above-described embodiment is suitably applied to the imaging apparatus 101 in the imaging system 100 as described above.

Figure 21:
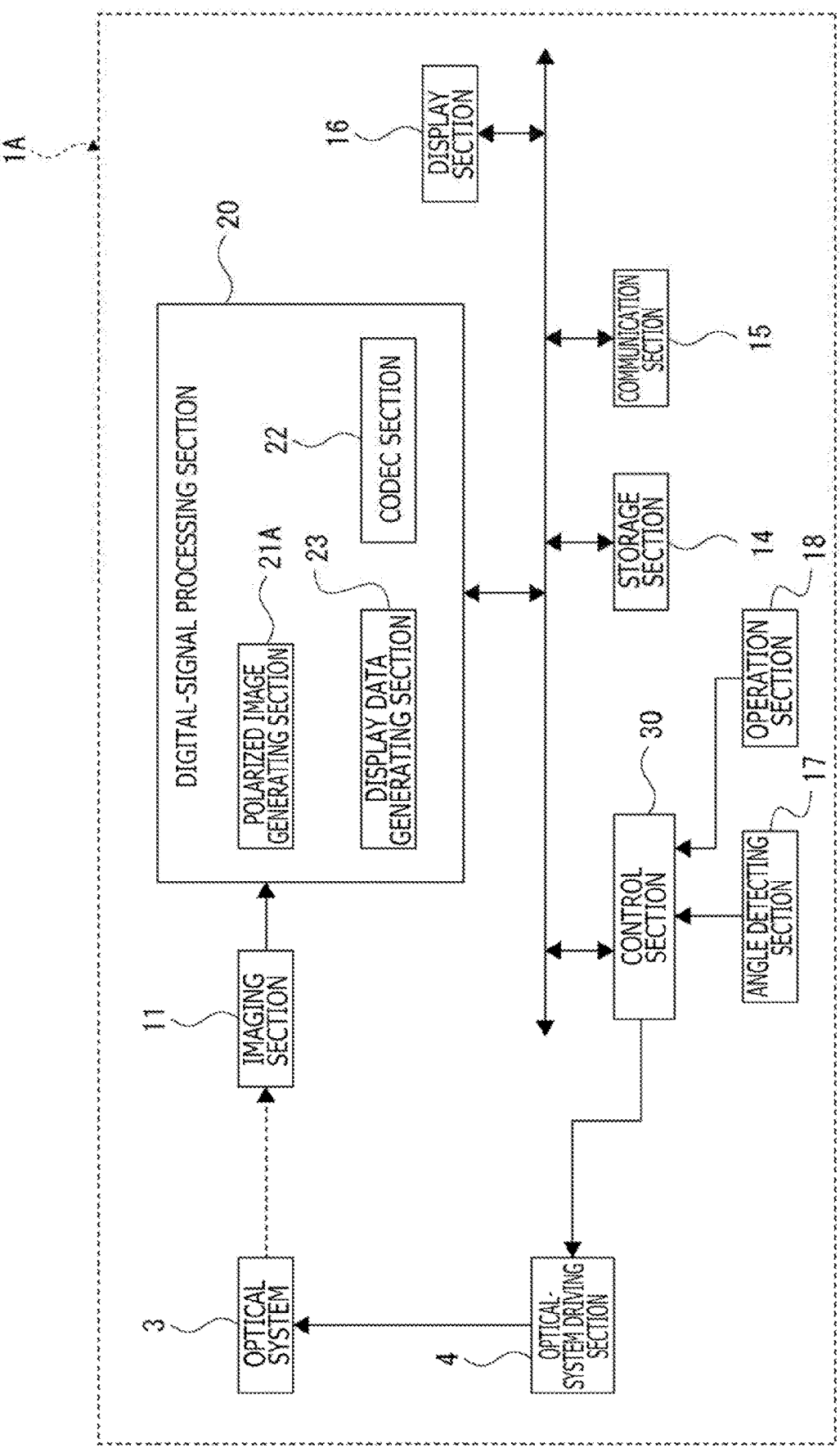
FIG. 21 is a block diagram illustrating an internal configuration of an imaging apparatus as a modified example.

FIG. 21 is a block diagram illustrating an example of an internal configuration of an imaging apparatus 1A suitably used in place of the imaging apparatus 101.

In the example in FIG. 21, the imaging apparatus 1A includes an optical system 2 and an optical driving section 4. Additionally, in the example, the control section 30 does not include the functions of the display control section 31 and the acceptance section 32. Furthermore, the imaging apparatus 1A is not provided with the rotary operator 2b for the user to input and indicate the virtual filter angle.

The digital-signal processing section 20 of the imaging apparatus 1A includes a polarized image generating section 21A in place of the polarized image generating section 21.

FIG. 22 is a flowchart illustrating processing executed by the polarized image generating section 21A to generate a virtual polarized image.

FIG. 22A illustrates processing related to calculation of the virtual filter angle as a target angle used to generate a virtual polarized image.

This example is based on the assumption that calculation of the polarization filter angle as a target angle is executed as initial setting processing before the start of imaging of the workpiece W. Note that it is assumed that polarized lighting (light emitting unit 102) is turned ON before the processing in FIG. 22A is started.

First, in step S1001, the polarized image generating section 21A waits until, for example, the user performs a predetermined operation as an initial setting instruction. In a case where the initial setting instruction is given, the polarized image generating section 21A executes, in step S201, polarized image generation processing for each angle, and in the subsequent step S1002, acquires a light receiving signal value for a predetermined pixel position in each polarized image. In this regard, the predetermined pixel position is a single preset pixel position but may be a plurality of pixel positions.

Then, the polarized image generating section 21A performs, in the subsequent step S1003, fitting of a cos curve on the basis of the acquired light receiving signal value, and in step S104, determines, on the basis of the cos curve, the virtual filter angle $\alpha''$ having a cross-Nicol relationship with (in other words, orthogonal to) the polarization direction of the polarized illumination. Specifically, the polarized image generating section 21A determines, as the virtual filter angle $\alpha''$, the virtual filter angle at which the light receiving signal value in the cos curve is minimized. Furthermore, in the subsequent step S1005, the polarized image generating section 21A stores the virtual filter angle $\alpha''$ to end the processing in FIG. 22A.

FIG. 22B is a flowchart illustrating processing to be correspondingly executed during imaging of the workpiece W.

In step S1101, the polarized image generating section 21A executes processing of acquiring $\alpha''$ and $\beta$, that is, processing of acquiring the virtual filter angle $\alpha''$ stored in step S1005 and the rotation angle $\beta$ detected by the angle detecting section 17, and in the subsequent step S1102, calculates "$\alpha''+\beta$". Then, in step S1103, the polarized image generating section 21A generates a virtual polarized image for a case where the virtual filter angle is "$\alpha''+\beta$" to end the processing in FIG. 22B.

The generation processing in step S1103 differs from the generation processing in the previous step S104 only in that the virtual filter angle used to generate a virtual polarized image is changed from "$\alpha+\beta$" to "$\alpha''+\beta$," and thus duplicate descriptions are avoided.

By applying, as the known imaging apparatus 101, the imaging apparatus 1A as described above, the imaging apparatus 1A need not be rotated in accordance with the polarization direction of the polarized illumination when the workpiece W is scanned for imaging. This reduces the number of components and the cost of the robot arm 102 and simplifies configuration of the robot arm 102, allowing maintainability to be improved.

2-2. Second Modified Example

FIG. 23 is a descriptive diagram of a structure of an imaging section 11A as a modified example. FIG. 23A is a schematic vertical cross-sectional view of a pixel pair 50 included in the imaging section 11A, and FIG. 23B is a front view of an array of the pixel pairs 50 in the imaging section 11A.

The imaging section 11A as a modified example includes two types of pixel pairs 50 (hereinafter, referred to as a "pixel pair 50-1" and a "pixel pair 50-2") as pixel pairs 50. The pixel pair 50-1 includes a polarization splitter 51-1 and a pixel 52 and a pixel 53. The pixel pair 50-2 includes a polarization splitter 51-2 and a pixel 52 and a pixel 53.

The polarization splitters 51-1 and 51-2 are each of a type in which two rectangular prisms are laminated to each other, and a separation surface 51a is formed at a portion where the rectangular prisms are laminated to each other. In the polarization splitters 51-1 and 51-2, linearly polarized light that is a portion of linearly polarized light included in incident light and that has a polarization direction substantially aligned with the polarization axis of the separation surface 51a is transmitted through the separation surface 51a. Linearly polarized light that is a portion of linearly polarized light included in incident light and that has a polarization direction substantially orthogonal to the polarization axis of the separation surface 51a is reflected from the separation surface 51a.

Each of the pixels 52 and 53 includes a predetermined number of light receiving elements 12a. Here, for the sake of description, each of the pixels 52 and 53 is assumed to include one light receiving element 12a. Note that, in a case where imaging of color images is supported, each of the pixels 52 and 53 includes three or more light receiving elements 12a corresponding to R, G, and B.

The light receiving element 12a of the pixel 52 in the pixel pair 50-1 includes a light receiving surface substantially orthogonal to the optical axis of reflected light from the separation surface 51a of the polarization splitter 51-1, with the reflected light received by the light receiving element 12a. Additionally, the light receiving element 12a of the pixel 53 in the pixel pair 50-1 includes a light receiving surface substantially orthogonal to the optical axis of transmitted light from the separation surface 51a of the polarization splitter 51-1, with the transmitted light received by the light receiving element 12a.

The pixels 52 and 53 in the pixel pair 50-1 selectively receive respective types of linearly polarized light with different polarization directions with a difference of 90 deg.

Additionally, the light receiving element 12a of the pixel 52 in the pixel pair 50-2 includes a light receiving surface substantially orthogonal to the optical axis of reflected light from the separation surface 51a of the polarization splitter 51-2, with the reflected light received by the light receiving element 12a. Furthermore, the light receiving element 12a of the pixel 53 in the pixel pair 50-2 includes a light receiving surface substantially orthogonal to the optical axis of transmitted light from the separation surface 51a of the polarization splitter 51-2, with the transmitted light received by the light receiving element 12a.

The pixels 52 and 53 in the pixel pair 50-2 also selectively receive respective types of linearly polarized light with different polarization directions with a difference of 90 deg.

The imaging section 11A includes two-dimensionally and alternately arranged pixel pairs 50-1 and pixel pairs 50-2. In the pixel pair 50-1 and the pixel pair 50-2 in an adjacent relationship, the polarization axis of the separation surface 51a in the polarization splitter 51-1 is different in in-plane angle from the polarization axis of the separation surface 51a in the polarization splitter 51-2. Specifically, in the present example, the in-plane angle of the polarization axis differs by 45 deg.

Thus, the pixels 52 and 53 in the pixel pair 50-1 and the pixels 52 and 53 in the pixel pair 50-2 selectively receive respective types of linearly polarized light with different polarization directions with a difference of 45 deg.

As illustrated in FIG. 23B, in the present example, the pixel pair 50-1 and the pixel pair 50-2 in the adjacent relationship constitute one pixel unit U'. In the imaging section 11A, a plurality of such pixel units U is arranged in the vertical direction and the transverse direction.

Note that, FIG. 23B illustrates the polarization direction of linearly polarized light selectively received by each pixel pair 50 as is the case with the double-headed arrow illustrated as the direction of the polarization axis of the polarization filter 13a in FIG. 3B described above.

Figure 24:
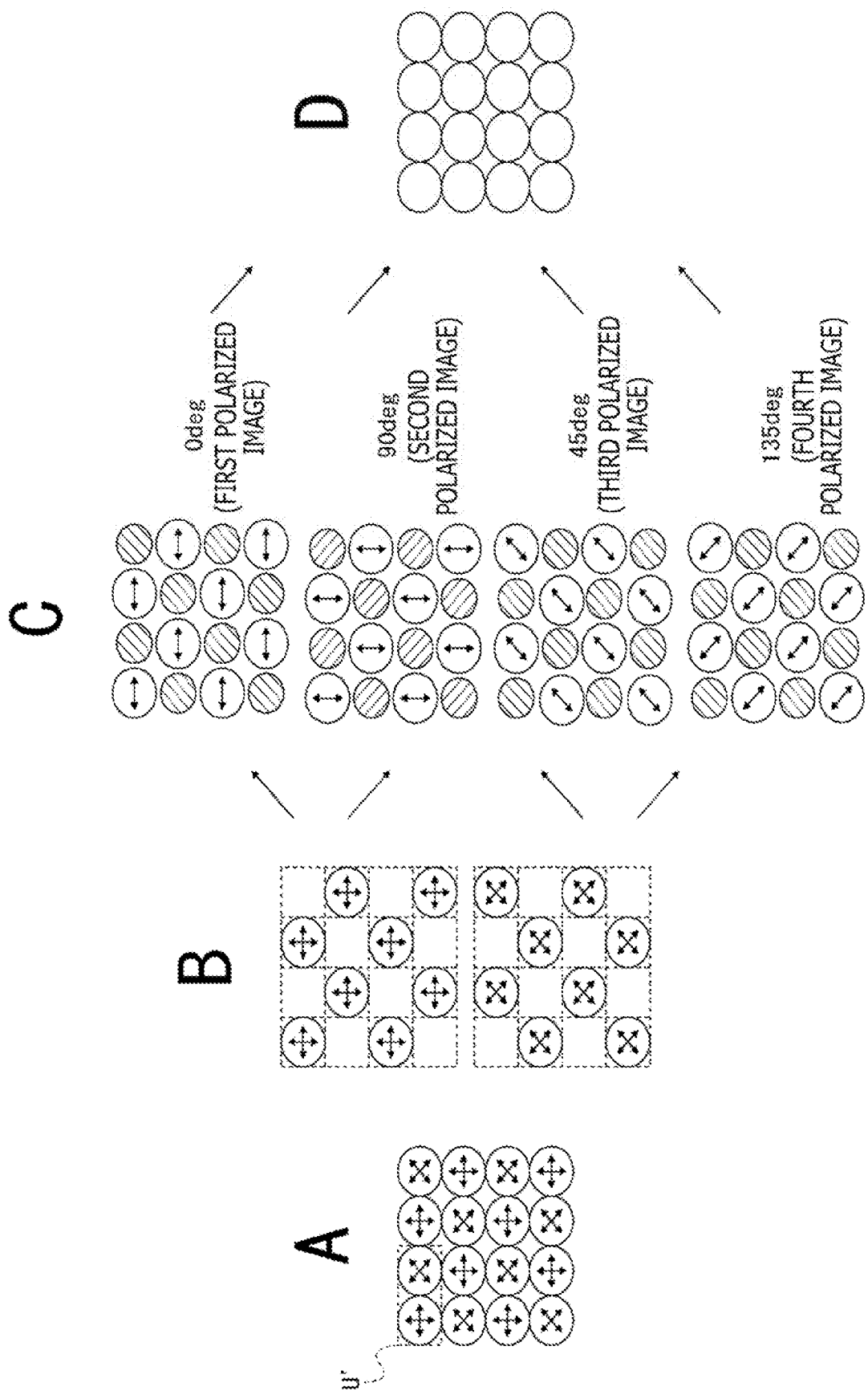
FIG. 24 is a diagram illustrating an example of a method for generating a first to a fourth polarized images and a virtual normal image in a case where the imaging section as the modified example is used.

FIG. 24 illustrates a descriptive diagram of a first to a fourth polarized images obtained using the imaging section 11A and a method for generating a virtual normal image as is the case with FIG. 5 described above.

In the imaging section 11A, two types of linearly polarized light with orthogonal polarization directions can be received at each pixel pair 50, that is, at each pixel position. Thus, compared to the imaging section 11 (see FIG. 5), the imaging section 11A can increase the resolution of the first to fourth polarized images (see FIGS. 5B and 5C and FIGS. 24B and 24C). Note that the resolution can be increased in a case where 2×2=4 pixel pairs 50 are considered to be one pixel position and where the first to fourth polarized images are generated without any pixel interpolation.

Additionally, in the present example, since the pixel pairs 50-1 and the pixel pairs 50-2 are alternately arranged in the vertical direction and the transverse direction, the resolution can be made equal between the vertical direction and the transverse direction. Furthermore, similar methods can be used to achieve interpolation processing for generating a first to a fourth polarized images. For example, in a case where the pixel pairs 50-1 and the pixel pairs 50-2 are line-sequentially arranged, the method for interpolation processing varies between the vertical direction and the transverse direction, and in a case where no interpolation is performed, the resolution of the image obtained varies between the vertical direction and the transverse direction. However, in the present example, such problems are solved.

Note that, also in this case, the virtual normal image is generated by adding together, for each pixel position, light receiving signal values for two types of linearly polarized light with orthogonal polarization directions (a set of 0 deg and 90 deg or a set of 45 deg and 135 deg).

In this case, the cos curve fitting and the cos-curve-based virtual-polarized-image generation processing executed after the first to fourth polarized images are obtained are similar to those described above, and thus duplicate descriptions are omitted.

In the imaging section 11A as the above-described modified example, two types of linearly polarized light with polarization directions in an orthogonal relationship can be selectively received for one pixel pair 50 (one pixel position), and four types of linearly polarized light with different polarization directions can be selectively received at two pixel pairs 50 in the adjacent relationship.

Thus, the resolution of the virtual polarized image can be increased. Additionally, a plurality of light receiving elements 12a receives incident light on one pixel pair 50, and thus light reception sensitivity for each pixel position can be improved.

3. Applied Examples

The technique according to the present disclosure can be applied to various products. For example, the technique according to the present disclosure may be applied to an operating room system.

Figure 25:
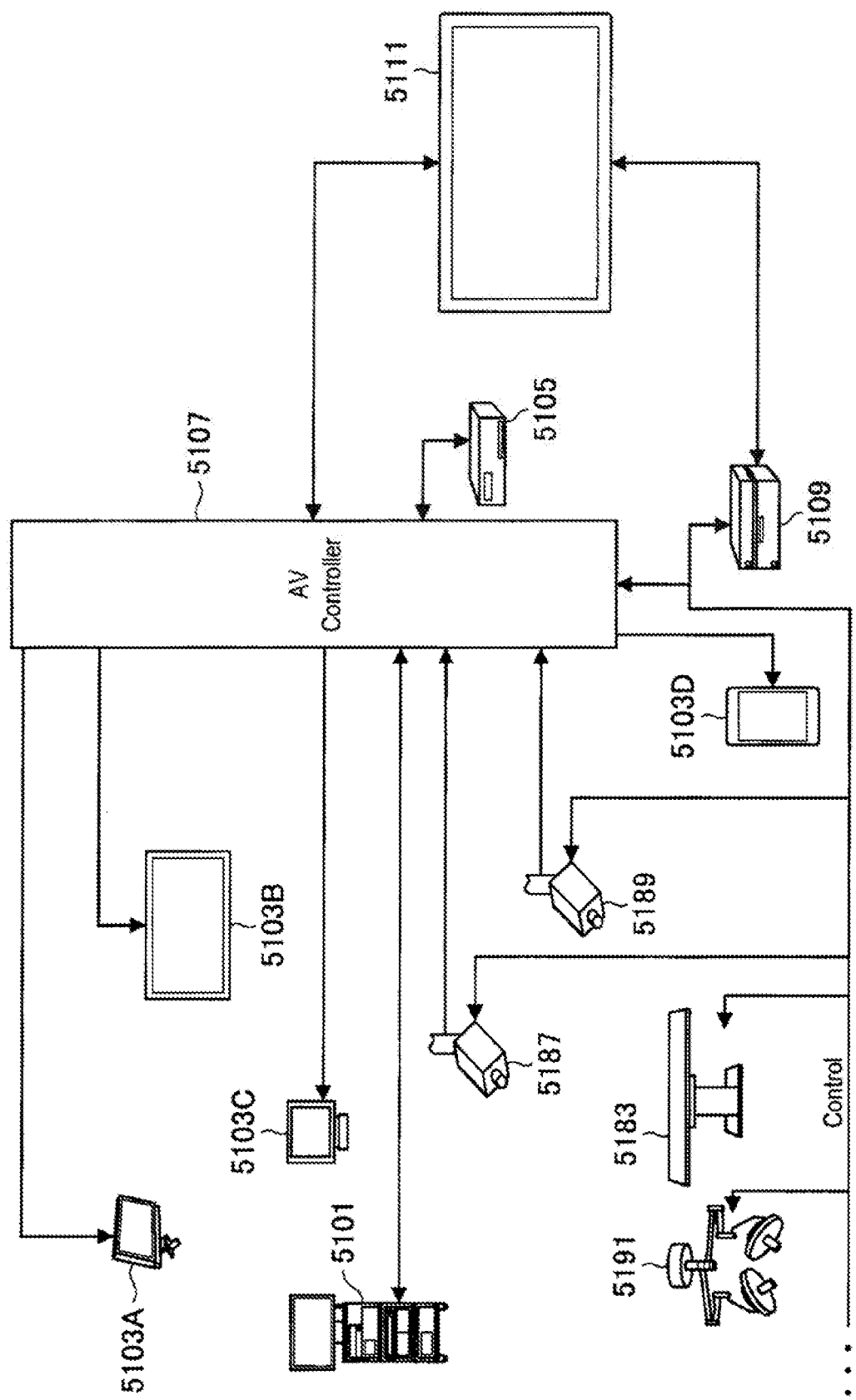
FIG. 25 is a diagram schematically illustrating a general configuration of an operating room system.

FIG. 25 is a diagram schematically illustrating a general configuration of an operating room system 5100 to which the technique according to the present disclosure may be applied. As seen in FIG. 25, the operating room system 5100 is configured by cooperatively connecting together, via an AV controller 5107 and an operating room control apparatus 5109, a group of apparatuses installed in an operating room.

In the operating room, various apparatuses may be installed. FIG. 25 illustrates, by way of example, various apparatus groups 5101 for endoscopic surgery, a ceiling camera 5187 provided on a ceiling of the operating room and imaging the vicinity of hands of a practitioner, and an operating room camera 5189 provided on the ceiling of the operating room and imaging the entire operating room, a plurality of display apparatuses 5103A to 5103D, a recorder 5105, a patient bed 5183, and lighting 5191.

In this regard, among the apparatuses, the apparatus group 5101 belongs to an endoscopic surgery system 5113 and includes an endoscope and a display apparatus displaying images captured by the endoscope. The apparatuses belonging to the endoscopic surgery system 5113 are also referred to as medical equipment. On the other hand, the display apparatuses 5103A to 5013D, the recorder 5105, the patient bed 5183, and the lighting 5191 are apparatuses installed separately from the endoscopic surgery system 5113, for example, in the operating room. The apparatuses not belonging to the endoscopic surgery system 5113 are also referred to as non-medical equipment. The AV controller 5107 and/or the operating room control apparatus 5109 cooperatively control the operations of medical equipment and non-medical equipment.

The AV controller 5107 integrally controls processing related to image display in the medical equipment and the non-medical equipment. Specifically, among the apparatuses included in the operating room system 5100, the apparatus group 5101, the ceiling camera 5187, and the operating room camera 5189 may be apparatuses (hereinafter, also referred to as source apparatuses) functioning to originate information to be displayed during surgery (hereinafter, also referred to as display information). Additionally, the display apparatuses 5103A to 5103D may be apparatuses to which display information is output (hereinafter also referred to as destination apparatuses). In addition, the recorder 5105 may be an apparatus corresponding to both a source apparatus and a destination apparatus. The AV controller 5107 functions to control operations of each source apparatus and the corresponding destination apparatus to acquire display information from the source apparatus, while transmitting the display information to the destination apparatus to cause the destination apparatus to display or record the display information. Note that the display information includes various images captured during surgery and various types of information related to the surgery (for example, physical information related to a patient, past examination results, and information related to operative procedures).

Specifically, the AV controller 5107 may receive information related to images of an affected area in the body cavity of the patient captured by the endoscope and transmitted as the display information. Additionally, the ceiling camera 5187 may transmit, as the display information, information related to images of the vicinity of the hands of the practitioner captured by the ceiling camera 5187. In addition, the operating room camera 5189 may transmit, as the display information, information related to images captured by the operating room camera 5189 and depicting the entire operating room. Note that in a case where the operating room system 5100 includes other apparatus with an imaging function, the AV controller 5107 may acquire information related to images captured by the apparatus, from the other apparatus as the display information.

Alternatively, for example, information related to images captured in the past is recorded in the recorder 5105 by the AV controller 5107. The AV controller 5107 can acquire, from the recorder 5105, information related to images captured in the past. Note that various types of information related to surgery may be pre-recorded in the recorder 5105.

The AV controller 5107 causes at least any one of the display apparatuses 5103A to 5103D, which are the destination apparatuses, to display acquired display information (that is, images captured during surgery and various types of information related to the surgery). In the illustrated example, the display apparatus 5103A is a display apparatus suspended from the ceiling of the operating room, the display apparatus 5103B is a display apparatus installed on a wall surface of the operating room, the display apparatus 5103C is a display apparatus installed on a desk in the operating room, and the display apparatus 5103D is mobile equipment (for example, a tablet PC (Personal Computer)) with a display function.

Additionally, although not illustrated in FIG. 25, the operating room system 5100 may include an apparatus outside the operating room. The apparatus outside the operating room may be, for example, a server connected to a network constructed inside or outside the hospital, a PC used by medical staff, or a projector installed in a meeting room in the hospital. In a case where such an outside apparatus is present outside the hospital, the AV controller 5107 can cause, for telemedicine, a display apparatus in another hospital to display information via a teleconference system or the like.

The operating room control apparatus 5109 integrally controls processing in the non-medical equipment other than the processing related to image display. For example, the operating room control apparatus 5109 controls driving of the patient bed 5183, the ceiling camera 5187, the operating room camera 5189, and the lighting 5191.

The operating room system 5100 is provided with an integrated operation panel 5111, and via the integrated operation panel 5111, the user can give an instruction for image display to the AV controller 5107 and give an instruction for the operation of the non-medical equipment to the operating room control apparatus 5109. The integrated operation panel 5111 includes a display apparatus including a touch panel provided on a display surface.

Figure 26:
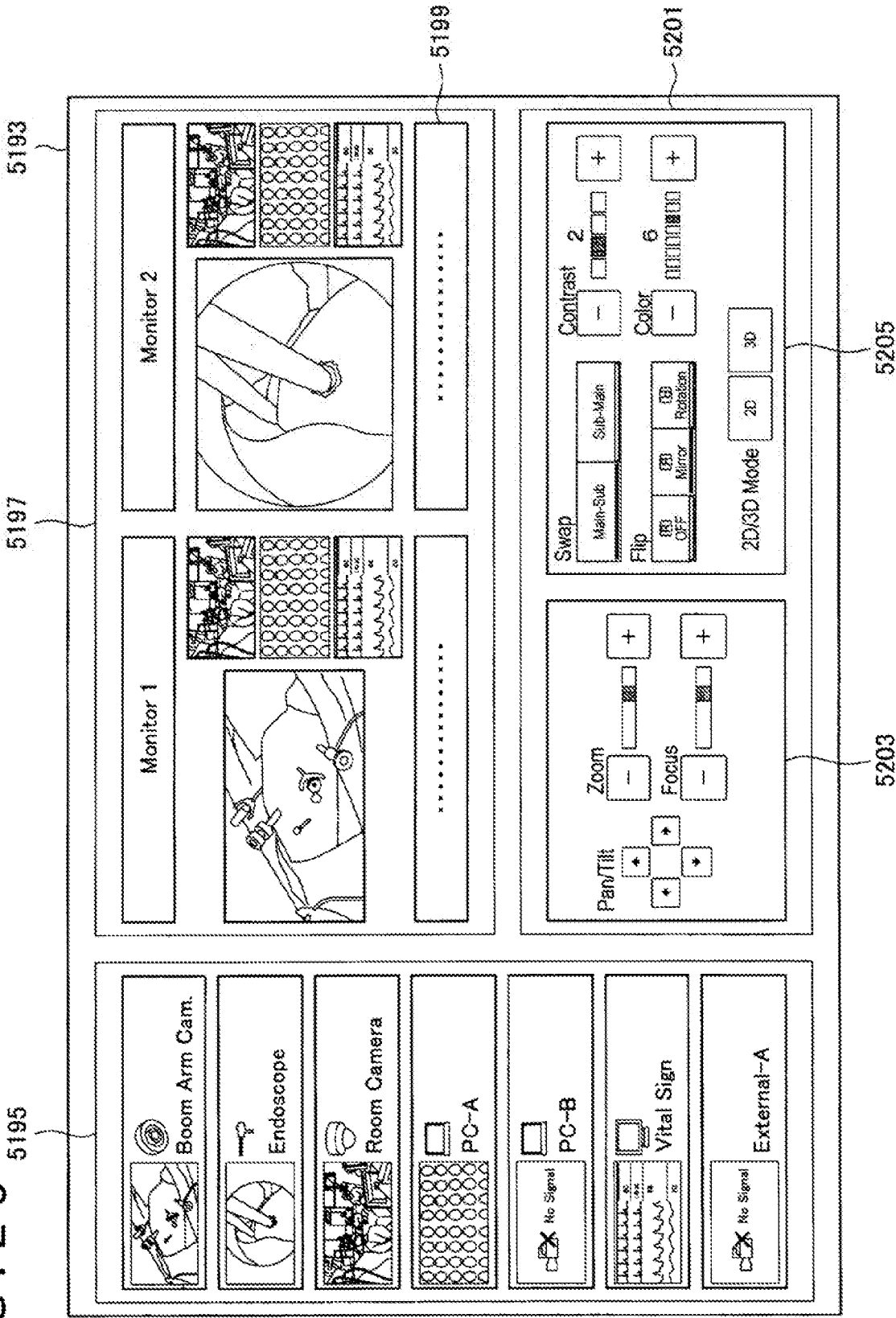
FIG. 26 is a diagram illustrating an example of display of an operation screen in a centralized operation panel.

FIG. 26 is a diagram illustrating an example of display of an operation screen on the integrated operation panel 5111. FIG. 26 illustrates, by way of example, an operation screen corresponding to a case where the operating room system 5100 is provided with two display apparatuses as destination apparatuses. As seen in FIG. 26, an operation screen 5193 is provided with a source selection area 5195, a preview area 5197, and a control area 5201.

The source selection area 5195 displays the source apparatuses installed in the operating room system 5100 and thumbnail images representing display information provided in the source apparatuses, the source apparatuses being associated with the thumbnail images. The user can select display information to be displayed by the display apparatus from any of the source apparatuses displayed in the source selection area 5195.

The preview area 5197 displays a preview of screens displayed on two display apparatuses (Monitor1 and Monitor2) that are destination apparatuses. In the illustrated example, one display apparatus performs PinP display of four images. The four images correspond to display information originated from a source apparatus selected in the source selection area 5195. One of the four images is displayed as a relatively large main image, and the remaining three images are displayed as relatively small sub-images. By performing appropriate selection in an area where the four images are displayed, the user can change the main image to any of the sub-images. Additionally, a status display area 5199 is provided below the area where the four images are displayed and may appropriately display a status related to surgery (for example, the elapsed time of surgery and physical information related to the patient).

The control area 5201 is provided with a source operation area 5203 displaying GUI (Graphical User Interface) components for operating the source apparatus and a destination operation area 5205 displaying GUI components for operating the destination apparatus. In the illustrated example, the source operation area 5203 is provided with GUI components for performing various operations (panning, tilting, and zooming) on a camera in a source apparatus with an imaging function. By appropriately selecting any of the GUI components, the user can control the operation of the camera in the source apparatus. Note that, although not illustrated, in a case where the source apparatus selected in the source selection area 5195 is the recorder (that is, the preview area 5197 is displaying images recorded in the recorder in the past), the source operation area 5203 is provided with GUI components for performing operations such as playback, playback stop, rewind, and fast-forward of the images.

Additionally, the destination operation area 5205 is provided with GUI components for performing various operations (swapping, flipping, color adjustment, contrast adjustment, switching between 2D display and 3D display) on display in a display apparatus corresponding to a destination apparatus. By appropriately selecting from the GUI components, the user can operate the display in the display apparatus.

Note that the operation screen displayed on the integrated operation panel 5111 is not limited to the illustrated example and that the user may be able to input operations on the apparatuses that may be controlled by the AV controller 5107 and the operating room control apparatus 5109, provided in the operating room system 5100.

Figure 27:
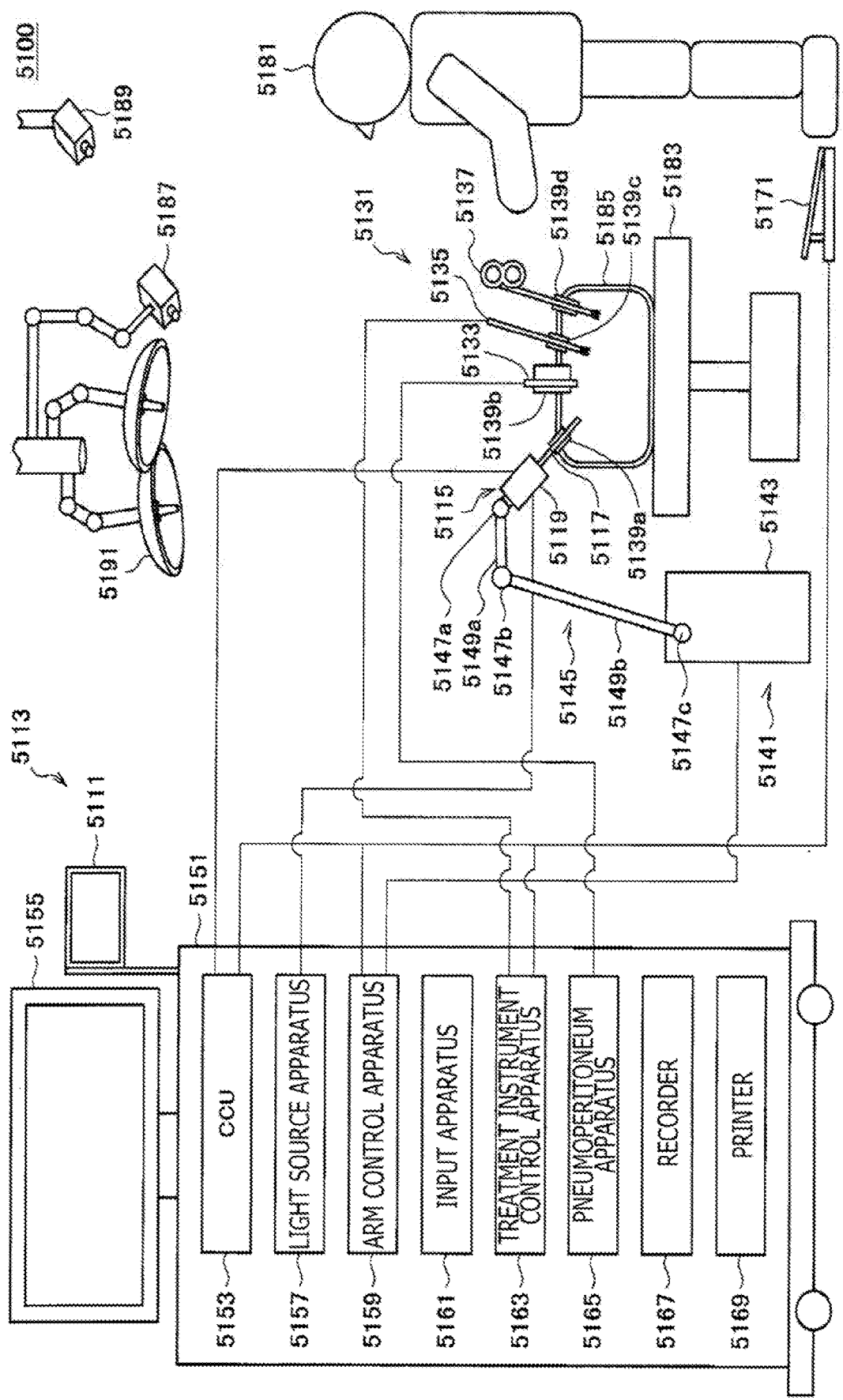
FIG. 27 is a diagram illustrating an example of a manner of an operation to which the operating room system is applied.

FIG. 27 is a diagram illustrating an example of the manner of surgery to which the above-described operating room system is applied. The ceiling camera 5187 and the operating room camera 5189 are provided on the ceiling of the operating room and can image the vicinity of the hands of the practitioner (surgeon) 5181 treating an affected area of a patient 5185 on the patient bed 5183 and also image the entire operating room. The ceiling camera 5187 and the operating room camera 5189 may be provided with a magnification adjusting function, a focal length adjusting function, an imaging direction adjusting function, and the like. The lighting 5191 is provided on the ceiling and irradiates at least the vicinity of the hands of the practitioner 5181 with light. The lighting 5191 allows appropriate adjustment of the amount of light radiated by the lighting 5191, the wavelength (color) of irradiation light, the irradiation direction of light, and the like.

As illustrated in FIG. 25, the endoscopic surgery system 5113, the patient bed 5183, the ceiling camera 5187, the operating room camera 5189, and the lighting 5191 are connected together for cooperation via the AV controller 5107 and the operating room control apparatus 5109 (not illustrated in FIG. 27). The integrated operation panel 5111 is provided in the operating room, and as described above, the user can appropriately operate, via the integrated operation panel 5111, the apparatuses present in the operating room.

A configuration of the endoscopic surgery system 5113 will be described below. As illustrated, the endoscopic surgery system 5113 includes an endoscope 5115, another surgical instrument 5131, a support arm apparatus 5141 supporting the endoscope 5115, and a cart 5151 in which various apparatuses for endoscopic surgery are mounted.

In endoscopic surgery, instead of laparotomy on the abdominal wall, a procedure is executed in which the abdominal wall is punctured with a plurality of tubular opening instruments referred to as trocars 5139*a* to 5139*d*. Through the trocars 5139*a* to 5139*d*, a lens barrel 5117 of the endoscope 5115 and other surgical instruments are inserted into the body cavity of the patient 5185. In the illustrated example, as the other surgical instruments 5131, a pneumoperitoneum tube 5133, an energy treatment instrument 5135, and forceps 5137 are inserted into the body cavity of the patient 5185. Additionally, the energy treatment instrument 5135 is a treatment instrument for incision and exfoliation of tissues, sealing of blood vessels, or the like using a high frequency current or ultrasonic vibration. However, the illustrated surgical instruments 5131 are only illustrative, and various surgical instruments commonly used for endoscopic surgery, for example, tweezers and a retractor, may be used as the surgical instruments 5131.

A display apparatuses 5155 displays an image of the affected area in the body cavity of the patient 5185 captured by the endoscope 5115. While viewing the image of the affected area displayed on the display apparatus 5155 in real time, the practitioner 5181 uses the energy treatment instrument 5135 and the forceps 5137 to perform treatment, for example, excision of the affected area. Note that, although not illustrated, the pneumoperitoneum tube 5133, the energy treatment instrument 5135, and the forceps 5137 are supported by the practitioner 5181, an assistant, or the like during surgery.

(Support Arm Apparatus)

The support arm apparatus 5141 includes an arm portion 5145 extending from a base portion 5143. In the illustrated example, the arm portion 5145 includes joint portions 5147*a*, 5147*b*, and 5147*c*, and links 5149*a* and 5149*b*, and is driven by control from an arm control apparatus 5159. The arm portion 5145 supports the endoscope 5115 to control the position and orientation of the endoscope 5115. Thus, the position of the endoscope 5115 may be stably fixed.

(Endoscope)

The endoscope 5115 includes the lens barrel 5117 inserted into the body cavity of the patient 5185, and an area of the lens barrel 5117 spanning a predetermined length from a distal end of the lens barrel 5117 is inserted into the body cavity of the patient 5185. The endoscope 5115 also includes a camera head connected to a proximal end of the lens barrel 5117. In the illustrated example, the endoscope 5115 is depicted that is configured as what is called a rigid mirror including a rigid lens barrel 5117. However, the endoscope 5115 may be configured as what is called a flexible mirror including a flexible lens barrel 5117.

An opening fitted with an objective lens is provided at the distal end of the lens barrel 5117. A light source apparatus 5157 is connected to the endoscope 5115. Light generated by the light source apparatus 5157 is guided to the distal end of the lens barrel by a light guide extending into the lens barrel 5117 and is radiated to an observation target in the body cavity of the patient 5185 via the objective lens. Note that the endoscope 5115 may be a forward-viewing endoscope, a forward-oblique viewing endoscope, or a side-viewing endoscope.

An optical system and an imaging element are provided inside the camera head 5119, and reflected light (observation light) from the observation target is focused on the imaging element by the optical system. The imaging element photoelectrically converts the observation light to generate an electric signal corresponding to observation light, that is, an image signal corresponding to an observation image. The image signal is transmitted to a camera control unit (CCU) 5153 as RAW data. Note that the camera head 5119 is equipped with a function to appropriately drive the optical system to adjust the magnification and focal length.

Note that, for example, to support stereoscopic viewing (3D display), the camera head 5119 may be provided with a plurality of imaging elements. In this case, a plurality of relay optical systems is provided inside the lens barrel 5117 to guide observation light to each of the plurality of imaging elements.

(Various Apparatuses Mounted in Cart)

The CCU 5153 includes a CPU (Central Processing Unit) and a GPU (Graphical Processing Unit) and integrally controls operations of the endoscope 5115 and the display apparatus 5155. Specifically, on an image signal received from the camera head 5119, the CCU 5153 executes various types of image processing for displaying an image based on the image signal, for example, development processing (demosaic processing). The CCU 5153 provides the display apparatus 5155 with the image signal subjected to the image processing. Additionally, the AV controller 5107 illustrated in FIG. 25 is connected to the CCU 5153. The CCU 5153 also provides the AV controller 5107 with the image signal subjected to the image processing. Additionally, the CCU 5153 transmits a control signal to the camera head 5119 to control driving of the camera head 5119. The control signal may include information related to imaging conditions such as the magnification and focal length. The information related to the imaging conditions may be input via the input apparatus 5161 or the above-described integrated operation panel 5111.

Under the control of the CCU 5153, the display apparatus 5155 displays an image based on the image signal subjected to the image processing by the CCU 5153. In a case where the endoscope 5115 supports image capturing at a high resolution, for example, 4K (3840 horizontal pixels×2160 vertical pixels) or 8K (7680 horizontal pixels×4320 vertical pixels) and/or supports 3D display, the display apparatus 5155 used may correspondingly be capable of providing high-resolution display and/or 3D display. In a case where the endoscope 5115 supports image capturing at a high resolution such as 4K or 8K, the display apparatus 5155 used provides an enhanced sense of immersion in a case where the display apparatus 5155 is 55 inches or larger in size. Additionally, a plurality of display apparatuses 5155 varying in resolution and size may be provided depending on the intended use.

The light source apparatus 5157 includes a light source, for example, a LED (light emitting diode), and supplies the endoscope 5115 with irradiation light used in capturing an image of the surgical area.

The arm control apparatus 5159 includes a processor, for example, a CPU, and operates in accordance with a predetermined program to control driving of the arm portion 5145 of the support arm apparatus 5141 in accordance with a predetermined control method.

The input apparatus 5161 is an input interface for the endoscopic surgery system 5113. The user can input various types of information and instructions to the endoscopic surgery system 5113. For example, the user inputs, via the input apparatus 5161, various types of information related to the surgery such as the physical information related to the patient and the information related to the operative procedure. Additionally, for example, the user inputs, via the input apparatus 5161, an instruction to drive the arm portion 5145, an instruction to change the imaging conditions for the endoscope 5115 (type of irradiation light, magnification, focal length, and the like), an instruction to drive the energy treatment instrument 5135, and the like.

The type of the input apparatus 5161 is not limited, and the input apparatus 5161 may be any of various well-known input apparatuses. As the input apparatus 5161, for example, a mouse, a keyboard, a touch panel, a switch, a foot switch 5171, and/or a lever is applicable. In a case where a touch panel is used as the input apparatus 5161, the touch panel may be provided on a display surface of the display apparatus 5155.

Alternatively, the input apparatus 5161 is a device worn by the user, for example, an eyeglass-type wearable device or an HMD (Head Mounted Display). Various types of input are provided in accordance with gestures of the user or the line of sight of the user detected by the above-described devices. Additionally, the input apparatus 5161 includes a camera capable of detecting motion of the user, and various types of input are provided in accordance with gestures of the user or the line of sight of the user detected in a video captured by the camera. Furthermore, the input apparatus 5161 includes a microphone capable of collecting voice of the user, and various types of sound input are provided via the microphone. The input apparatus 5161 is thus configured to enable various types of information to be input in a noncontact manner, and thus the user belonging to a clean area (for example, the practitioner 5181) can operate equipment belonging to an unclean area in a noncontact manner. Additionally, the user can operate equipment without releasing the held surgical instrument, thus improving the convenience of the user.

The treatment instrument control apparatus 5163 controls driving of the energy treatment instrument 5135 for cauterization or incision of tissues or sealing of blood vessels. The pneumoperitoneum apparatus 5165 feeds a gas into the body cavity of the patient 5185 via the pneumoperitoneum tube 5133 to inflate the body cavity in order to provide a field of view for the endoscope 5115 and a work space for the practitioner. The recorder 5167 is an apparatus in which various types of information related to the surgery. A printer 5169 is an apparatus capable of printing various types of information related to the surgery in various forms such as text, images, or graphs.

Particularly, characteristic components of the endoscopic surgery system 5113 will be described below in further detail.

(Support Arm Apparatus)

The support arm apparatus 5141 includes a base portion 5143 that is a base and an arm portion 5145 extending from the base portion 5143. In the illustrated example, the arm portion 5145 includes a plurality of joint portions 5147a, 5147b, and 5147c and a plurality of links 5149a and 5149b coupled to each other by the joint portion 5147b. However, in FIG. 27, for simplification, the configuration of the arm portion 5145 is simplified for illustration. In actuality, the shapes, numbers, and arrangements of the joint portions 5147a to 5147c and the links 5149a and 5149b, the directions of rotating shafts of the joint portions 5147a to 5147c, and the like may be appropriately set to allow the arm portion 5145 to have a desired degree of freedom. For example, the arm portion 5145 may suitably be configured with six or more degrees of freedom. Accordingly, the endoscope 5115 can be freely moved within a movable range of the arm portion 5145, and thus the lens barrel 5117 of the endoscope 5115 can be inserted into the body cavity of the patient 5185 from a desired direction.

The joint portions 5147a to 5147c are provided with respective actuators and are each configured to be rotatable around a predetermined rotating shaft on the basis of driving by the corresponding actuator. The driving by the actuators is controlled by the arm control apparatus 5159 to control the rotation angle of each of the joint portions 5147a to 5147c, thus controlling driving of the arm portion 5145. Accordingly, the position and orientation of the endoscope 5115 may be controlled. In this regard, the arm control apparatus 5159 can control driving of the arm portion 5145 in accordance with various well-known control methods such as force control or position control.

For example, the practitioner 5181 may provide appropriate operational input via the input apparatus 5161 (including the foot switch 5171) to cause the arm control apparatus 5159 to appropriately control driving of the arm portion 5145 in accordance with the operational input, thus controlling the position and orientation of the endoscope 5115. This control allows the endoscope 5115 at a distal end of the arm portion 5145 to be moved from any position to any different position and allows the endoscope 5115 to be fixedly supported at the position resulting from the movement. Note that the arm portion 5145 may be operated by what is called a master slave method. In this case, the arm portion 5145 may be remotely operated by the user via the input apparatus 5161 installed in a place away from the operating room.

Additionally, in a case where force control is applied, the arm control apparatus 5159 may provide what is called power assist control to cause the actuators for the joint portions 5147a to 5147c to drive the arm portion 5145 such that the arm portion 5145 receives an external force from the user and moves smoothly in accordance with the external force. Thus, when the user moves the arm portion 5145 while directly touching the arm portion 5145, the user can move the arm portion 5145 by a relatively weak force. Accordingly, the endoscope 5115 can be intuitively moved by an easier operation, allowing the convenience of the user to be improved.

In this regard, in the endoscopic surgery, the endoscope 5115 is generally supported by a surgeon referred to as a scopist. In contrast, the use of the support arm apparatus 5141 enables the position of the endoscope 5115 to be more reliably fixed without relying on manual operations. Thus, images of the affected area can be stably obtained, enabling the surgery to be smoothly performed.

Note that the arm control apparatus 5159 need not necessarily be provided in the cart 5151. Additionally, the arm control apparatus 5159 need not necessarily be a single apparatus. For example, the arm control apparatus 5159 may be provided for each of the joint portions 5147a to 5147c of the arm portion 5145 of the support arm apparatus 5141, and a plurality of arm control apparatuses 5159 may cooperate with one another in achieving driving control of the arm portion 5145.

(Light Source Apparatus)

The light source apparatus 5157 supplies the endoscope 5115 with irradiation light used to capture an image of the surgical area. The light source apparatus 5157 includes a white light source including, for example, a LED, a laser light source, or a combination of the LED and the laser light source. In this regard, in a case where the white light source includes a combination of RGB laser light sources, an output intensity and an output timing of each color (each wavelength) can be accurately controlled, allowing the light source apparatus 5157 to adjust white balance of a captured image. Additionally, in this case, the observation target is irradiated with the laser light from each of the RGB laser light sources in a time division manner, and driving of the imaging element of the camera head 5119 is controlled synchronously with irradiation timings. Then, images respectively corresponding to R, G, and B can be captured in a time division manner. This method allows color images to be obtained without a color filter provided in the imaging element.

Additionally, driving of the light source apparatus 5157 may be controlled to vary the intensity of light output from the light source apparatus 5157 at predetermined time intervals. By controlling driving of the imaging element of the camera head 5119 synchronously with timings for variation of the intensity of light to acquire images in a time division manner and synthesizing the images acquired, high dynamic range image free from what is called blocked-up shadows and blown-out highlights can be generated.

Additionally, the light source apparatus 5157 may be configured to be capable of supplying light of a predetermined wavelength band corresponding to special light imaging. In the special light imaging, for example, what is called narrow band imaging is performed that, for example, utilizes the dependence, on wavelength, of absorbance of light into body tissues and in which irradiation with light having a narrower band than irradiation light during normal observation (that is, white light) is used to capture an image of a predetermined tissue such as a blood vessel in the mucous membrane surface layer in a high contrast. Alternatively, in the special light imaging, fluorescence imaging may be performed that includes obtaining images using fluorescence generated by irradiation with excitation light. The fluorescence imaging may include, for example, irradiating a body tissue with excitation light and observing fluorescence from the body tissue (autofluorescence imaging) or obtaining a fluorescent image by locally injecting a reagent such as indocyanine green (ICG) into the body tissue while irradiating the body tissue with excitation light corresponding to the fluorescence wavelength of the reagent. The light source apparatus 5157 may be configured to be capable of supplying narrow band light and/or excitation light corresponding to such special light imaging.

(Camera Head and CCU)

Figure 28:
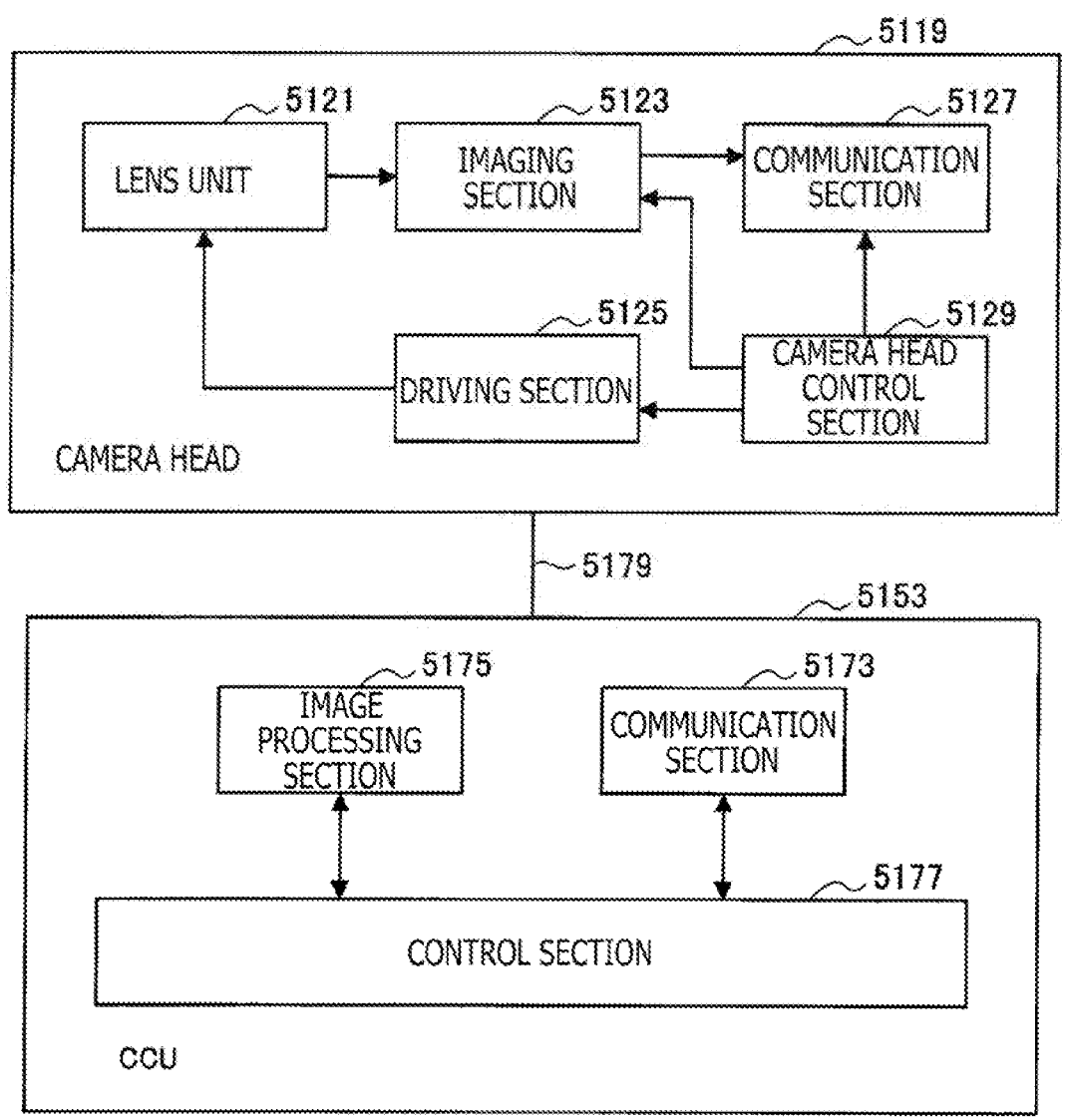
FIG. 28 is a block diagram illustrating an example of a functional configuration of a camera head and a CCU illustrated in FIG. 27.

With reference to FIG. 28, the functions of the camera head 5119 and CCU 5153 of the endoscope 5115 will be described in further detail. FIG. 28 is a block diagram illustrating an example of a functional configuration of the camera head 5119 and the CCU 5153 illustrated in FIG. 27.

As seen in FIG. 28, the camera head 5119 includes, as functions of the camera head 5119, a lens unit 5121, an imaging section 5123, a driving section 5125, a communication section 5127, and a camera head control section 5129. Additionally, the CCU 5153 includes, as functions of the CCU 5153, a communication section 5173, an image processing section 5175, and a control section 5177. The camera head 5119 and the CCU 5153 are bidirectionally communicatively connected to each other by a transmission cable 5179.

First, the functional configuration of the camera head 5119 will be described. The lens unit 5121 is an optical system provided at a connection portion between the camera head 5119 and the lens barrel 5117. Observation light captured from a distal end of the lens barrel 5117 is guided to the camera head 5119 and enters the lens unit 5121. The lens unit 5121 includes a combination of a plurality of lenses including a zoom lens and a focus lens. The lens unit 5121 have optical characteristics adjusted to focus observation light on the light receiving surface of the imaging element of the imaging section 5123. Additionally, the zoom lens and the focus lens are configured such that the positions of the lenses on the optical axis can be moved to adjust the magnification and focus of the captured image.

The imaging section 5123 includes an imaging element and is disposed to follow the lens unit 5121. Observation light having passed through the lens unit 5121 is focused on the light receiving surface of the imaging element and is photoelectrically converted into an image signal corresponding to an observation image. The image signal generated by the imaging section 5123 is provided to the communication section 5127.

As the imaging element 12 included in the imaging section 5123, for example, a CMOS (Complementary Metal Oxide Semiconductor) type image sensor is used that includes a Bayer array and that is capable of capturing color images. Note that the imaging element used may be capable of capturing of images with a high resolution, for example, 4K or higher. A high-resolution image of the surgical area allows the practitioner 5181 to recognize the state of the surgical area in further detail and thus to smoothly perform the surgery.

Additionally, the imaging element included in the imaging section 5123 includes a pair of imaging elements for respectively acquiring image signals for the right eye and for the left eye corresponding to 3D display. The 3D display allows the practitioner 5181 to more accurately recognize the depth of the biological tissue in the affected area. Note that, in a case where the imaging section 5123 includes multiple imaging elements, a plurality of lens units 5121 corresponding to the respective imaging elements are provided.

Additionally, the imaging section 5123 need not necessarily be provided in the camera head 5119. For example, the imaging section 5123 may be provided inside the lens barrel 5117 immediately after the objective lens.

The driving section 5125 includes an actuator and moves the zoom lens and focus lens of the lens unit 5121 by a predetermined distance along the optical axis under the control of the camera head control section 5129. Thus, the magnification and focus of the image captured by the imaging section 5123 may be appropriately adjusted.

The communication section 5127 includes a communication apparatus for transmitting and receiving various types of information to and from the CCU 5153. The communication section 5127 transmits an image signal obtained from the imaging section 5123, to the CCU 5153 via the transmission cable 5179 as RAW data. In this regard, for display of a captured image of the surgical area with low latency, the image signal is preferably transmitted by optical communication. The reason is as follows. During surgery, the practitioner 5181 performs the operation while observing the state of the affected area in the captured image, and safer and more reliable surgery requires real-time display of moving images of the surgical area whenever possible. In a case where optical communication is performed, the communication section 5127 is provided with a photoelectric conversion module converting an electric signal into an optical signal. The image signal is converted into an optical signal by the photoelectric conversion module, with the optical signal transmitted to the CCU 5153 via the transmission cable 5179.

Additionally, the communication section 5127 receives, from the CCU 5153, a control signal for controlling driving of the camera head 5119. The control signal includes information related to the imaging conditions, for example, information indicating a frame rate for the captured image, information indicating an exposure value during imaging, and/or information indicating the magnification and focus of the captured image. The communication section 5127 provides the received control signal to the camera head control section 5129. Note that the control signal from the CCU 5153 may also be transmitted by optical communication. In this case, the communication section 5127 is provided with a photoelectric conversion module converting an optical signal into an electric signal. The control signal is converted into an electric signal by the photoelectric conversion module, with the electric signal transmitted to the camera head control section 5129.

Note that the imaging conditions such as the above-described frame rate, exposure value, magnification, and focus are automatically set by the control section 5177 of the CCU 5153 on the basis of the acquired image signal. In other words, what is called an AE (Auto Exposure) function, an AF (Auto Focus) function, and an AWB (Auto White Balance) function are mounted in the endoscope 5115.

The camera head control section 5129 controls driving of the camera head 5119 on the basis of the control signal received from the CCU 5153 via the communication section 5127. For example, the camera head control section 5129 controls driving of the imaging element of the imaging section 5123 on the basis of information specifying the frame rate for the captured image and/or information specifying the exposure during imaging. Additionally, for example, the camera head control section 5129 appropriately moves the zoom lens and focus lens of the lens unit 5121 via the driving section 5125 on the basis of information specifying the magnification and focus of the captured image. The camera head control section 5129 may further function to store information for identifying the lens barrel 5117 and the camera head 5119.

Note that, by disposing components such as the lens unit 5121 and the imaging section 5123 in an airtight and waterproof closed structure, the camera head 5119 can be made resistant to autoclave sterilization treatment.

Now, the functional configuration of the CCU 5153 will be described. The communication section 5173 includes a communication apparatus for transmitting and receiving various types of information to and from the camera head 5119. The communication section 5173 receives an image signal transmitted from the camera head 5119 via the transmission cable 5179. In this regard, the image signal may suitably be transmitted by optical communication as described above. In this case, in association with the optical communication, the communication section 5173 is provided with a photoelectric conversion module converting an optical signal into an electric signal. The communication section 5173 provides the image processing section 5175 with the image signal converted into the electric signal.

Additionally, the communication section 5173 transmits, to the camera head 5119, a control signal for controlling driving of the camera head 5119. The control signal may be transmitted by optical communication.

The image processing section 5175 executes various types of image processing on an image signal including RAW data transmitted from the camera head 5119. The image processing includes various types of well-known processing, for example, development processing, image quality improvement processing (band enhancement processing, super-resolution processing, NR (Noise reduction) processing and/or image stabilization processing), and/or enlargement processing (electronic zoom processing). Additionally, the image processing section 5175 executes detection processing on the image signal to allow AE, AF, and AWB to be performed.

The image processing section 5175 includes a processor such as a CPU or a GPU, and the processor may operate in accordance with a predetermined program to execute the above-described image processing or detection processing. In a case where the image processing section 5175 includes a plurality of GPUs, the image processing section 5175 appropriately divides the information related to the image signal, and the plurality of GPUs execute image processing in parallel.

The control section 5177 provides various types of control related to imaging of the surgical area by the endoscope 5115 and display of the captured image. For example, the control section 5177 generates a control signal for controlling driving of the camera head 5119. In this regard, in a case where the imaging conditions have been input by the user, the control section 5177 generates a control signal on the basis of the input from the user. Alternatively, in a case where the endoscope 5115 is equipped with the AE function, the AF function, and the AWB function, the control section 5177 appropriately calculates an optimum exposure value, an optimum focal length, and an optimum white balance in accordance with the results of the detection processing by the image processing section 5175, to generate a control signal.

Additionally, the control section 5177 causes the display apparatus 5155 to display an image of the surgical area on the basis of the image signal subjected to the image processing by the image processing section 5175. In this regard, the control section 5177 uses various image recognition techniques to recognize various objects in the image of the surgical area. For example, by detecting the shapes, colors, or the like of edges of objects contained in the image of the surgical area, the control section 5177 can recognize surgical instruments such as forceps, a specific biological region, bleeding, mist resulting from the use of the energy treatment instrument 5135, and the like. When causing the display apparatus 5155 to display the image of the surgical area, the control section 5177 uses the recognition results to superimpose various types of surgery assistance information on the image of the surgical area for display. The surgery assistance information superimposed on the image and presented to the practitioner 5181 enables the surgery to be more safely and reliably performed.

The transmission cable 5179 connecting the camera head 5119 and the CCU 5153 is an electric-signal cable enabling communication of electric signals, optical fibers enabling optical communication, or a composite cable of the electric-signal cable and the optical fibers.

In this regard, in the illustrated example, the transmission cable 5179 is used for wired communication. However, the communication between the camera head 5119 and the CCU 5153 may be wireless. In a case where the communication between the camera head 5119 and the CCU 5153 is wireless, the transmission cable 5179 need not be laid in the operating room, allowing avoidance of a situation where movement of the medical staff in the operating room is obstructed by the transmission cable 5179.

The example of the operating room system 5100 to which the technique according to the present disclosure is applied has been described. Note that, in the described case, by way of example, the medical system to which the operating room system 5100 is applied is the endoscopic surgery system 5113 but that the configuration of the operating room system 5100 is not limited to such an example. For example, the operating room system 5100 may be applied to a flexible endoscopic system for examination or a microsurgery system in place of the endoscopic surgery system 5113.

The technique according to the present disclosure is suitably applicable to a configuration for generation of an image of the surgical area, which is included in the above-described configurations. Specifically, for example, the imaging section 11 or 11A in the embodiment may be applied as the imaging section 5123 of the camera head 5119, the angle detecting section 17 may be provided in the camera head 5119, and the image processing section 5175 in the CCU 5153 may execute the processing otherwise performed by the polarized image generating section 21 or 21A in the embodiment. Note that, in this case, the image processing section 5175 can be provided in the camera head 5119. Additionally, in a case where the image processing section 5175 executes the processing otherwise performed by the polarized image generating section 21A, the light source apparatus 5157 is configured to selectively radiate linearly polarized light with a particular polarization direction.

By thus applying the technique according to the present disclosure to generation of an image of the surgical area, the polarization filter effect on the image of the surgical area can be prevented from being changed due to a change in the orientation of the imaging section. Additionally, in a case where the light source apparatus 5157 is configured to provide polarized lighting, the camera head 5119 need not be rotated according to the polarization direction of the polarized lighting. This eliminates a need to limit the operation of the arm portion 5145 in order to prevent twisting, breaking, and the like of the signal cable.

4. Conclusion of Embodiment

As described above, the imaging apparatus (1 or 1A) of the embodiment includes an imaging section (11 or 11A) including a first pixel capable of receiving light in a first polarization direction and a second pixel capable of receiving light in a second polarization direction different from the first polarization direction, a detection section (angle detecting section 17) detecting an orientation of the imaging section, and an image generating section (21 or 21A) generating, on the basis of signals for the first and second pixels, an image corresponding to a polarization direction corresponding to a detection result from the detection section.

This enables generation, as an image corresponding to a particular polarization direction, that is, an image corresponding to application of a polarization filter effect, an image corresponding to a polarization direction corresponding to a change in the orientation of the imaging section.

Accordingly, the polarization filter effect can be prevented from being changed due to a change in the orientation of the imaging apparatus.

Additionally, in the imaging apparatus of the above-described embodiment, the image generating section sets a virtual filter angle corresponding to a rotation angle of a rotatable polarization filter in a case where a captured image is assumed to be obtained by receiving light via the polarization filter, and generates the image on the basis of the virtual filter angle corrected on the basis of the detection result from the detection section.

Accordingly, an image can be obtained that is based on the virtual filter angle and that is corrected to cancel the change in orientation of the imaging section.

Thus, the polarization filter effect can be prevented from being changed due to a change in the orientation of the imaging apparatus.

In the imaging apparatus of the above-described embodiment, the imaging section includes a plurality of pixel units (U, U') arranged in the imaging section and each including a plurality of pixels each including a predetermined number of light receiving elements and a polarization section (polarization filter 13a or polarization splitters 51-1 and 51-2) causing the respective pixels to receive linearly polarized light in different polarization directions, and the image generating section generates, on the basis of light receiving signals for the plurality of pixels included in the pixel unit and function information representing a relationship between the virtual filter angle and the light receiving signal values, an image corresponding to a polarization direction corresponding to the virtual filter angle corrected on the basis of the detection result from the detection section.

Accordingly, the polarization filter effect remains unchanged in spite of a change in the orientation of the imaging section.

That is, the polarization filter effect can be prevented from being changed due to a change in the orientation of the imaging apparatus.

Additionally, in the imaging apparatus (1) of the embodiment, operational input of the virtual filter angle is enabled.

Accordingly, the user can operationally adjust the polarization filter effect, and thus the degree of freedom of imaging is improved.

Furthermore, in the imaging apparatus of the embodiment, the operational input is performed using a rotary operator.

This enables the user to be provided with an operation feeling similar to an operation feeling obtained in a case where the rotatable polarization filter is rotationally operated.

Furthermore, in the imaging apparatus of the embodiment, the image generating section is capable of generating, on the basis of light receiving signals for the plurality of pixels included in the pixel unit, a virtual polarized image corresponding to an image obtained using the virtual filter angle as an optional angle and a virtual normal image that is an image for which separation of polarized light performed by the polarization section is canceled, and separately generates the virtual polarized image and the virtual normal image depending on an operation.

Accordingly, the user can operationally instruct turning ON/OFF of the polarization filter effect.

That is, the polarization filter effect can be turned ON/OFF depending on a request from the user.

Additionally, the imaging apparatus of the embodiment includes a display control section (31) causing a display section to display the virtual polarized image corresponding to an image obtained by setting the virtual filter angle as an optional angle.

Accordingly, the user can be prompted to check the polarization filter effect. Additionally, in a case where the virtual filter angle can be operationally specified, the user can be prompted to check a change in polarization filter effect in response to operation.

Furthermore, in the imaging apparatus of the embodiment, the imaging section includes a plurality of pixel units arranged in the imaging section and each including a plurality of pixels each including a predetermined number of light receiving elements and a polarization section causing the respective pixels to receive linearly polarized light in different polarization directions, the image generating section is capable of generating, on the basis of light receiving signals for the plurality of pixels included in the pixel unit, a virtual polarized image corresponding to an image obtained by setting the virtual filter angle as an optional angle and a virtual normal image that is an image for which separation of polarized light performed by the polarization section is canceled, and the display control section switches, on the basis of a predetermined operation performed while any one of the virtual polarized image or the virtual normal image is being displayed on the display section, a display state of the display section from a state where any one of the virtual polarized image or the virtual normal image is displayed to a state where the other of the virtual polarized image or the virtual normal image is displayed.

This allows the user to easily recognize whether or not the polarization filter effect is present, enabling convenience to be improved.

Furthermore, in the imaging apparatus of the embodiment, the display control section maintains the display state where the other of the virtual polarized image or the virtual normal image is displayed while the predetermined operation is continuing, and switches, in response to end of the predetermined operation, to the display state where any one of the virtual polarized image or the virtual normal image is displayed.

Accordingly, to recover the display state where any one of the virtual polarized image or the virtual normal image is displayed after causing the other of the virtual polarized image or the virtual normal image to be displayed, the user is only required to end the predetermined operation.

Thus, an operational burden involved in switching of display can be reduced.

Furthermore, in the imaging apparatus of the embodiment, operational input of the virtual filter angle is enabled, the image generating section generates at least one of an increased-angle image that is the virtual polarized image obtained by setting the virtual filter angle larger than an angle provided by the operational input or a reduced-angle image that is the virtual polarized image obtained by setting the virtual filter angle smaller than the angle provided by the operational input, and the display control section causes the display section to display at least one of the increased-angle image or the reduced-angle image.

Accordingly, the user can be prompted to check how the polarization filter effect is changed in each of a case where the virtual filter angle is increased from a current indicated angle and a case where the virtual filter angle is reduced from the current indicated angle.

Thus, the user can be assisted to easily adjust the polarization filter effect.

Additionally, in the imaging apparatus of the embodiment, the operational input of the virtual filter angle is performed using a rotary operator, and the display control section causes, in a case of causing the increased-angle image to be displayed, information related to a rotating direction of the rotary operator and used to increase the virtual filter angle to be displayed at a display position corresponding to the increased-angle image, and causes, in a case of causing the reduced-angle image to be displayed, information related to the rotating direction of the rotary operator and used to reduce the virtual filter angle to be displayed at a display position corresponding to the reduced-angle image.

This allows the user to intuitively understand which direction the rotary operator needs to be rotated in to produce the desired polarization filter effect.

Accordingly, the user can be assisted to more easily adjust the polarization filter effect.

Furthermore, the imaging apparatus of the embodiment includes an acceptance section (32) accepting operational designation of a subject, the image generating section is capable of generating, on the basis of light receiving signals for the plurality of pixels included in the pixel unit and the function information, the virtual polarized image corresponding to an image obtained by setting the virtual filter angle as an optional angle, and the image generating section acquires the function information based on a light receiving signal value for a pixel position receiving light from the designated subject, calculates the virtual filter angle at which the light receiving signal value for the pixel position satisfies a predetermined condition, as a target angle on the basis of the function information, corrects the target angle on the basis of the detection result from the detection section to obtain a corrected angle, and generates the virtual polarized image with the virtual filter angle set to the corrected angle.

Accordingly, by performing an operation of designating the subject, the user can obtain the virtual polarized image adjusted to make a light reflection aspect of the desired subject satisfy a predetermined condition.

Thus, the embodiment reduces the operational burden on the user in producing the predetermined polarization filter effect.

Furthermore, in the imaging apparatus of the embodiment, the image generating section calculates, as the target angle, the virtual filter angle at which the light receiving signal for the pixel position is approximately minimized.

Accordingly, by performing an operation of designating the subject, the user can obtain the virtual polarized image adjusted to remove reflection from the desired subject.

Thus, the embodiment reduces an operational burden on the user in producing a polarization filter effect for removing reflection from a predetermined subject.

Additionally, the imaging apparatus of the embodiment includes a display control section causing a display section to display a captured image captured by the imaging section, and the acceptance section accepts designation of the subject performed by a touch operation of touching a display screen of the display section.

Accordingly, an operation of designating the subject is facilitated, enabling a reduction in the operational burden on the user.

Furthermore, the imaging apparatus of the embodiment includes a display control section controlling a display section, the image generating section calculates, for each of predetermined pixel positions in the imaging section, a value representing a degree of change in the light receiving signal value in response to a change in the virtual filter angle on the basis of the function information, as a filter effect expected value, and the display control section causes the display section to display an expected value image in which expected value information representing a magnitude of the filter effect expected value is represented for each of the predetermined pixel positions.

Accordingly, the user can pre-recognize which position in the image a high filter effect is expected to be produced at.

Thus, the user can be assisted to easily produce the polarization filter effect.

Furthermore, in the imaging apparatus of the embodiment, the display control section displays the expected value image superimposed on the captured image from the imaging section.

Accordingly, the user can specifically recognize a position where a high filter effect can be expected to be produced, on the basis of a positional relationship with the subject.

Thus, an assistance effect for facilitating production of the desired polarization filter effect can be further improved.

Additionally, in the imaging apparatus of the embodiment, the display control section displays a monochromatic image as the captured image and displays, as the expected value image, an image in a specific color instead of a monochromatic image.

Accordingly, the superimposed display of the captured image and the expected value image suppresses degradation of visibility of the images of each other.

Thus, the user can be made to more easily recognize the position where a high filter effect can be expected to be produced.

Furthermore, in the imaging apparatus of the embodiment, the image generating section calculates a degree of polarization as the filter effect expected value.

Accordingly, reliability of expected value information can be improved.

Furthermore, in the imaging apparatus of the embodiment, the imaging section (11A) includes a plurality of pixel pairs (50-1 or 50-2) each including a polarization splitter (51-1 or 51-2), a first type of pixel (52) including a predetermined number of light receiving elements each including a light receiving surface substantially orthogonal to an optical axis of reflected light reflected from a separation surface of the polarization splitter, the light receiving surface receiving the reflected light, and a second type of pixel (53) including a predetermined number of light receiving elements each including a light receiving surface substantially orthogonal to an optical axis of transmitted light transmitted through the separation surface, the light receiving surface receiving the transmitted light, and an in-plane angle of a polarization axis of the separation surface of the polarization splitter varies between the pixel pairs in an adjacent relationship.

In the above-described imaging section, one pixel pair (one pixel position) is capable of selectively receiving two types of linearly polarized light with polarization directions in an orthogonal relationship, and two pixel pairs in an adjacent relationship are capable of receiving four types of linearly polarized light with different polarization directions.

Accordingly, the resolution of a virtual polarized image can be increased. Additionally, incident light on one pixel pair is received by a plurality of light receiving elements, and thus light receiving sensitivity for each pixel position can be improved.

Note that the effects described herein are only illustrative and not limitative and that any other effect may be produced.

5. Other Modified Examples

The present technique is not limited to the above-described specific examples, and various modified examples are possible.

For example, in the above-described example, the lens apparatus 2 includes the rotary operator 2b, in other words, the body of the imaging apparatus is provided with no rotary operator. However, the rotary operator may be provided in the imaging apparatus body in form of, for example, a dial operator.

Additionally, the operator for indicating the virtual filter angle is not limited to the rotary operator and may be an operator in any other form such as a slide operator or a button operator.

Additionally, the imaging apparatus according to the present technique can be a lens-integrated imaging apparatus.

6. Present Technique

Note that the present technique can also be configured as follows.

(1)

An imaging apparatus including:

an imaging section including a first pixel capable of receiving light in a first polarization direction and a second pixel capable of receiving light in a second polarization direction different from the first polarization direction;

a detection section detecting an orientation of the imaging section; and an image generating section generating, on the basis of signals for the first and second pixels, an image corresponding to a polarization direction corresponding to a detection result from the detection section.

(2)

The imaging apparatus according to (1) described above, in which the image generating section sets a virtual filter angle corresponding to a rotation angle of a rotatable polarization filter in a case where a captured image is assumed to be obtained by receiving light via the polarization filter, and generates the image on the basis of the virtual filter angle corrected on the basis of the detection result from the detection section.

(3)

The imaging apparatus according to (3) described above, in which the imaging section includes a plurality of pixel units arranged in the imaging section and each including a plurality of pixels each including a predetermined number of light receiving elements and a polarization section causing the respective pixels to receive linearly polarized light in different polarization directions, and the image generating section generates, on the basis of light receiving signals for the plurality of pixels included in the pixel unit and function information representing a relationship between the virtual filter angle and light receiving signal values, an image corresponding to a polarization direction corresponding to the virtual filter angle corrected on the basis of the detection result from the detection section.

(4)

The imaging apparatus according to (2) or (3) described above, in which operational input of the virtual filter angle is enabled.

(5)

The imaging apparatus according to (4) described above, in which the operational input is performed using a rotary operator.

(6)

The imaging apparatus according to any one of (3) to (5) described above, in which the image generating section is capable of generating, on the basis of the light receiving signals for the plurality of pixels included in the pixel unit, a virtual polarized image corresponding to an image obtained using the virtual filter angle as an optional angle and a virtual normal image that is an image for which separation of polarized light performed by the polarization section is canceled, and separately generates the virtual polarized image and the virtual normal image depending on an operation.

(7)

The imaging apparatus according to any one of (2) to (6) described above, including a display control section causing a display section to display a virtual polarized image corresponding to an image obtained by setting the virtual filter angle as an optional angle.

(8)

The imaging apparatus according to (7) described above, in which the imaging section includes a plurality of pixel units arranged in the imaging section and each including a plurality of pixels each including a predetermined number of light receiving elements and a polarization section causing the respective pixels to receive linearly polarized light in different polarization directions, the image generating section is capable of generating, on the basis of light receiving signals for the plurality of pixels included in the pixel unit, a virtual polarized image corresponding to an image obtained by setting the virtual filter angle as an optional angle and a virtual normal image that is an image for which separation of polarized light performed by the polarization section is canceled, and the display control section switches, on the basis of a predetermined operation performed while any one of the virtual polarized image or the virtual normal image is being displayed on the display section, a display state of the display section from a state where any one of the virtual polarized image or the virtual normal image is displayed to a state where the other of the virtual polarized image or the virtual normal image is displayed.

(9)

The imaging apparatus according to (8) described above, in which the display control section maintains the display state where the other of the virtual polarized image or the virtual normal image is displayed while the predetermined operation is continuing, and switches, in response to end of the predetermined operation, to the display state where any one of the virtual polarized image or the virtual normal image is displayed.

(10)

The imaging apparatus according to any one of (7) to (9) described above, in which operational input of the virtual filter angle is enabled, the image generating section generates at least one of an increased-angle image that is the virtual polarized image obtained by setting the virtual filter angle larger than an angle provided by the operational input or a reduced-angle image that is the virtual polarized image obtained by setting the virtual filter angle smaller than the angle provided by the operational input, and the display control section causes the display section to display at least one of the increased-angle image or the reduced-angle image.

(11)

The imaging apparatus according to (10) described above, in which the operational input of the virtual filter angle is performed using a rotary operator, and the display control section causes, in a case of causing the increased-angle image to be displayed, information related to a rotating direction of the rotary operator and used to increase the virtual filter angle to be displayed at a display position corresponding to the increased-angle image, and causes, in a case of causing the reduced-angle image to be displayed, information related to the rotating direction of the rotary operator and used to reduce the virtual filter angle to be displayed at a display position corresponding to the reduced-angle image.

(12)

The imaging apparatus according to any one of (3) to (11) described above, including:

an acceptance section accepting operational designation of a subject, in which the image generating section is capable of generating, on the basis of the light receiving signals for the plurality of pixels included in the pixel unit and the function information, the virtual polarized image corresponding to an image obtained by setting the virtual filter angle as an optional angle, and the image generating section acquires the function information based on a light receiving signal value for a pixel position receiving light from the designated subject, calculates the virtual filter angle at which the light receiving signal value for the pixel position satisfies a predetermined condition, as a target angle on the basis of the function information, corrects the target angle on the basis of the detection result from the detection section to obtain a corrected angle, and generates the virtual polarized image with the virtual filter angle set to the corrected angle.

(13)

The imaging apparatus according to (12), in which the image generating section calculates, as the target angle, the virtual filter angle at which the light receiving signal for the pixel position is approximately minimized.

(14)

The imaging apparatus according to (12) or (13) described above, including:

a display control section causing a display section to display a captured image captured by the imaging section, in which the acceptance section accepts designation of the subject performed by a touch operation of touching a display screen of the display section.

(15)

The imaging apparatus according to any one of (3) to (14) described above, including:

a display control section controlling a display section, in which the image generating section calculates, for each of predetermined pixel positions in the imaging section, a value representing a degree of change in the light receiving signal value in response to a change in the virtual filter angle on the basis of the function information, as a filter effect expected value, and the display control section causes the display section to display an expected value image in which expected value information representing a magnitude of the filter effect expected value is represented for each of the predetermined pixel positions.

(16)

The imaging apparatus according to (15), in which the display control section displays the expected value image superimposed on the captured image from the imaging section.

(17)

The imaging apparatus according to (16) described above, in which the display control section displays a monochromatic image as the captured image and displays, as the expected value image, an image in a specific color instead of a monochromatic image.

(18)

The imaging apparatus according to any one of (15) to (17) described above, in which the image generating section calculates a degree of polarization as the filter effect expected value.

(19)

The imaging apparatus according to any one of (1) to (18), in which the imaging section includes a plurality of pixel pairs each including a polarization splitter, a first type of pixel including a predetermined number of light receiving elements each including a light receiving surface substantially orthogonal to an optical axis of reflected light reflected from a separation surface of the polarization splitter, the light receiving surface receiving the reflected light, and a second type of pixel including a predetermined number of light receiving elements each including a light receiving surface substantially orthogonal to an optical axis of transmitted light transmitted through the separation surface, the light receiving surface receiving the transmitted light, and an in-plane angle of a polarization axis of the separation surface of the polarization splitter varies between the pixel pairs in an adjacent relationship.

REFERENCE SIGNS LIST 1, 1A Imaging apparatus
2b Rotary operator
11, 11A Imaging section
12 Imaging element
12a Light receiving element
13 Optical member
13a Polarization filter
16 Display section
17 Angle detecting section
18 Operation section
20 Digital signal processing section
21, 21A Polarized image generating section
23 Display data generating section
30 Control section
31 Display control section
32 Acceptance section
50-1, 50-2 Pixel pair
51-1, 51-2 Polarization splitter
51a Separation surface
52, 53 Pixel
U, U' Pixel unit
P Polarization axis
P' Virtual polarization axis
Gr Indicated-angle image
Ga Increased-angle image
Gd Reduced-angle image

The invention claimed is:

1. An imaging apparatus comprising:
an imaging section including a first pixel configured to receive light in a first polarization direction and a second pixel configured to receive light in a second polarization direction different from the first polarization direction and at the same time the first pixel receives the light in the first polarization direction;
a detection section configured to detect an orientation of the imaging section; and
an image generating section configured to generate, on a basis of signals for the first and second pixels, an image corresponding to a polarization direction corresponding to the orientation of the imaging section that is detected.

2. The imaging apparatus according to claim 1, wherein the image generating section sets a virtual filter angle corresponding to a rotation angle of a rotatable polarization filter in a case where a captured image is assumed to be obtained by receiving light via the polarization filter, and generates the image on a basis of the virtual filter angle corrected on a basis of the detection result from the detection section.

3. The imaging apparatus according to claim 2, wherein the imaging section includes a plurality of pixel units arranged in the imaging section and each including a plurality of pixels each including a predetermined number of light receiving elements and a polarization section causing the respective pixels to receive linearly polarized light in different polarization directions, and
the image generating section generates, on a basis of light receiving signals for the plurality of pixels included in the pixel unit and function information representing a relationship between the virtual filter angle and light receiving signal values, an image corresponding to a polarization direction corresponding to the virtual filter angle corrected on the basis of the detection result from the detection section.

4. The imaging apparatus according to claim 3, wherein the image generating section is capable of generating, on the basis of the light receiving signals for the plurality of pixels included in the pixel unit, a virtual polarized image corresponding to an image obtained using the virtual filter angle as an optional angle and a virtual normal image that is an image for which separation of polarized light performed by the polarization section is canceled, and separately generates the virtual polarized image and the virtual normal image depending on an operation.

5. The imaging apparatus according to claim 3, comprising:
an acceptance section accepting operational designation of a subject, wherein
the image generating section is capable of generating, on the basis of the light receiving signals for the plurality of pixels included in the pixel unit and the function information, the virtual polarized image corresponding to an image obtained by setting the virtual filter angle as an optional angle, and
the image generating section acquires the function information based on a light receiving signal value for a pixel position receiving light from the designated subject, calculates the virtual filter angle at which the light receiving signal value for the pixel position satisfies a predetermined condition, as a target angle on a basis of the function information, corrects the target angle on a basis of the detection result from the detection section to obtain a corrected angle, and generates the virtual polarized image with the virtual filter angle set to the corrected angle.

6. The imaging apparatus according to claim 5, wherein the image generating section calculates, as the target angle, the virtual filter angle at which the light receiving signal for the pixel position is approximately minimized.

7. The imaging apparatus according to claim 5, comprising:
a display control section causing a display section to display a captured image captured by the imaging section, wherein
the acceptance section accepts designation of the subject performed by a touch operation of touching a display screen of the display section.

8. The imaging apparatus according to claim 3, comprising:
a display control section controlling a display section, wherein
the image generating section calculates, for each of predetermined pixel positions in the imaging section, a value representing a degree of change in the light receiving signal value in response to a change in the virtual filter angle on the basis of the function information, as a filter effect expected value, and
the display control section causes the display section to display an expected value image in which expected value information representing a magnitude of the filter effect expected value is represented for each of the predetermined pixel positions.

9. The imaging apparatus according to claim 8, wherein the image generating section calculates a degree of polarization as the filter effect expected value.

10. The imaging apparatus according to claim 8, wherein the display control section displays the expected value image superimposed on the captured image from the imaging section.

11. The imaging apparatus according to claim 10, wherein the display control section displays a monochromatic image as the captured image and displays, as the expected value image, an image in a specific color instead of a monochromatic image.

12. The imaging apparatus according to claim 2, wherein operational input of the virtual filter angle is enabled.

13. The imaging apparatus according to claim 12, wherein the operational input is performed using a rotary operator.

14. The imaging apparatus according to claim 2, comprising:
a display control section causing a display section to display a virtual polarized image corresponding to an image obtained by setting the virtual filter angle as an optional angle.

15. The imaging apparatus according to claim 14, wherein the imaging section includes a plurality of pixel units arranged in the imaging section and each including a plurality of pixels each including a predetermined number of light receiving elements and a polarization section causing the respective pixels to receive linearly polarized light in different polarization directions,
the image generating section is capable of generating, on a basis of light receiving signals for the plurality of pixels included in the pixel unit, a virtual polarized image corresponding to an image obtained by setting the virtual filter angle as an optional angle and a virtual normal image that is an image for which separation of polarized light performed by the polarization section is canceled, and
the display control section switches, on a basis of a predetermined operation performed while any one of the virtual polarized image or the virtual normal image is being displayed on the display section, a display state of the display section from a state where any one of the virtual polarized image or the virtual normal image is displayed to a state where an other of the virtual polarized image or the virtual normal image is displayed.

16. The imaging apparatus according to claim 15, wherein the display control section maintains the display state where the other of the virtual polarized image or the virtual normal image is displayed while the predetermined operation is continuing, and switches, in response to end of the predetermined operation, to the display state where any one of the virtual polarized image and the virtual normal image is displayed.

17. The imaging apparatus according to claim 14, wherein operational input of the virtual filter angle is enabled,
the image generating section generates at least one of an increased-angle image that is the virtual polarized image obtained by setting the virtual filter angle larger than an angle provided by the operational input or a reduced-angle image that is the virtual polarized image obtained by setting the virtual filter angle smaller than the angle provided by the operational input, and
the display control section causes the display section to display at least one of the increased-angle image or the reduced-angle image.

18. The imaging apparatus according to claim 17, wherein the operational input of the virtual filter angle is performed using a rotary operator, and
the display control section causes, in a case of causing the increased-angle image to be displayed, information related to a rotating direction of the rotary operator and used to increase the virtual filter angle to be displayed at a display position corresponding to the increased-angle image, and causes, in a case of causing the reduced-angle image to be displayed, information related to the rotating direction of the rotary operator and used to reduce the virtual filter angle to be displayed at a display position corresponding to the reduced-angle image.

19. The imaging apparatus according to claim 1, wherein the imaging section includes a plurality of pixel pairs each including a polarization splitter, a first type of pixel including a predetermined number of light receiving elements each including a light receiving surface substantially orthogonal to an optical axis of reflected light reflected from a separation surface of the polarization splitter, the light receiving surface receiving the reflected light, and a second type of pixel including a predetermined number of light receiving elements each including a light receiving surface substantially orthogonal to an optical axis of transmitted light transmitted through the separation surface, the light receiving surface receiving the transmitted light, and an in-plane angle of a polarization axis of the separation surface of the polarization splitter varies between the pixel pairs in an adjacent relationship.

20. An image generating method comprising:

receiving, with an imaging section including a first pixel and a second pixel, light in a first polarization direction at the first pixel and light in a second polarization direction different from the first polarization direction at the second pixel;

detecting an orientation of the imaging section; and generating, on a basis of signals for the first and second pixels, an image corresponding to a polarization direction corresponding to the orientation of the imaging section, wherein the first pixel receives the light in the first polarization direction at the same time the second pixel receives the light in the second polarization direction.

* * * * *